United States Patent
Filbeck et al.

(10) Patent No.: US 9,651,925 B2
(45) Date of Patent: May 16, 2017

(54) SYSTEM AND METHOD FOR ZONING A DISTRIBUTED-ARCHITECTURE HEATING, VENTILATION AND AIR CONDITIONING NETWORK

(75) Inventors: Amanda Filbeck, Guthrie, OK (US); Timothy E. Wallaert, Wylie, TX (US); Timothy H. Thorson, McKinney, TX (US)

(73) Assignee: LENNOX INDUSTRIES INC., Richardson, TX (US)

( * ) Notice: Subject to any disclaimer, the term of this patent is extended or adjusted under 35 U.S.C. 154(b) by 1312 days.

(21) Appl. No.: 12/603,407

(22) Filed: Oct. 21, 2009

(65) Prior Publication Data
US 2010/0106308 A1    Apr. 29, 2010

Related U.S. Application Data

(63) Continuation-in-part of application No. 12/258,659, filed on Oct. 27, 2008, now abandoned.

(60) Provisional application No. 61/167,135, filed on Apr. 6, 2009.

(51) Int. Cl.
G05B 15/00    (2006.01)
G05B 15/02    (2006.01)

(52) U.S. Cl.
CPC ...... *G05B 15/02* (2013.01); *G05B 2219/2642* (2013.01)

(58) Field of Classification Search
CPC . G05B 19/02; G05B 15/02; G05B 2219/2642
USPC ...................................................... 700/276
See application file for complete search history.

(56) References Cited

U.S. PATENT DOCUMENTS

| | | |
|---|---|---|
| 4,048,491 A | 9/1977 | Wessman |
| 4,231,352 A | 11/1980 | Bowden et al. |
| 4,262,736 A | 4/1981 | Gilkeson et al. |
| 4,296,464 A | 10/1981 | Woods et al. |
| 4,381,549 A | 4/1983 | Stamp et al. |
| 4,464,543 A | 8/1984 | Kline et al. |
| 4,482,785 A | 11/1984 | Finnegan et al. |

(Continued)

FOREIGN PATENT DOCUMENTS

| | | |
|---|---|---|
| EP | 0980165 A2 | 2/2000 |
| EP | 1956311 A2 | 8/2008 |

(Continued)

OTHER PUBLICATIONS

Related U.S. Appl. No. 12/603,534, filed Oct. 21, 2009 to Timothy Wallaert et al., entitled "Flush Wall Mount Thermostat and In-Set Mounting Plate for a Heating, Ventilation and Air Conditioning System".

(Continued)

*Primary Examiner* — Carlos Ortiz Rodriguez

(57) ABSTRACT

The disclosure provides an HVAC data processing and communication network. In an embodiment, the network includes a first zone and a second zone. The first zone has a first demand unit and a first subnet controller configured to control an operation of the first demand unit via a data bus. The second zone has a second demand unit and a second subnet controller configured to control an operation of the second demand unit via the data bus. The second subnet controller is further configured to communicate with the first subnet controller via the data bus.

5 Claims, 28 Drawing Sheets

(56) References Cited

U.S. PATENT DOCUMENTS

| | | |
|---|---|---|
| 4,497,031 A | 1/1985 | Froehling et al. |
| 4,501,125 A | 2/1985 | Han |
| 4,606,042 A | 8/1986 | Kahn et al. |
| 4,616,325 A | 10/1986 | Heckenbach et al. |
| 4,694,394 A | 9/1987 | Costantini |
| 4,698,628 A | 10/1987 | Herkert et al. |
| 4,703,325 A | 10/1987 | Chamberlin et al. |
| 4,706,247 A | 11/1987 | Yoshioka |
| 4,723,239 A | 2/1988 | Schwartz |
| 4,829,447 A | 5/1989 | Parker et al. |
| 4,841,450 A | 6/1989 | Fredriksson |
| 4,843,084 A | 6/1989 | Parker et al. |
| 4,873,649 A | 10/1989 | Grald et al. |
| 4,884,214 A | 11/1989 | Parker et al. |
| 4,887,262 A | 12/1989 | van Veldhuizen |
| 4,888,728 A | 12/1989 | Shirakawa et al. |
| 4,889,280 A | 12/1989 | Grald et al. |
| 4,931,948 A | 6/1990 | Parker et al. |
| 4,941,143 A | 7/1990 | Twitty et al. |
| 4,942,613 A | 7/1990 | Lynch |
| 4,947,484 A | 8/1990 | Twitty et al. |
| 4,947,928 A | 8/1990 | Parker et al. |
| 4,953,083 A | 8/1990 | Takata et al. |
| 4,955,018 A | 9/1990 | Twitty et al. |
| 4,967,567 A | 11/1990 | Proctor et al. |
| 4,978,896 A | 12/1990 | Shah |
| 4,991,770 A | 2/1991 | Bird et al. |
| 4,996,513 A | 2/1991 | Mak et al. |
| 5,006,827 A | 4/1991 | Brueton et al. |
| 5,018,138 A | 5/1991 | Twitty et al. |
| 5,039,980 A | 8/1991 | Aggers et al. |
| 5,042,997 A | 8/1991 | Rhodes |
| 5,058,388 A | 10/1991 | Shaw et al. |
| 5,061,916 A | 10/1991 | French et al. |
| 5,065,813 A | 11/1991 | Berkeley et al. |
| 5,086,385 A | 2/1992 | Launey et al. |
| 5,103,896 A | 4/1992 | Saga |
| 5,105,366 A | 4/1992 | Beckey |
| 5,115,967 A | 5/1992 | Wedekind |
| 5,128,855 A | 7/1992 | Hilber et al. |
| 5,165,465 A | 11/1992 | Kenet |
| 5,170,935 A | 12/1992 | Federspiel et al. |
| 5,180,102 A | 1/1993 | Gilbert et al. |
| 5,181,653 A | 1/1993 | Foster et al. |
| 5,184,122 A | 2/1993 | Decious et al. |
| 5,191,643 A | 3/1993 | Alsenz |
| 5,195,327 A | 3/1993 | Kim |
| 5,197,666 A | 3/1993 | Wedekind |
| 5,197,668 A | 3/1993 | Ratz et al. |
| 5,203,497 A | 4/1993 | Ratz et al. |
| 5,220,260 A | 6/1993 | Schuler |
| 5,230,482 A | 7/1993 | Ratz et al. |
| 5,259,553 A | 11/1993 | Shyu |
| 5,274,571 A | 12/1993 | Hessee et al. |
| 5,276,630 A | 1/1994 | Baldwin et al. |
| 5,277,036 A | 1/1994 | Dieckmann et al. |
| 5,278,957 A | 1/1994 | Chan |
| 5,279,458 A | 1/1994 | DeWolf et al. |
| 5,297,143 A | 3/1994 | Fridrich et al. |
| 5,314,004 A | 5/1994 | Strand et al. |
| 5,323,385 A | 6/1994 | Jurewicz et al. |
| 5,323,619 A | 6/1994 | Kim |
| 5,327,426 A | 7/1994 | Dolin, Jr. et al. |
| 5,329,991 A | 7/1994 | Mehta et al. |
| 5,337,952 A | 8/1994 | Thompson |
| 5,341,988 A | 8/1994 | Rein et al. |
| 5,355,323 A | 10/1994 | Bae |
| 5,361,982 A | 11/1994 | Liebi et al. |
| 5,374,200 A | 12/1994 | Giroux |
| 5,383,116 A | 1/1995 | Lennartsson |
| 5,384,697 A | 1/1995 | Pascucci |
| 5,414,337 A | 5/1995 | Schuler |
| 5,417,368 A | 5/1995 | Jeffery et al. |
| 5,420,572 A | 5/1995 | Dolin, Jr. et al. |
| 5,434,965 A | 7/1995 | Matheny et al. |
| 5,440,895 A | 8/1995 | Bahel et al. |
| 5,444,626 A | 8/1995 | Schenk |
| 5,444,851 A | 8/1995 | Woest |
| 5,448,180 A | 9/1995 | Kienzler et al. |
| 5,448,561 A | 9/1995 | Kaiser et al. |
| 5,449,047 A | 9/1995 | Schivley, Jr. |
| 5,450,570 A | 9/1995 | Richek et al. |
| 5,452,201 A | 9/1995 | Pieronek et al. |
| 5,460,327 A | 10/1995 | Hill et al. |
| 5,463,735 A | 10/1995 | Pascucci et al. |
| 5,469,150 A | 11/1995 | Sitte |
| 5,475,364 A | 12/1995 | Kenet |
| 5,481,481 A | 1/1996 | Frey et al. |
| 5,481,661 A | 1/1996 | Kobayashi |
| 5,488,834 A | 2/1996 | Schwarz |
| 5,491,649 A | 2/1996 | Friday, Jr. et al. |
| 5,502,818 A | 3/1996 | Lamberg |
| 5,511,188 A | 4/1996 | Pascucci et al. |
| 5,513,324 A | 4/1996 | Dolin, Jr. et al. |
| 5,515,267 A | 5/1996 | Alsenz |
| 5,520,328 A | 5/1996 | Bujak, Jr. |
| 5,522,044 A | 5/1996 | Pascucci et al. |
| 5,530,643 A | 6/1996 | Hodorowski |
| 5,537,339 A | 7/1996 | Naganuma et al. |
| 5,539,778 A | 7/1996 | Kienzler et al. |
| 5,544,036 A * | 8/1996 | Brown et al. ............ 340/12.52 |
| 5,544,809 A | 8/1996 | Keating et al. |
| 5,550,980 A | 8/1996 | Pascucci et al. |
| 5,551,053 A | 8/1996 | Nadolski et al. |
| 5,555,269 A | 9/1996 | Friday, Jr. et al. |
| 5,555,509 A | 9/1996 | Dolan et al. |
| 5,559,407 A | 9/1996 | Dudley et al. |
| 5,559,412 A | 9/1996 | Schuler |
| 5,566,879 A | 10/1996 | Longtin |
| 5,572,658 A | 11/1996 | Mohr et al. |
| 5,574,848 A | 11/1996 | Thomson |
| 5,579,221 A | 11/1996 | Mun |
| 5,581,478 A | 12/1996 | Cruse et al. |
| 5,592,058 A | 1/1997 | Archer et al. |
| 5,592,059 A | 1/1997 | Archer |
| 5,592,628 A | 1/1997 | Ueno et al. |
| 5,596,437 A | 1/1997 | Heins |
| 5,598,566 A | 1/1997 | Pascucci et al. |
| 5,600,782 A | 2/1997 | Thomson |
| 5,613,157 A | 3/1997 | Davidson et al. |
| 5,613,369 A | 3/1997 | Sato et al. |
| 5,617,282 A | 4/1997 | Rall et al. |
| 5,621,662 A | 4/1997 | Humphries et al. |
| 5,628,201 A | 5/1997 | Bahel et al. |
| 5,630,325 A | 5/1997 | Bahel et al. |
| 5,631,825 A | 5/1997 | van Weele et al. |
| 5,634,590 A | 6/1997 | Gorski et al. |
| 5,675,756 A | 10/1997 | Benton et al. |
| 5,675,830 A | 10/1997 | Satula |
| 5,684,463 A | 11/1997 | Diercks et al. |
| 5,684,717 A | 11/1997 | Beilfuss et al. |
| 5,699,243 A | 12/1997 | Eckel et al. |
| 5,706,190 A | 1/1998 | Russ et al. |
| 5,711,480 A | 1/1998 | Zepke et al. |
| 5,720,604 A | 2/1998 | Kelly et al. |
| 5,722,822 A | 3/1998 | Wilson et al. |
| 5,726,900 A | 3/1998 | Walter et al. |
| 5,729,442 A | 3/1998 | Frantz |
| 5,737,529 A | 4/1998 | Dolin, Jr. et al. |
| 5,748,923 A | 5/1998 | Eitrich |
| 5,751,572 A | 5/1998 | Maciulewicz |
| 5,751,948 A | 5/1998 | Dolan et al. |
| 5,754,779 A | 5/1998 | Dolin, Jr. et al. |
| 5,761,083 A | 6/1998 | Brown, Jr. et al. |
| 5,764,146 A | 6/1998 | Baldwin et al. |
| 5,772,326 A | 6/1998 | Batko et al. |
| 5,772,732 A | 6/1998 | James et al. |
| 5,774,322 A | 6/1998 | Walter et al. |
| 5,774,492 A | 6/1998 | Orlowsik, Jr. et al. |
| 5,774,493 A | 6/1998 | Ross |
| 5,777,837 A | 7/1998 | Eckel et al. |
| 5,782,296 A | 7/1998 | Mehta |
| 5,784,647 A | 7/1998 | Sugimoto |
| 5,786,993 A | 7/1998 | Frutiger et al. |

(56) References Cited

U.S. PATENT DOCUMENTS

| | | |
|---|---|---|
| 5,787,027 A | 7/1998 | Dolan et al. |
| 5,791,332 A | 8/1998 | Thompson et al. |
| 5,793,646 A | 8/1998 | Hibberd et al. |
| 5,801,942 A | 9/1998 | Nixon et al. |
| 5,802,485 A | 9/1998 | Koelle et al. |
| 5,803,357 A | 9/1998 | Lakin |
| 5,809,063 A | 9/1998 | Ashe et al. |
| 5,809,556 A | 9/1998 | Fujisawa et al. |
| 5,816,492 A | 10/1998 | Charles et al. |
| 5,818,347 A | 10/1998 | Dolan et al. |
| 5,819,845 A | 10/1998 | Ryu et al. |
| 5,822,512 A | 10/1998 | Goodrum et al. |
| 5,826,038 A | 10/1998 | Nakazumi |
| 5,829,674 A | 11/1998 | Vanostrand et al. |
| 5,841,654 A | 11/1998 | Verissimo et al. |
| 5,848,887 A | 12/1998 | Zabielski et al. |
| 5,854,744 A | 12/1998 | Zeng et al. |
| 5,856,972 A | 1/1999 | Riley et al. |
| 5,860,411 A | 1/1999 | Thompson et al. |
| 5,860,473 A | 1/1999 | Seiden |
| 5,862,052 A | 1/1999 | Nixon et al. |
| 5,862,411 A | 1/1999 | Kay et al. |
| 5,864,581 A | 1/1999 | Alger-Meunier et al. |
| 5,873,519 A | 2/1999 | Beilfuss |
| 5,878,236 A | 3/1999 | Kleineberg et al. |
| 5,883,627 A | 3/1999 | Pleyer |
| 5,884,072 A * | 3/1999 | Rasmussen .................. 709/223 |
| 5,892,690 A | 4/1999 | Boatman et al. |
| 5,896,304 A | 4/1999 | Tiemann et al. |
| 5,900,674 A | 5/1999 | Wojnarowski et al. |
| 5,903,454 A | 5/1999 | Hoffberg et al. |
| 5,912,877 A | 6/1999 | Shirai et al. |
| 5,914,453 A | 6/1999 | James et al. |
| 5,915,101 A | 6/1999 | Kleineberg et al. |
| 5,924,486 A | 7/1999 | Ehlers et al. |
| 5,927,398 A | 7/1999 | Maciulewicz |
| 5,930,249 A | 7/1999 | Stademann et al. |
| 5,933,655 A | 8/1999 | Vrabec et al. |
| 5,934,554 A | 8/1999 | Charles et al. |
| 5,937,942 A | 8/1999 | Bias et al. |
| 5,946,209 A | 8/1999 | Eckel et al. |
| 5,962,989 A | 10/1999 | Baker |
| 5,971,597 A | 10/1999 | Baldwin et al. |
| 5,973,594 A | 10/1999 | Baldwin et al. |
| 5,974,554 A | 10/1999 | Oh |
| 5,983,353 A | 11/1999 | McHann, Jr. |
| 5,983,646 A | 11/1999 | Grothe et al. |
| 5,993,195 A | 11/1999 | Thompson |
| 6,006,142 A | 12/1999 | Seem et al. |
| 6,011,821 A | 1/2000 | Sauer et al. |
| 6,021,252 A | 2/2000 | Faris et al. |
| 6,028,864 A | 2/2000 | Marttinen et al. |
| 6,032,178 A | 2/2000 | Bacigalupo et al. |
| 6,035,024 A | 3/2000 | Stumer |
| 6,046,410 A | 4/2000 | Wojnarowski et al. |
| 6,049,817 A | 4/2000 | Schoen et al. |
| 6,052,525 A | 4/2000 | Carlson et al. |
| 6,053,416 A | 4/2000 | Specht et al. |
| 6,061,600 A | 5/2000 | Ying |
| 6,061,603 A | 5/2000 | Papadopoulos et al. |
| 6,078,660 A | 6/2000 | Burgess |
| 6,082,894 A | 7/2000 | Batko et al. |
| 6,092,280 A | 7/2000 | Wojnarowski |
| 6,095,674 A | 8/2000 | Verissimo et al. |
| 6,098,116 A | 8/2000 | Nixon et al. |
| 6,101,824 A | 8/2000 | Meyer et al. |
| 6,110,260 A | 8/2000 | Kubokawa |
| 6,115,713 A | 9/2000 | Pascucci et al. |
| 6,138,227 A | 10/2000 | Thewes et al. |
| 6,141,595 A | 10/2000 | Gloudeman et al. |
| 6,145,501 A | 11/2000 | Manohar et al. |
| 6,145,751 A | 11/2000 | Ahmed |
| 6,147,601 A | 11/2000 | Sandelman et al. |
| 6,151,298 A | 11/2000 | Bernhardsson et al. |
| 6,151,529 A | 11/2000 | Batko |
| 6,151,625 A | 11/2000 | Swales et al. |
| 6,151,650 A | 11/2000 | Birzer |
| 6,155,341 A | 12/2000 | Thompson et al. |
| 6,160,477 A | 12/2000 | Sandelman et al. |
| 6,160,484 A | 12/2000 | Spahl et al. |
| 6,160,795 A | 12/2000 | Hosemann |
| 6,167,338 A | 12/2000 | De Wille et al. |
| 6,169,937 B1 | 1/2001 | Peterson |
| 6,169,964 B1 | 1/2001 | Alsa et al. |
| 6,170,044 B1 | 1/2001 | McLaughlin et al. |
| 6,177,945 B1 | 1/2001 | Pleyer |
| 6,179,213 B1 | 1/2001 | Gibino et al. |
| 6,182,130 B1 | 1/2001 | Dolin, Jr. et al. |
| 6,188,642 B1 | 2/2001 | Schoniger et al. |
| 6,190,442 B1 | 2/2001 | Redner |
| 6,208,905 B1 | 3/2001 | Giddings et al. |
| 6,208,924 B1 | 3/2001 | Bauer |
| 6,211,782 B1 | 4/2001 | Sandelman et al. |
| 6,216,066 B1 | 4/2001 | Goebel et al. |
| 6,227,191 B1 | 5/2001 | Garloch |
| 6,232,604 B1 | 5/2001 | McDaniel et al. |
| 6,237,113 B1 | 5/2001 | Daiber |
| 6,240,326 B1 | 5/2001 | Gloudeman et al. |
| 6,241,156 B1 | 6/2001 | Kline et al. |
| 6,252,890 B1 | 6/2001 | Alger-Meunier et al. |
| 6,254,009 B1 | 7/2001 | Proffitt et al. |
| 6,266,205 B1 | 7/2001 | Schreck et al. |
| 6,269,127 B1 | 7/2001 | Richards |
| 6,271,845 B1 | 8/2001 | Richardson |
| 6,282,454 B1 | 8/2001 | Papadopoulos et al. |
| 6,285,912 B1 | 9/2001 | Ellison et al. |
| 6,292,518 B1 | 9/2001 | Grabb et al. |
| 6,298,376 B1 | 10/2001 | Rosner et al. |
| 6,298,454 B1 | 10/2001 | Schleiss et al. |
| 6,298,551 B1 | 10/2001 | Wojnarowski et al. |
| 6,304,557 B1 | 10/2001 | Nakazumi |
| 6,307,331 B1 | 10/2001 | Bonasia et al. |
| 6,324,008 B1 | 11/2001 | Baldwin et al. |
| 6,324,854 B1 | 12/2001 | Jayanth |
| 6,336,065 B1 | 1/2002 | Gibson et al. |
| 6,343,236 B1 | 1/2002 | Gibson et al. |
| 6,349,306 B1 | 2/2002 | Malik et al. |
| 6,349,883 B1 | 2/2002 | Simmons et al. |
| 6,353,775 B1 | 3/2002 | Nichols |
| 6,359,220 B2 | 3/2002 | Schiedegger et al. |
| 6,363,422 B1 | 3/2002 | Hunter et al. |
| 6,370,037 B1 | 4/2002 | Schoenfish |
| 6,374,373 B1 | 4/2002 | Helm et al. |
| 6,377,283 B1 | 4/2002 | Thomas |
| 6,385,510 B1 | 5/2002 | Hoog et al. |
| 6,390,806 B1 | 5/2002 | Dempsey et al. |
| 6,393,023 B1 | 5/2002 | Shimizu et al. |
| 6,400,996 B1 | 6/2002 | Hoffberg et al. |
| 6,405,104 B1 | 6/2002 | Dougherty |
| 6,408,228 B1 | 6/2002 | Seem et al. |
| 6,411,701 B1 | 6/2002 | Stademann |
| 6,411,857 B1 | 6/2002 | Flood |
| 6,412,435 B1 | 7/2002 | Timmons, Jr. |
| 6,415,395 B1 | 7/2002 | Varma et al. |
| 6,418,507 B1 | 7/2002 | Fackler |
| 6,423,118 B1 | 7/2002 | Becerra et al. |
| 6,424,872 B1 | 7/2002 | Glanzer et al. |
| 6,424,874 B1 | 7/2002 | Cofer |
| 6,427,454 B1 | 8/2002 | West |
| 6,429,845 B1 | 8/2002 | Unseld et al. |
| 6,430,953 B2 | 8/2002 | Roh |
| 6,434,715 B1 | 8/2002 | Andersen |
| 6,435,418 B1 | 8/2002 | Toth et al. |
| 6,437,691 B1 | 8/2002 | Sandelman et al. |
| 6,437,805 B1 | 8/2002 | Sojoodi et al. |
| 6,441,723 B1 | 8/2002 | Mansfield et al. |
| 6,442,952 B2 | 9/2002 | Roh et al. |
| 6,448,896 B1 | 9/2002 | Bankus et al. |
| 6,449,315 B2 | 9/2002 | Richards |
| 6,450,409 B1 | 9/2002 | Rowlette et al. |
| 6,453,374 B1 | 9/2002 | Kovalan et al. |
| 6,454,177 B1 | 9/2002 | Sasao et al. |
| 6,462,654 B1 | 10/2002 | Sandelman et al. |
| 6,478,084 B1 | 11/2002 | Kumar et al. |

(56) References Cited

U.S. PATENT DOCUMENTS

| | | | |
|---|---|---|---|
| 6,487,457 B1 * | 11/2002 | Hull | G05B 15/02 700/17 |
| 6,493,661 B1 | 12/2002 | White et al. | |
| 6,497,570 B1 | 12/2002 | Sears et al. | |
| 6,498,844 B1 | 12/2002 | Stademann | |
| 6,501,995 B1 | 12/2002 | Kinney et al. | |
| 6,504,338 B1 | 1/2003 | Eichorn | |
| 6,505,087 B1 | 1/2003 | Lucas et al. | |
| 6,508,407 B1 | 1/2003 | Lefkowitz et al. | |
| 6,526,122 B2 | 2/2003 | Matsushita et al. | |
| 6,535,123 B2 | 3/2003 | Sandelman et al. | |
| 6,535,138 B1 | 3/2003 | Dolan et al. | |
| 6,539,489 B1 | 3/2003 | Reinert | |
| 6,540,148 B1 | 4/2003 | Salsbury et al. | |
| 6,542,462 B1 | 4/2003 | Sohraby et al. | |
| 6,543,007 B1 | 4/2003 | Bliley et al. | |
| 6,545,660 B1 | 4/2003 | Shen et al. | |
| 6,546,008 B1 | 4/2003 | Wehrend | |
| 6,552,647 B1 | 4/2003 | Thiessen et al. | |
| 6,554,198 B1 | 4/2003 | Hull et al. | |
| 6,560,976 B2 | 5/2003 | Jayanth | |
| 6,564,348 B1 | 5/2003 | Barenys et al. | |
| 6,567,476 B2 | 5/2003 | Kohl et al. | |
| 6,572,363 B1 | 6/2003 | Virgil, Jr. et al. | |
| 6,574,215 B2 | 6/2003 | Hummel | |
| 6,574,234 B1 | 6/2003 | Myer et al. | |
| 6,574,581 B1 | 6/2003 | Bohrer et al. | |
| 6,575,233 B1 | 6/2003 | Krumnow | |
| 6,580,950 B1 | 6/2003 | Johnson et al. | |
| 6,587,039 B1 | 7/2003 | Woestemeyer et al. | |
| 6,587,739 B1 | 7/2003 | Abrams et al. | |
| 6,587,884 B1 | 7/2003 | Papadopoulos et al. | |
| 6,594,272 B1 | 7/2003 | Ketcham et al. | |
| 6,595,430 B1 | 7/2003 | Shah | |
| 6,600,923 B1 | 7/2003 | Dzuban | |
| 6,608,560 B2 | 8/2003 | Abrams | |
| 6,609,127 B1 | 8/2003 | Lee et al. | |
| 6,615,088 B1 | 9/2003 | Myer et al. | |
| 6,615,594 B2 | 9/2003 | Jayanth et al. | |
| 6,618,394 B1 | 9/2003 | Hilleary | |
| 6,619,555 B2 | 9/2003 | Rosen | |
| 6,621,507 B1 | 9/2003 | Shah | |
| 6,622,926 B1 | 9/2003 | Sartain et al. | |
| 6,628,993 B1 | 9/2003 | Bauer | |
| 6,633,781 B1 | 10/2003 | Lee et al. | |
| 6,636,771 B1 | 10/2003 | Varma et al. | |
| 6,639,939 B1 | 10/2003 | Naden et al. | |
| 6,640,145 B2 | 10/2003 | Hoffberg et al. | |
| 6,640,890 B1 | 11/2003 | Dage et al. | |
| 6,643,689 B2 | 11/2003 | Rode et al. | |
| 6,644,557 B1 | 11/2003 | Jacobs | |
| 6,647,317 B2 | 11/2003 | Takai et al. | |
| 6,650,949 B1 | 11/2003 | Fera et al. | |
| 6,651,034 B1 | 11/2003 | Hedlund et al. | |
| 6,658,373 B2 | 12/2003 | Rossi et al. | |
| RE38,406 E | 1/2004 | Faris et al. | |
| 6,681,215 B2 | 1/2004 | Jammu | |
| 6,688,387 B1 | 2/2004 | Wellington et al. | |
| 6,704,688 B2 | 3/2004 | Aslam et al. | |
| 6,708,239 B1 | 3/2004 | Ellerbrock et al. | |
| 6,715,120 B1 | 3/2004 | Hladik et al. | |
| 6,715,302 B2 | 4/2004 | Ferragut, II | |
| 6,715,690 B2 | 4/2004 | Hull et al. | |
| 6,717,513 B1 | 4/2004 | Sandelman et al. | |
| 6,717,919 B1 | 4/2004 | Ketcham et al. | |
| 6,718,384 B2 | 4/2004 | Linzy | |
| 6,722,143 B2 | 4/2004 | Moon et al. | |
| 6,725,180 B2 | 4/2004 | Mayer et al. | |
| 6,725,398 B1 | 4/2004 | Varma et al. | |
| 6,728,369 B2 | 4/2004 | Burgess | |
| 6,732,191 B1 | 5/2004 | Baker et al. | |
| 6,735,196 B1 | 5/2004 | Manzardo | |
| 6,735,282 B2 | 5/2004 | Matsushita et al. | |
| 6,735,965 B2 | 5/2004 | Moon et al. | |
| 6,738,676 B2 | 5/2004 | Hirayama | |
| 6,741,915 B2 | 5/2004 | Poth | |
| 6,744,771 B1 | 6/2004 | Barber et al. | |
| 6,745,106 B2 | 6/2004 | Howard et al. | |
| 6,747,888 B2 | 6/2004 | Klein | |
| 6,758,050 B2 | 7/2004 | Jayanth et al. | |
| 6,758,051 B2 | 7/2004 | Jayanth et al. | |
| 6,763,040 B1 | 7/2004 | Hite et al. | |
| 6,763,272 B2 | 7/2004 | Knepper | |
| 6,765,993 B2 | 7/2004 | Cueman | |
| 6,768,732 B1 | 7/2004 | Neuhaus | |
| 6,774,786 B1 | 8/2004 | Havekost et al. | |
| 6,779,176 B1 | 8/2004 | Chambers, II et al. | |
| 6,783,079 B2 | 8/2004 | Carey et al. | |
| 6,789,739 B2 | 9/2004 | Rosen | |
| 6,791,530 B2 | 9/2004 | Vernier et al. | |
| 6,795,935 B1 | 9/2004 | Unkle et al. | |
| 6,798,341 B1 | 9/2004 | Eckel et al. | |
| 6,801,524 B2 | 10/2004 | Eteminan | |
| 6,804,564 B2 | 10/2004 | Crispin et al. | |
| 6,810,333 B2 | 10/2004 | Adedeji et al. | |
| 6,814,299 B1 | 11/2004 | Carey | |
| 6,814,660 B1 | 11/2004 | Cavett | |
| 6,816,071 B2 | 11/2004 | Conti | |
| 6,817,757 B1 | 11/2004 | Wallace | |
| 6,819,802 B2 | 11/2004 | Higgs et al. | |
| 6,822,202 B2 | 11/2004 | Atlas | |
| 6,823,680 B2 | 11/2004 | Jayanth | |
| 6,824,069 B2 | 11/2004 | Rosen | |
| 6,826,454 B2 | 11/2004 | Sulfstede | |
| 6,826,590 B1 | 11/2004 | Glanzer et al. | |
| 6,832,118 B1 | 12/2004 | Heberlein et al. | |
| 6,833,787 B1 | 12/2004 | Levi | |
| 6,833,844 B1 | 12/2004 | Shiota et al. | |
| 6,840,052 B2 | 1/2005 | Smith et al. | |
| 6,842,117 B2 | 1/2005 | Keown | |
| 6,842,808 B2 | 1/2005 | Weigl et al. | |
| 6,845,918 B2 | 1/2005 | Rotondo | |
| 6,850,992 B2 | 2/2005 | Heinrich et al. | |
| 6,851,948 B2 | 2/2005 | Dempsey et al. | |
| 6,853,291 B1 | 2/2005 | Aisa | |
| 6,854,444 B2 | 2/2005 | Plagge et al. | |
| 6,865,449 B2 | 3/2005 | Dudley | |
| 6,865,596 B1 | 3/2005 | Barber et al. | |
| 6,865,898 B2 | 3/2005 | Yamanashi et al. | |
| 6,866,375 B2 | 3/2005 | Leighton et al. | |
| 6,868,292 B2 | 3/2005 | Ficco et al. | |
| 6,868,900 B2 | 3/2005 | Dage et al. | |
| 6,874,691 B1 | 4/2005 | Hildebrand et al. | |
| 6,874,693 B2 | 4/2005 | Readio et al. | |
| 6,876,891 B1 | 4/2005 | Schuler et al. | |
| 6,879,881 B1 | 4/2005 | Attridge, Jr. | |
| 6,888,441 B2 | 5/2005 | Carey | |
| 6,892,121 B2 | 5/2005 | Schmidt | |
| 6,894,703 B2 | 5/2005 | Vernier et al. | |
| 6,900,808 B2 | 5/2005 | Lassiter et al. | |
| 6,901,316 B1 | 5/2005 | Jensen et al. | |
| 6,901,439 B1 | 5/2005 | Bonasia et al. | |
| 6,907,329 B2 | 6/2005 | Junger et al. | |
| 6,909,948 B2 | 6/2005 | Mollmann et al. | |
| 6,914,893 B2 | 7/2005 | Petite | |
| 6,918,064 B2 | 7/2005 | Mueller et al. | |
| 6,920,318 B2 | 7/2005 | Brooking et al. | |
| 6,925,360 B2 | 8/2005 | Yoon et al. | |
| 6,931,645 B2 | 8/2005 | Murching et al. | |
| 6,938,106 B2 | 8/2005 | Ellerbrock et al. | |
| 6,941,193 B2 | 9/2005 | Frecska et al. | |
| 6,944,785 B2 | 9/2005 | Gadir et al. | |
| 6,954,680 B2 | 10/2005 | Kreidler et al. | |
| 6,955,060 B2 | 10/2005 | Homan et al. | |
| 6,955,302 B2 | 10/2005 | Erdman, Jr. | |
| 6,956,424 B2 | 10/2005 | Hohnel | |
| 6,957,696 B1 | 10/2005 | Krumnow | |
| 6,963,288 B1 | 11/2005 | Sokol et al. | |
| 6,963,922 B2 | 11/2005 | Papadopoulos et al. | |
| 6,965,802 B2 | 11/2005 | Sexton | |
| 6,967,565 B2 | 11/2005 | Lingemann | |
| 6,968,295 B1 | 11/2005 | Carr | |
| 6,973,366 B2 | 12/2005 | Komai | |
| 6,975,219 B2 | 12/2005 | Eryurek et al. | |

(56) References Cited

U.S. PATENT DOCUMENTS

| | | |
|---|---|---|
| 6,975,913 B2 | 12/2005 | Kreidler et al. |
| 6,975,958 B2 * | 12/2005 | Bohrer et al. ............... 702/130 |
| 6,980,796 B1 | 12/2005 | Cuellar et al. |
| 6,981,266 B1 | 12/2005 | An et al. |
| 6,983,271 B2 | 1/2006 | Morrow et al. |
| 6,983,889 B2 | 1/2006 | Alles |
| 6,988,011 B2 | 1/2006 | Varma et al. |
| 6,988,671 B2 | 1/2006 | DeLuca |
| 6,990,381 B2 | 1/2006 | Nomura et al. |
| 6,990,540 B2 | 1/2006 | Dalakuras et al. |
| 6,993,414 B2 | 1/2006 | Shah |
| RE38,985 E | 2/2006 | Boatman et al. |
| 6,994,620 B2 | 2/2006 | Mills |
| 6,999,473 B2 | 2/2006 | Windecker |
| 6,999,824 B2 | 2/2006 | Glanzer et al. |
| 7,000,849 B2 | 2/2006 | Ashworth et al. |
| 7,002,462 B2 | 2/2006 | Welch |
| 7,003,378 B2 | 2/2006 | Poth |
| 7,006,460 B1 | 2/2006 | Vollmer et al. |
| 7,006,881 B1 | 2/2006 | Hoffberg et al. |
| 7,013,239 B2 | 3/2006 | Hedlund et al. |
| 7,017,827 B2 | 3/2006 | Shah et al. |
| 7,020,798 B2 | 3/2006 | Meng et al. |
| 7,022,008 B1 | 4/2006 | Crocker |
| 7,024,282 B2 | 4/2006 | Coogan et al. |
| 7,024,283 B2 | 4/2006 | Bicknell |
| 7,025,281 B2 | 4/2006 | DeLuca |
| 7,027,808 B2 | 4/2006 | Wesby |
| 7,028,912 B1 * | 4/2006 | Rosen ............... 236/1 C |
| 7,029,391 B2 | 4/2006 | Nagaya et al. |
| 7,031,880 B1 | 4/2006 | Seem et al. |
| 7,032,018 B2 | 4/2006 | Lee et al. |
| 7,035,719 B2 | 4/2006 | Howard et al. |
| 7,035,898 B1 | 4/2006 | Baker |
| 7,036,743 B2 | 5/2006 | Shah |
| 7,043,339 B2 | 5/2006 | Maeda et al. |
| 7,044,397 B2 | 5/2006 | Bartlett et al. |
| 7,047,092 B2 | 5/2006 | Wimsatt |
| 7,051,282 B2 | 5/2006 | Marcjan |
| 7,055,759 B2 | 6/2006 | Wacker et al. |
| 7,058,459 B2 | 6/2006 | Weiberle et al. |
| 7,058,477 B1 | 6/2006 | Rosen |
| 7,058,693 B1 | 6/2006 | Baker, Jr. |
| 7,058,737 B2 | 6/2006 | Ellerbrock et al. |
| 7,062,927 B2 | 6/2006 | Kwon et al. |
| 7,068,612 B2 | 6/2006 | Berkcan et al. |
| 7,076,962 B2 | 7/2006 | He et al. |
| 7,082,339 B2 | 7/2006 | Murray et al. |
| 7,082,352 B2 | 7/2006 | Lim |
| 7,083,109 B2 * | 8/2006 | Pouchak ............... 236/1 E |
| 7,085,626 B2 | 8/2006 | Harrod et al. |
| 7,085,814 B1 | 8/2006 | Gandhi et al. |
| 7,089,087 B2 | 8/2006 | Dudley |
| 7,089,088 B2 | 8/2006 | Terry et al. |
| 7,089,530 B1 | 8/2006 | Dardinski et al. |
| 7,092,768 B1 | 8/2006 | Labuda |
| 7,092,772 B2 | 8/2006 | Murray et al. |
| 7,092,794 B1 | 8/2006 | Hill et al. |
| 7,096,078 B2 | 8/2006 | Burr et al. |
| 7,096,285 B2 | 8/2006 | Ellerbrock et al. |
| 7,096,465 B1 | 8/2006 | Dardinski et al. |
| 7,099,965 B2 | 8/2006 | Ellerbrock et al. |
| 7,100,382 B2 | 9/2006 | Butler et al. |
| 7,103,000 B1 | 9/2006 | Rode et al. |
| 7,103,016 B1 | 9/2006 | Duffy et al. |
| 7,103,420 B2 | 9/2006 | Brown et al. |
| 7,110,835 B2 | 9/2006 | Blevins et al. |
| 7,114,088 B2 | 9/2006 | Horbelt |
| 7,114,554 B2 | 10/2006 | Bergman et al. |
| 7,117,050 B2 | 10/2006 | Sasaki et al. |
| 7,117,051 B2 | 10/2006 | Landry et al. |
| 7,117,395 B2 | 10/2006 | Opaterny |
| 7,120,036 B2 | 10/2006 | Kyono |
| 7,123,428 B2 | 10/2006 | Yeo et al. |
| 7,123,774 B2 | 10/2006 | Dhavala et al. |
| 7,127,305 B1 | 10/2006 | Palmon |
| 7,127,327 B1 | 10/2006 | O'Donnell |
| 7,130,409 B2 | 10/2006 | Beyda |
| 7,130,719 B2 | 10/2006 | Ehlers et al. |
| 7,133,407 B2 | 11/2006 | Jinzaki et al. |
| 7,133,748 B2 | 11/2006 | Robinson |
| 7,133,749 B2 | 11/2006 | Goldberg et al. |
| 7,135,982 B2 | 11/2006 | Lee |
| 7,139,550 B2 | 11/2006 | Cuellar et al. |
| 7,142,948 B2 | 11/2006 | Metz |
| 7,146,230 B2 | 12/2006 | Glanzer et al. |
| 7,146,231 B2 | 12/2006 | Schleiss et al. |
| 7,146,253 B2 | 12/2006 | Hoog et al. |
| 7,150,408 B2 | 12/2006 | DeLuca |
| 7,154,866 B2 | 12/2006 | Shurmantine et al. |
| 7,155,318 B2 | 12/2006 | Sharma et al. |
| 7,155,499 B2 | 12/2006 | Soemo et al. |
| 7,156,316 B2 | 1/2007 | Kates |
| 7,162,512 B1 | 1/2007 | Amit et al. |
| 7,162,883 B2 | 1/2007 | Jayanth et al. |
| 7,163,156 B2 | 1/2007 | Kates |
| 7,163,158 B2 | 1/2007 | Rossi et al. |
| 7,167,762 B2 | 1/2007 | Glanzer et al. |
| 7,168,627 B2 | 1/2007 | Kates |
| 7,171,579 B2 | 1/2007 | Weigl et al. |
| 7,172,132 B2 | 2/2007 | Proffitt et al. |
| 7,172,160 B2 | 2/2007 | Piel et al. |
| 7,174,239 B2 | 2/2007 | Butler et al. |
| 7,174,728 B2 | 2/2007 | Jayanth |
| 7,175,086 B2 | 2/2007 | Gascoyne et al. |
| 7,175,098 B2 | 2/2007 | DeLuca |
| 7,177,926 B2 | 2/2007 | Kramer |
| 7,181,317 B2 | 2/2007 | Amundson et al. |
| 7,185,262 B2 | 2/2007 | Barthel et al. |
| 7,186,290 B2 | 3/2007 | Sheehan et al. |
| 7,187,354 B2 | 3/2007 | Min et al. |
| 7,187,986 B2 | 3/2007 | Johnson et al. |
| 7,188,002 B2 | 3/2007 | Chapman, Jr. et al. |
| 7,188,207 B2 | 3/2007 | Mitter |
| 7,188,482 B2 | 3/2007 | Sadegh et al. |
| 7,188,779 B2 | 3/2007 | Alles |
| 7,191,028 B2 | 3/2007 | Nomura et al. |
| 7,194,663 B2 | 3/2007 | Fletcher et al. |
| 7,195,211 B2 | 3/2007 | Kande et al. |
| 7,197,717 B2 | 3/2007 | Anderson et al. |
| 7,200,450 B2 | 4/2007 | Boyer et al. |
| 7,203,165 B1 | 4/2007 | Kowalewski |
| 7,203,575 B2 | 4/2007 | Maturana et al. |
| 7,203,776 B2 | 4/2007 | Junger et al. |
| 7,206,646 B2 | 4/2007 | Nixon et al. |
| 7,206,647 B2 | 4/2007 | Kumar |
| 7,209,485 B2 | 4/2007 | Guse |
| 7,209,748 B2 | 4/2007 | Wong et al. |
| 7,212,825 B2 | 5/2007 | Wong et al. |
| 7,213,044 B2 | 5/2007 | Tjong et al. |
| 7,216,016 B2 | 5/2007 | Van Ostrand et al. |
| 7,216,017 B2 | 5/2007 | Kwon et al. |
| 7,216,497 B2 | 5/2007 | Hull et al. |
| 7,218,589 B2 | 5/2007 | Wisnudel et al. |
| 7,218,996 B1 | 5/2007 | Beitelmal et al. |
| 7,219,141 B2 | 5/2007 | Bonasia et al. |
| 7,222,111 B1 | 5/2007 | Budke, Jr. |
| 7,222,152 B1 | 5/2007 | Thompson et al. |
| 7,222,493 B2 | 5/2007 | Jayanth et al. |
| 7,222,494 B2 | 5/2007 | Peterson et al. |
| 7,224,366 B2 | 5/2007 | Kessler et al. |
| 7,225,054 B2 | 5/2007 | Amundson et al. |
| 7,225,356 B2 | 5/2007 | Monitzer |
| 7,228,187 B2 | 6/2007 | Ticky et al. |
| 7,232,058 B2 | 6/2007 | Lee |
| 7,233,229 B2 | 6/2007 | Stroupe et al. |
| 7,239,623 B2 | 7/2007 | Burghardt et al. |
| 7,242,988 B1 | 7/2007 | Hoffberg et al. |
| 7,243,004 B2 | 7/2007 | Shah et al. |
| 7,244,294 B2 | 7/2007 | Kates |
| 7,246,753 B2 | 7/2007 | Hull et al. |
| 7,248,576 B2 | 7/2007 | Hoffmann |
| 7,251,534 B2 | 7/2007 | Walls et al. |
| 7,257,813 B1 | 8/2007 | Mayer et al. |

(56) References Cited

U.S. PATENT DOCUMENTS

| | | |
|---|---|---|
| 7,259,666 B1 | 8/2007 | Hermsmeyer et al. |
| 7,260,084 B2 | 8/2007 | Saller |
| 7,260,451 B2 | 8/2007 | Takai et al. |
| 7,260,609 B2 | 8/2007 | Fuehrer et al. |
| 7,260,948 B2 | 8/2007 | Jayanth et al. |
| 7,261,241 B2 | 8/2007 | Eoga |
| 7,261,243 B2 | 8/2007 | Butler et al. |
| 7,261,762 B2 | 8/2007 | Kang et al. |
| 7,266,775 B2 | 9/2007 | Patitucci |
| 7,266,960 B2 | 9/2007 | Shah |
| 7,269,962 B2 | 9/2007 | Bachmann |
| 7,272,154 B2 | 9/2007 | Loebig |
| 7,272,452 B2 | 9/2007 | Coogan et al. |
| 7,272,457 B2 | 9/2007 | Glanzer et al. |
| 7,274,972 B2 | 9/2007 | Amundson et al. |
| 7,274,973 B2 | 9/2007 | Nichols et al. |
| 7,277,280 B2 | 10/2007 | Peng |
| 7,277,970 B2 | 10/2007 | Ellerbrock et al. |
| 7,278,103 B1 | 10/2007 | Clark et al. |
| 7,281,697 B2 | 10/2007 | Reggiani |
| 7,287,062 B2 | 10/2007 | Im et al. |
| 7,287,708 B2 | 10/2007 | Lucas et al. |
| 7,287,709 B2 | 10/2007 | Proffitt et al. |
| 7,289,458 B2 | 10/2007 | Gila et al. |
| 7,292,900 B2 | 11/2007 | Kreidler et al. |
| 7,293,422 B2 | 11/2007 | Parachini et al. |
| 7,295,099 B2 | 11/2007 | Lee et al. |
| 7,296,426 B2 | 11/2007 | Butler et al. |
| 7,299,279 B2 | 11/2007 | Sadaghiany |
| 7,299,996 B2 | 11/2007 | Garrett et al. |
| 7,301,699 B2 | 11/2007 | Kanamori et al. |
| 7,302,642 B2 | 11/2007 | Smith et al. |
| 7,305,495 B2 | 12/2007 | Carter |
| 7,306,165 B2 | 12/2007 | Shah |
| 7,310,559 B2 | 12/2007 | Walko, Jr. |
| 7,313,465 B1 | 12/2007 | O'Donnell |
| 7,313,716 B2 | 12/2007 | Weigl et al. |
| 7,313,923 B2 | 1/2008 | Jayanth et al. |
| 7,315,768 B2 | 1/2008 | Dang et al. |
| 7,317,970 B2 | 1/2008 | Pienta et al. |
| 7,318,089 B1 | 1/2008 | Stachura et al. |
| 7,320,110 B2 | 1/2008 | Shah |
| 7,324,874 B2 | 1/2008 | Jung |
| 7,327,376 B2 | 2/2008 | Shen et al. |
| 7,327,815 B1 | 2/2008 | Jurisch |
| 7,330,512 B2 | 2/2008 | Frank et al. |
| 7,331,191 B2 | 2/2008 | He et al. |
| 7,334,161 B2 | 2/2008 | Williams et al. |
| 7,336,650 B2 | 2/2008 | Franz et al. |
| 7,337,191 B2 | 2/2008 | Haeberle et al. |
| 7,337,369 B2 | 2/2008 | Barthel et al. |
| 7,337,619 B2 | 3/2008 | Hsieh et al. |
| 7,343,226 B2 | 3/2008 | Ehlers et al. |
| 7,346,404 B2 | 3/2008 | Eryurek et al. |
| 7,346,433 B2 | 3/2008 | Budike, Jr. |
| 7,346,835 B1 | 3/2008 | Lobinger et al. |
| 7,349,761 B1 | 3/2008 | Cruse |
| 7,354,005 B2 | 4/2008 | Carey et al. |
| 7,356,050 B2 | 4/2008 | Reindl et al. |
| 7,359,335 B2 | 4/2008 | Knop et al. |
| 7,359,345 B2 | 4/2008 | Chang et al. |
| 7,360,002 B2 | 4/2008 | Brueckner et al. |
| 7,360,370 B2 | 4/2008 | Shah et al. |
| 7,360,717 B2 | 4/2008 | Shah |
| 7,364,093 B2 | 4/2008 | Garozzo |
| 7,365,812 B2 | 4/2008 | Lee |
| 7,366,498 B2 | 4/2008 | Ko et al. |
| 7,366,944 B2 | 4/2008 | Oshins et al. |
| 7,370,074 B2 | 5/2008 | Alexander et al. |
| 7,377,450 B2 | 5/2008 | Van Ostrand et al. |
| 7,379,791 B2 | 5/2008 | Tamarkin et al. |
| 7,379,997 B2 | 5/2008 | Ehlers et al. |
| 7,383,158 B2 | 6/2008 | Krocker et al. |
| 7,389,150 B2 | 6/2008 | Inoue et al. |
| 7,389,204 B2 | 6/2008 | Eryurek et al. |
| RE40,437 E | 7/2008 | Rosen |
| 7,392,661 B2 | 7/2008 | Alles |
| 7,395,122 B2 | 7/2008 | Kreidler et al. |
| 7,395,137 B2 | 7/2008 | Robinson |
| 7,403,128 B2 | 7/2008 | Scuka et al. |
| 7,412,839 B2 | 8/2008 | Jayanth |
| 7,412,842 B2 | 8/2008 | Pham |
| 7,418,428 B2 | 8/2008 | Ehlers et al. |
| 7,424,345 B2 | 9/2008 | Norbeck |
| D578,026 S | 10/2008 | Roher et al. |
| 7,433,740 B2 | 10/2008 | Hesse et al. |
| 7,434,744 B2 | 10/2008 | Garozzo et al. |
| 7,436,292 B2 | 10/2008 | Rourke et al. |
| 7,436,293 B2 | 10/2008 | Rourke et al. |
| 7,436,296 B2 | 10/2008 | Rourke et al. |
| 7,436,400 B2 | 10/2008 | Cheng |
| 7,437,198 B2 | 10/2008 | Iwaki |
| 7,439,862 B2 | 10/2008 | Quan |
| 7,441,094 B2 | 10/2008 | Stephens |
| 7,446,660 B2 | 11/2008 | Posamentier |
| 7,448,435 B2 | 11/2008 | Garozzo |
| 7,451,937 B2 | 11/2008 | Flood et al. |
| 7,454,269 B1 | 11/2008 | Dushane et al. |
| 7,455,240 B2 | 11/2008 | Chapman, Jr. et al. |
| 7,457,853 B1 | 11/2008 | Chari et al. |
| 7,460,933 B2 | 12/2008 | Chapman, Jr. et al. |
| 7,476,988 B2 | 1/2009 | Mulhouse et al. |
| 7,516,106 B2 | 4/2009 | Ehlers et al. |
| 7,526,364 B2 | 4/2009 | Rule et al. |
| 7,567,523 B2 | 7/2009 | Black et al. |
| 7,567,844 B2 | 7/2009 | Thomas et al. |
| 7,571,195 B2 | 8/2009 | Billingsley et al. |
| 7,571,355 B2 | 8/2009 | Shabalin |
| 7,574,871 B2 | 8/2009 | Bloemer et al. |
| 7,584,897 B2 | 9/2009 | Schultz et al. |
| 7,587,459 B2 | 9/2009 | Wewalaarachchi |
| 7,593,124 B1 | 9/2009 | Sheng et al. |
| 7,593,787 B2 | 9/2009 | Feingold et al. |
| 7,604,046 B2 | 10/2009 | Bergman et al. |
| 7,624,931 B2 | 12/2009 | Chapman et al. |
| 7,641,126 B2 | 1/2010 | Schultz et al. |
| 7,650,323 B2 | 1/2010 | Hesse et al. |
| D610,475 S | 2/2010 | Beers et al. |
| 7,693,583 B2 | 4/2010 | Wolff et al. |
| 7,693,591 B2 | 4/2010 | Hoglund et al. |
| 7,706,923 B2 | 4/2010 | Amundson et al. |
| 7,730,223 B1 | 6/2010 | Bavor et al. |
| 7,734,572 B2 | 6/2010 | Wiemeyer et al. |
| 7,743,124 B2 | 6/2010 | Holdaway et al. |
| 7,747,757 B2 | 6/2010 | Garglulo et al. |
| 7,752,289 B2 | 7/2010 | Kikkawa et al. |
| 7,761,563 B2 | 7/2010 | Shike et al. |
| 7,774,102 B2 | 8/2010 | Butler et al. |
| 7,797,349 B2 | 9/2010 | Kosaka |
| 7,809,472 B1 | 10/2010 | Silva et al. |
| 7,827,963 B2 | 11/2010 | Li et al. |
| 7,847,790 B2 | 12/2010 | Bewley et al. |
| 7,861,941 B2 | 1/2011 | Schultz et al. |
| 7,870,080 B2 | 1/2011 | Budike, Jr. |
| 7,886,166 B2 | 2/2011 | Shnekendorf et al. |
| 7,898,147 B2 | 3/2011 | Grabinger et al. |
| 7,904,209 B2 | 3/2011 | Podgorny et al. |
| 7,934,504 B2 | 5/2011 | Lowe et al. |
| 7,949,615 B2 | 5/2011 | Ehlers et al. |
| 7,963,454 B2 | 6/2011 | Sullivan et al. |
| D642,081 S | 7/2011 | Kashimoto |
| 7,979,164 B2 | 7/2011 | Garozzo et al. |
| 8,005,576 B2 | 8/2011 | Rodgers |
| 8,024,054 B2 | 9/2011 | Mairs et al. |
| 8,032,254 B2 | 10/2011 | Amundson et al. |
| 8,042,049 B2 | 10/2011 | Killian et al. |
| D648,641 S | 11/2011 | Wallaert |
| D648,642 S | 11/2011 | Wallaert |
| 8,050,801 B2 | 11/2011 | Richards et al. |
| 8,082,068 B2 | 12/2011 | Rodgers |
| 8,083,154 B2 | 12/2011 | Schultz et al. |
| 8,087,593 B2 | 1/2012 | Leen |
| 8,091,796 B2 | 1/2012 | Amundson et al. |
| 8,099,178 B2 | 1/2012 | Mairs et al. |

(56) References Cited

U.S. PATENT DOCUMENTS

| | | |
|---|---|---|
| 8,103,390 B2 | 1/2012 | Rodgers |
| 8,112,181 B2 | 2/2012 | Remsburg |
| 8,116,917 B2 | 2/2012 | Rodgers |
| 8,122,110 B1 | 2/2012 | Wilbur et al. |
| 8,127,060 B2 | 2/2012 | Doll et al. |
| 8,167,216 B2 | 5/2012 | Schultz et al. |
| 8,183,995 B2 | 5/2012 | Wang et al. |
| 8,219,249 B2 | 7/2012 | Harrod et al. |
| 8,224,491 B2 | 7/2012 | Koster et al. |
| 8,239,066 B2 | 8/2012 | Jennings et al. |
| 8,239,073 B2 | 8/2012 | Fausak et al. |
| 8,244,383 B2 | 8/2012 | Bergman et al. |
| 8,255,086 B2 | 8/2012 | Grohman |
| 8,255,090 B2 | 8/2012 | Frader-Thompson |
| 8,352,081 B2 | 1/2013 | Grohman |
| 8,437,877 B2 | 5/2013 | Grohman |
| 8,452,906 B2 | 5/2013 | Grohman |
| 8,463,442 B2 | 6/2013 | Curry et al. |
| 8,463,443 B2 | 6/2013 | Grohman et al. |
| 8,548,630 B2 | 10/2013 | Grohman |
| 8,564,400 B2 | 10/2013 | Grohman |
| 2001/0025349 A1 | 9/2001 | Sharood et al. |
| 2001/0034586 A1 | 10/2001 | Ewert et al. |
| 2001/0048376 A1 | 12/2001 | Maeda et al. |
| 2001/0055311 A1 | 12/2001 | Trachewsky et al. |
| 2002/0002425 A1 | 1/2002 | Dossey et al. |
| 2002/0013897 A1 | 1/2002 | McTernan et al. |
| 2002/0016639 A1 | 2/2002 | Smith et al. |
| 2002/0022894 A1 | 2/2002 | Eryurek et al. |
| 2002/0026476 A1 | 2/2002 | Miyazaki et al. |
| 2002/0033252 A1 | 3/2002 | Sasao et al. |
| 2002/0048194 A1 | 4/2002 | Klein |
| 2002/0053047 A1 | 5/2002 | Gold |
| 2002/0072814 A1 | 6/2002 | Schuler et al. |
| 2002/0091784 A1 | 7/2002 | Baker et al. |
| 2002/0104323 A1 | 8/2002 | Rash et al. |
| 2002/0116550 A1 | 8/2002 | Hansen |
| 2002/0123896 A1 | 9/2002 | Diez et al. |
| 2002/0124211 A1 | 9/2002 | Gray et al. |
| 2002/0143523 A1 | 10/2002 | Balaji et al. |
| 2002/0152298 A1 | 10/2002 | Kikta et al. |
| 2002/0157054 A1 | 10/2002 | Shin et al. |
| 2002/0163427 A1 | 11/2002 | Eryurek et al. |
| 2002/0178288 A1 | 11/2002 | McLeod |
| 2002/0190242 A1 | 12/2002 | lillie et al. |
| 2002/0191026 A1 | 12/2002 | Rodden et al. |
| 2002/0191603 A1 | 12/2002 | Shin et al. |
| 2002/0198990 A1 | 12/2002 | Bradfield et al. |
| 2003/0058863 A1 | 3/2003 | Oost |
| 2003/0061340 A1 | 3/2003 | Sun et al. |
| 2003/0078677 A1 | 4/2003 | Hull et al. |
| 2003/0088338 A1 | 5/2003 | Phillips et al. |
| 2003/0097482 A1 | 5/2003 | DeHart et al. |
| 2003/0108064 A1 | 6/2003 | Bilke et al. |
| 2003/0115177 A1 | 6/2003 | Takanabe et al. |
| 2003/0116637 A1 | 6/2003 | Ellingham |
| 2003/0154355 A1 | 8/2003 | Fernandez |
| 2003/0179721 A1 | 9/2003 | Shurmantine et al. |
| 2003/0206100 A1 | 11/2003 | Richman et al. |
| 2003/0229784 A1 | 12/2003 | Cuellar et al. |
| 2004/0001478 A1 | 1/2004 | Wong |
| 2004/0003051 A1 | 1/2004 | Krzyzanowski et al. |
| 2004/0003415 A1 | 1/2004 | Ng |
| 2004/0024483 A1* | 2/2004 | Holcombe ............... 700/122 |
| 2004/0025089 A1 | 2/2004 | Haswarey et al. |
| 2004/0039478 A1 | 2/2004 | Kiesel et al. |
| 2004/0059815 A1 | 3/2004 | Buckingham et al. |
| 2004/0066788 A1 | 4/2004 | Lin et al. |
| 2004/0088069 A1 | 5/2004 | Singh |
| 2004/0095237 A1 | 5/2004 | Chen et al. |
| 2004/0104942 A1 | 6/2004 | Weigel |
| 2004/0107717 A1 | 6/2004 | Yoon et al. |
| 2004/0111186 A1 | 6/2004 | Rossi et al. |
| 2004/0111254 A1 | 6/2004 | Gogel et al. |
| 2004/0117330 A1 | 6/2004 | Ehlers et al. |
| 2004/0133314 A1 | 7/2004 | Ehlers et al. |
| 2004/0133704 A1 | 7/2004 | Krzyanowski |
| 2004/0138981 A1 | 7/2004 | Ehlers et al. |
| 2004/0139038 A1 | 7/2004 | Ehlers et al. |
| 2004/0143360 A1 | 7/2004 | Kiesel et al. |
| 2004/0146008 A1 | 7/2004 | Conradt et al. |
| 2004/0148482 A1 | 7/2004 | Grundy et al. |
| 2004/0156360 A1 | 8/2004 | Sexton et al. |
| 2004/0159112 A1 | 8/2004 | Jayanth et al. |
| 2004/0189590 A1 | 9/2004 | Mehaffey et al. |
| 2004/0204775 A1 | 10/2004 | Keyes et al. |
| 2004/0205781 A1 | 10/2004 | Hill et al. |
| 2004/0206096 A1 | 10/2004 | Jayanth |
| 2004/0210348 A1 | 10/2004 | Imhof et al. |
| 2004/0218591 A1 | 11/2004 | Ogawa et al. |
| 2004/0222307 A1 | 11/2004 | DeLuca |
| 2004/0236471 A1 | 11/2004 | Poth |
| 2004/0245352 A1 | 12/2004 | Smith |
| 2004/0260427 A1 | 12/2004 | Wimsatt |
| 2004/0260812 A1 | 12/2004 | Rhodes et al. |
| 2004/0260927 A1 | 12/2004 | Grobman |
| 2004/0266491 A1 | 12/2004 | Howard et al. |
| 2004/0267385 A1 | 12/2004 | Lingemann |
| 2004/0267395 A1 | 12/2004 | Discenzo et al. |
| 2004/0267790 A1 | 12/2004 | Pak et al. |
| 2005/0005249 A1 | 1/2005 | Hill et al. |
| 2005/0007249 A1 | 1/2005 | Eryurek et al. |
| 2005/0010759 A1 | 1/2005 | Wakiyama |
| 2005/0033707 A1 | 2/2005 | Ehlers et al. |
| 2005/0034023 A1 | 2/2005 | Maturana et al. |
| 2005/0040247 A1* | 2/2005 | Pouchak ............... 236/44 C |
| 2005/0040250 A1 | 2/2005 | Wruck |
| 2005/0041033 A1 | 2/2005 | Hilts et al. |
| 2005/0041633 A1 | 2/2005 | Roeser et al. |
| 2005/0046584 A1 | 3/2005 | Breed |
| 2005/0051168 A1 | 3/2005 | DeVries et al. |
| 2005/0054381 A1 | 3/2005 | Lee et al. |
| 2005/0055427 A1 | 3/2005 | Frutiger et al. |
| 2005/0068978 A1 | 3/2005 | Sexton et al. |
| 2005/0073789 A1 | 4/2005 | Tanis |
| 2005/0076150 A1 | 4/2005 | Lee et al. |
| 2005/0080879 A1 | 4/2005 | Kim et al. |
| 2005/0081156 A1 | 4/2005 | Clark et al. |
| 2005/0081157 A1 | 4/2005 | Clark et al. |
| 2005/0090915 A1 | 4/2005 | Gelwitz |
| 2005/0096872 A1 | 5/2005 | Blevins et al. |
| 2005/0097478 A1 | 5/2005 | Killian et al. |
| 2005/0103874 A1 | 5/2005 | Erdman |
| 2005/0109048 A1 | 5/2005 | Lee |
| 2005/0115254 A1 | 6/2005 | Knight et al. |
| 2005/0116023 A1 | 6/2005 | Amundson et al. |
| 2005/0118996 A1 | 6/2005 | Lee et al. |
| 2005/0119765 A1 | 6/2005 | Bergman |
| 2005/0119766 A1 | 6/2005 | Amundson et al. |
| 2005/0119771 A1 | 6/2005 | Amundson et al. |
| 2005/0119793 A1 | 6/2005 | Amundson et al. |
| 2005/0119794 A1 | 6/2005 | Amundson et al. |
| 2005/0120012 A1 | 6/2005 | Poth et al. |
| 2005/0125495 A1 | 6/2005 | Tjong et al. |
| 2005/0143138 A1 | 6/2005 | Lee et al. |
| 2005/0145705 A1 | 7/2005 | Shah et al. |
| 2005/0150967 A1 | 7/2005 | Chapman, Jr. et al. |
| 2005/0154494 A1 | 7/2005 | Ahmed |
| 2005/0159848 A1 | 7/2005 | Shah et al. |
| 2005/0159924 A1 | 7/2005 | Shah et al. |
| 2005/0161517 A1 | 7/2005 | Helt et al. |
| 2005/0166610 A1 | 8/2005 | Jayanth |
| 2005/0176410 A1 | 8/2005 | Brooking et al. |
| 2005/0182498 A1 | 8/2005 | Landou et al. |
| 2005/0192727 A1 | 9/2005 | Shostak et al. |
| 2005/0193155 A1 | 9/2005 | Fujita |
| 2005/0198040 A1 | 9/2005 | Cohen et al. |
| 2005/0223339 A1 | 10/2005 | Lee |
| 2005/0229610 A1 | 10/2005 | Park et al. |
| 2005/0235661 A1 | 10/2005 | Pham |
| 2005/0235662 A1 | 10/2005 | Pham |
| 2005/0235663 A1 | 10/2005 | Pham |
| 2005/0235666 A1 | 10/2005 | Springer et al. |
| 2005/0240312 A1 | 10/2005 | Terry et al. |

(56) References Cited

U.S. PATENT DOCUMENTS

| | | |
|---|---|---|
| 2005/0252673 A1 | 11/2005 | Kregle et al. |
| 2005/0256591 A1 | 11/2005 | Rule et al. |
| 2005/0256935 A1 | 11/2005 | Overstreet et al. |
| 2005/0258257 A1 | 11/2005 | Thurman, Jr. et al. |
| 2005/0258259 A1 | 11/2005 | Stanimirovic |
| 2005/0270151 A1 | 12/2005 | Winick |
| 2005/0278071 A1 | 12/2005 | Durham |
| 2005/0280364 A1 | 12/2005 | Omura et al. |
| 2005/0281368 A1 | 12/2005 | Droba et al. |
| 2005/0288823 A1 | 12/2005 | Hesse et al. |
| 2006/0006244 A1 | 1/2006 | Morrow et al. |
| 2006/0009861 A1 | 1/2006 | Bonasa |
| 2006/0009863 A1 | 1/2006 | Lingemann |
| 2006/0021358 A1 | 2/2006 | Nallapa |
| 2006/0021359 A1 | 2/2006 | Hur et al. |
| 2006/0027671 A1 | 2/2006 | Shah |
| 2006/0030954 A1 | 2/2006 | Bergman et al. |
| 2006/0036350 A1 | 2/2006 | Bohrer et al. |
| 2006/0036952 A1 | 2/2006 | Yang |
| 2006/0041898 A1 | 2/2006 | Potyrailo et al. |
| 2006/0045107 A1 | 3/2006 | Kucenas et al. |
| 2006/0048064 A1 | 3/2006 | Vronay |
| 2006/0058924 A1 | 3/2006 | Shah |
| 2006/0063523 A1 | 3/2006 | McFarland et al. |
| 2006/0090142 A1 | 4/2006 | Glasgow et al. |
| 2006/0090483 A1 | 5/2006 | Kim et al. |
| 2006/0091227 A1 | 5/2006 | Attridge, Jr. |
| 2006/0092977 A1 | 5/2006 | Bai et al. |
| 2006/0105697 A1 | 5/2006 | Aronstam et al. |
| 2006/0106791 A1 | 5/2006 | Morrow et al. |
| 2006/0108432 A1 | 5/2006 | Mattheis |
| 2006/0111816 A1 | 5/2006 | Spalink et al. |
| 2006/0130497 A1 | 6/2006 | Kang et al. |
| 2006/0144055 A1 | 7/2006 | Ahn |
| 2006/0144232 A1 | 7/2006 | Kang et al. |
| 2006/0149414 A1 | 7/2006 | Archacki, Jr. et al. |
| 2006/0150027 A1 | 7/2006 | Paden |
| 2006/0153247 A1 | 7/2006 | Stumer |
| 2006/0155398 A1 | 7/2006 | Hoffberg et al. |
| 2006/0158051 A1 | 7/2006 | Bartlett et al. |
| 2006/0159007 A1 | 7/2006 | Frutiger et al. |
| 2006/0168522 A1 | 7/2006 | Bala |
| 2006/0185818 A1 | 8/2006 | Garozzo |
| 2006/0186214 A1 | 8/2006 | Simon et al. |
| 2006/0190138 A1 | 8/2006 | Stone et al. |
| 2006/0192021 A1 | 8/2006 | Schultz et al. |
| 2006/0192022 A1 | 8/2006 | Barton et al. |
| 2006/0196953 A1 | 9/2006 | Simon et al. |
| 2006/0200253 A1 | 9/2006 | Hoffberg et al. |
| 2006/0200258 A1 | 9/2006 | Hoffberg et al. |
| 2006/0200259 A1 | 9/2006 | Hoffberg et al. |
| 2006/0200260 A1 | 9/2006 | Hoffberg et al. |
| 2006/0202978 A1 | 9/2006 | Lee et al. |
| 2006/0206220 A1 | 9/2006 | Amundson |
| 2006/0209208 A1 | 9/2006 | Kim et al. |
| 2006/0212194 A1 | 9/2006 | Breed |
| 2006/0219799 A1 | 10/2006 | Schultz et al. |
| 2006/0229090 A1 | 10/2006 | LaDue |
| 2006/0235548 A1 | 10/2006 | Gaudette |
| 2006/0236351 A1 | 10/2006 | Ellerbrock et al. |
| 2006/0239296 A1 | 10/2006 | Jinzaki et al. |
| 2006/0248233 A1 | 11/2006 | Park et al. |
| 2006/0250578 A1 | 11/2006 | Pohl et al. |
| 2006/0250979 A1 | 11/2006 | Gauweiler et al. |
| 2006/0267756 A1 | 11/2006 | Kates |
| 2006/0276917 A1 | 12/2006 | Li et al. |
| 2007/0005191 A1 | 1/2007 | Sloup et al. |
| 2007/0008116 A1 | 1/2007 | Bergman et al. |
| 2007/0012052 A1* | 1/2007 | Butler et al. .................... 62/181 |
| 2007/0013534 A1 | 1/2007 | DiMaggio |
| 2007/0014233 A1 | 1/2007 | Oguro et al. |
| 2007/0016311 A1 | 1/2007 | Bergman et al. |
| 2007/0016476 A1 | 1/2007 | Hoffberg et al. |
| 2007/0019683 A1 | 1/2007 | Kryzyanowski |
| 2007/0025368 A1 | 2/2007 | Ha et al. |
| 2007/0032909 A1 | 2/2007 | Tolbert, Jr. et al. |
| 2007/0033310 A1 | 2/2007 | Kweon |
| 2007/0035255 A1 | 2/2007 | Shuster et al. |
| 2007/0040040 A1 | 2/2007 | Mueller |
| 2007/0043477 A1 | 2/2007 | Ehlers et al. |
| 2007/0043478 A1 | 2/2007 | Ehlers et al. |
| 2007/0045429 A1 | 3/2007 | Chapman, Jr. et al. |
| 2007/0045431 A1 | 3/2007 | Chapman, Jr. et al. |
| 2007/0045442 A1 | 3/2007 | Chapman, Jr. et al. |
| 2007/0051818 A1 | 3/2007 | Atlas |
| 2007/0053513 A1 | 3/2007 | Hoffberg |
| 2007/0055407 A1 | 3/2007 | Goldberg et al. |
| 2007/0055757 A1 | 3/2007 | Mairs et al. |
| 2007/0067062 A1 | 3/2007 | Mairs et al. |
| 2007/0067496 A1 | 3/2007 | Deiretsbacher et al. |
| 2007/0073973 A1 | 3/2007 | Hazay |
| 2007/0080235 A1 | 4/2007 | Fulton, Jr. |
| 2007/0083721 A1 | 4/2007 | Grinspan |
| 2007/0084937 A1 | 4/2007 | Ahmed |
| 2007/0088883 A1 | 4/2007 | Wakabayashi |
| 2007/0089090 A1 | 4/2007 | Riedl et al. |
| 2007/0090199 A1 | 4/2007 | Hull et al. |
| 2007/0093226 A1 | 4/2007 | Foltyn et al. |
| 2007/0097993 A1 | 5/2007 | Bojahra et al. |
| 2007/0102149 A1 | 5/2007 | Kates |
| 2007/0109114 A1 | 5/2007 | Farley et al. |
| 2007/0109975 A1 | 5/2007 | Reckamp et al. |
| 2007/0113247 A1 | 5/2007 | Kwak |
| 2007/0114291 A1 | 5/2007 | Pouchak |
| 2007/0119957 A1 | 5/2007 | Kates |
| 2007/0119958 A1 | 5/2007 | Kates |
| 2007/0129820 A1 | 6/2007 | Glanzer et al. |
| 2007/0129825 A1 | 6/2007 | Kargenian |
| 2007/0129826 A1 | 6/2007 | Kreidler et al. |
| 2007/0129917 A1 | 6/2007 | Blevins et al. |
| 2007/0130834 A1 | 6/2007 | Kande et al. |
| 2007/0130969 A1 | 6/2007 | Peterson et al. |
| 2007/0131784 A1 | 6/2007 | Garozzo et al. |
| 2007/0135692 A1 | 6/2007 | Hwang et al. |
| 2007/0135946 A1 | 6/2007 | Sugiyama et al. |
| 2007/0136669 A1 | 6/2007 | Kwon et al. |
| 2007/0136687 A1 | 6/2007 | Pak |
| 2007/0138307 A1 | 6/2007 | Khoo |
| 2007/0138308 A1 | 6/2007 | Schultz et al. |
| 2007/0143704 A1 | 6/2007 | Laird-McConnell |
| 2007/0143707 A1 | 6/2007 | Yun et al. |
| 2007/0157016 A1 | 7/2007 | Dayan et al. |
| 2007/0158442 A1 | 7/2007 | Chapman, Jr. et al. |
| 2007/0168887 A1 | 7/2007 | Lee |
| 2007/0177505 A1 | 8/2007 | Charrua et al. |
| 2007/0191024 A1 | 8/2007 | Kim et al. |
| 2007/0192731 A1 | 8/2007 | Townsend et al. |
| 2007/0194138 A9 | 8/2007 | Shah |
| 2007/0204637 A1 | 9/2007 | Fujii et al. |
| 2007/0205297 A1 | 9/2007 | Finkam et al. |
| 2007/0205916 A1 | 9/2007 | Blom et al. |
| 2007/0208461 A1 | 9/2007 | Chase |
| 2007/0208549 A1 | 9/2007 | Blevins et al. |
| 2007/0213853 A1 | 9/2007 | Glanzer et al. |
| 2007/0219645 A1 | 9/2007 | Thomas et al. |
| 2007/0220301 A1 | 9/2007 | Brundridge et al. |
| 2007/0220907 A1 | 9/2007 | Ehlers |
| 2007/0221741 A1 | 9/2007 | Wagner et al. |
| 2007/0223500 A1 | 9/2007 | Lee et al. |
| 2007/0225868 A1 | 9/2007 | Terlson et al. |
| 2007/0225869 A1 | 9/2007 | Amundson et al. |
| 2007/0233323 A1 | 10/2007 | Wiemeyer et al. |
| 2007/0236156 A1 | 10/2007 | Lys et al. |
| 2007/0237032 A1 | 10/2007 | Rhee et al. |
| 2007/0238413 A1 | 10/2007 | Coutts |
| 2007/0239658 A1 | 10/2007 | Cunningham et al. |
| 2007/0240226 A1 | 10/2007 | Song et al. |
| 2007/0241203 A1 | 10/2007 | Wagner et al. |
| 2007/0242058 A1 | 10/2007 | Yamada |
| 2007/0245306 A1 | 10/2007 | Dameshek et al. |
| 2007/0257120 A1 | 11/2007 | Chapman, Jr. et al. |
| 2007/0257121 A1 | 11/2007 | Chapman et al. |
| 2007/0260782 A1 | 11/2007 | Shaikli |
| 2007/0260978 A1 | 11/2007 | Oh et al. |

(56) References Cited

U.S. PATENT DOCUMENTS

| | | |
|---|---|---|
| 2007/0266329 A1 | 11/2007 | Gaudette |
| 2007/0268667 A1 | 11/2007 | Moorer et al. |
| 2007/0271521 A1 | 11/2007 | Harriger et al. |
| 2007/0274093 A1 | 11/2007 | Haim et al. |
| 2007/0277013 A1 | 11/2007 | Rexha et al. |
| 2007/0278320 A1 | 12/2007 | Lunacek et al. |
| 2007/0284452 A1 | 12/2007 | Butler et al. |
| 2007/0299857 A1 | 12/2007 | Gwozdz et al. |
| 2007/0300064 A1 | 12/2007 | Isaacs et al. |
| 2008/0003845 A1 | 1/2008 | Hong et al. |
| 2008/0004727 A1 | 1/2008 | Glanzer et al. |
| 2008/0005428 A1 | 1/2008 | Maul et al. |
| 2008/0006709 A1 | 1/2008 | Ashworth et al. |
| 2008/0012437 A1 | 1/2008 | Kabata et al. |
| 2008/0013259 A1 | 1/2008 | Barton et al. |
| 2008/0029610 A1 | 2/2008 | Nichols |
| 2008/0031147 A1 | 2/2008 | Fieremans et al. |
| 2008/0040351 A1 | 2/2008 | Jin et al. |
| 2008/0048045 A1 | 2/2008 | Butler et al. |
| 2008/0048046 A1 | 2/2008 | Wagner et al. |
| 2008/0054082 A1 | 3/2008 | Evans et al. |
| 2008/0055190 A1 | 3/2008 | Lee |
| 2008/0056722 A1 | 3/2008 | Hendrix et al. |
| 2008/0057872 A1 | 3/2008 | McFarland et al. |
| 2008/0057931 A1 | 3/2008 | Nass et al. |
| 2008/0058996 A1 | 3/2008 | Sachdev et al. |
| 2008/0059682 A1 | 3/2008 | Cooley et al. |
| 2008/0062892 A1 | 3/2008 | Dodgen et al. |
| 2008/0063006 A1 | 3/2008 | Nichols |
| 2008/0065926 A1 | 3/2008 | Poth et al. |
| 2008/0072704 A1 | 3/2008 | Clark et al. |
| 2008/0073440 A1 | 3/2008 | Butler et al. |
| 2008/0077884 A1 | 3/2008 | Patitucci |
| 2008/0077886 A1 | 3/2008 | Eichner |
| 2008/0082767 A1 | 4/2008 | Nulkar et al. |
| 2008/0083009 A1 | 4/2008 | Kaler et al. |
| 2008/0083834 A1 | 4/2008 | Krebs et al. |
| 2008/0097651 A1 | 4/2008 | Shah et al. |
| 2008/0104189 A1 | 5/2008 | Baker et al. |
| 2008/0114500 A1 | 5/2008 | Hull et al. |
| 2008/0120335 A1 | 5/2008 | Dolgoff |
| 2008/0121729 A1 | 5/2008 | Gray |
| 2008/0128523 A1 | 6/2008 | Hoglund et al. |
| 2008/0129475 A1 | 6/2008 | Breed et al. |
| 2008/0133033 A1 | 6/2008 | Wolff et al. |
| 2008/0133060 A1 | 6/2008 | Hoglund et al. |
| 2008/0133061 A1 | 6/2008 | Hoglund et al. |
| 2008/0134087 A1 | 6/2008 | Hoglund et al. |
| 2008/0134098 A1 | 6/2008 | Hoglund et al. |
| 2008/0144302 A1 | 6/2008 | Rosenblatt |
| 2008/0148098 A1 | 6/2008 | Chen |
| 2008/0157936 A1 | 7/2008 | Ebrom |
| 2008/0161976 A1 | 7/2008 | Stanimirovic |
| 2008/0161977 A1 | 7/2008 | Takach et al. |
| 2008/0161978 A1 | 7/2008 | Shah |
| 2008/0167931 A1 | 7/2008 | Gerstemeier et al. |
| 2008/0168255 A1 | 7/2008 | Abou-Emara et al. |
| 2008/0168356 A1 | 7/2008 | Eryurek et al. |
| 2008/0173035 A1 | 7/2008 | Thayer et al. |
| 2008/0183335 A1 | 7/2008 | Poth et al. |
| 2008/0184059 A1 | 7/2008 | Chen |
| 2008/0185976 A1 | 8/2008 | Dickey et al. |
| 2008/0186160 A1 | 8/2008 | Kim et al. |
| 2008/0192649 A1 | 8/2008 | Pyeon et al. |
| 2008/0195254 A1 | 8/2008 | Jung et al. |
| 2008/0195581 A1 | 8/2008 | Ashmore et al. |
| 2008/0195687 A1 | 8/2008 | Jung et al. |
| 2008/0198036 A1 | 8/2008 | Songkakul et al. |
| 2008/0215987 A1 | 9/2008 | Alexander et al. |
| 2008/0216461 A1 | 9/2008 | Nakano et al. |
| 2008/0217418 A1 | 9/2008 | Helt et al. |
| 2008/0217419 A1 | 9/2008 | Ehlers et al. |
| 2008/0223944 A1 | 9/2008 | Helt et al. |
| 2008/0235611 A1 | 9/2008 | Fraley et al. |
| 2008/0256475 A1 | 10/2008 | Amundson et al. |
| 2008/0264085 A1 | 10/2008 | Perry et al. |
| 2008/0272934 A1 | 11/2008 | Wang et al. |
| 2008/0281472 A1* | 11/2008 | Podgorny et al. ............ 700/276 |
| 2008/0294274 A1 | 11/2008 | Laberge et al. |
| 2008/0294932 A1 | 11/2008 | Oshins et al. |
| 2009/0001180 A1 | 1/2009 | Siddaramanna et al. |
| 2009/0001182 A1* | 1/2009 | Siddaramanna et al. ... 236/46 R |
| 2009/0009298 A1* | 1/2009 | Brissman et al. ......... 340/10.51 |
| 2009/0037142 A1* | 2/2009 | Kates ........................ 702/182 |
| 2009/0049847 A1 | 2/2009 | Butler et al. |
| 2009/0052105 A1 | 2/2009 | Soleimani et al. |
| 2009/0055002 A1 | 2/2009 | Anderson et al. |
| 2009/0057424 A1 | 3/2009 | Sullivan et al. |
| 2009/0057425 A1 | 3/2009 | Sullivan et al. |
| 2009/0065597 A1 | 3/2009 | Garozzo et al. |
| 2009/0077423 A1 | 3/2009 | Kim et al. |
| 2009/0094506 A1 | 4/2009 | Lakkis |
| 2009/0105846 A1 | 4/2009 | Hesse et al. |
| 2009/0113037 A1* | 4/2009 | Pouchak ....................... 709/224 |
| 2009/0119092 A1 | 5/2009 | Balasubramanyan |
| 2009/0132091 A1 | 5/2009 | Chambers et al. |
| 2009/0140056 A1 | 6/2009 | Leen |
| 2009/0140057 A1 | 6/2009 | Leen |
| 2009/0140058 A1 | 6/2009 | Koster et al. |
| 2009/0140061 A1 | 6/2009 | Schultz et al. |
| 2009/0140062 A1 | 6/2009 | Amundson et al. |
| 2009/0140063 A1 | 6/2009 | Koster et al. |
| 2009/0140064 A1 | 6/2009 | Schultz et al. |
| 2009/0143879 A1 | 6/2009 | Amundson et al. |
| 2009/0143880 A1 | 6/2009 | Amundson et al. |
| 2009/0143916 A1 | 6/2009 | Boll et al. |
| 2009/0143918 A1 | 6/2009 | Amundson et al. |
| 2009/0157529 A1 | 6/2009 | Ehlers et al. |
| 2009/0195349 A1 | 8/2009 | Frader-Thompson |
| 2009/0198810 A1 | 8/2009 | Bayer et al. |
| 2009/0245278 A1 | 10/2009 | Kee |
| 2009/0257431 A1 | 10/2009 | Ramanathan et al. |
| 2009/0259785 A1 | 10/2009 | Perry et al. |
| 2009/0261174 A1 | 10/2009 | Butler et al. |
| 2009/0261767 A1 | 10/2009 | Butler et al. |
| 2009/0266904 A1 | 10/2009 | Cohen |
| 2009/0267540 A1 | 10/2009 | Chemel et al. |
| 2009/0271001 A1* | 10/2009 | Westphal ............... G05B 15/02 700/3 |
| 2009/0271336 A1 | 10/2009 | Franks |
| 2009/0287736 A1 | 11/2009 | Shike et al. |
| 2010/0011437 A1 | 1/2010 | Courtney |
| 2010/0023865 A1 | 1/2010 | Fulker et al. |
| 2010/0050075 A1 | 2/2010 | Thorson et al. |
| 2010/0050108 A1 | 2/2010 | Mirza |
| 2010/0063644 A1 | 3/2010 | Kansal et al. |
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0070907 A1 | 3/2010 | Harrod et al. |
| 2010/0073159 A1 | 3/2010 | Schmickley et al. |
| 2010/0076605 A1 | 3/2010 | Harrod et al. |
| 2010/0100253 A1 | 4/2010 | Fausak et al. |
| 2010/0101854 A1 | 4/2010 | Wallaert et al. |
| 2010/0102136 A1 | 4/2010 | Hadzidedic et al. |
| 2010/0102948 A1 | 4/2010 | Grohman et al. |
| 2010/0102973 A1 | 4/2010 | Grohman et al. |
| 2010/0106305 A1 | 4/2010 | Pavlak et al. |
| 2010/0106307 A1 | 4/2010 | Grohman et al. |
| 2010/0106308 A1 | 4/2010 | Filbeck et al. |
| 2010/0106309 A1 | 4/2010 | Grohman et al. |
| 2010/0106310 A1 | 4/2010 | Grohman |
| 2010/0106311 A1 | 4/2010 | Wallaert |
| 2010/0106312 A1 | 4/2010 | Grohman et al. |
| 2010/0106313 A1 | 4/2010 | Grohman et al. |
| 2010/0106314 A1 | 4/2010 | Grohman et al. |
| 2010/0106315 A1 | 4/2010 | Grohman |
| 2010/0106316 A1 | 4/2010 | Curry et al. |
| 2010/0106317 A1 | 4/2010 | Grohman et al. |
| 2010/0106318 A1 | 4/2010 | Grohman et al. |
| 2010/0106319 A1 | 4/2010 | Grohman et al. |
| 2010/0106320 A1 | 4/2010 | Grohman et al. |
| 2010/0106321 A1 | 4/2010 | Hadzidedic |
| 2010/0106322 A1 | 4/2010 | Grohman |

(56) References Cited

U.S. PATENT DOCUMENTS

| | | |
|---|---|---|
| 2010/0106323 A1 | 4/2010 | Wallaert |
| 2010/0106324 A1 | 4/2010 | Grohman |
| 2010/0106325 A1 | 4/2010 | Grohman |
| 2010/0106326 A1 | 4/2010 | Grohman |
| 2010/0106327 A1 | 4/2010 | Grohman et al. |
| 2010/0106329 A1 | 4/2010 | Grohman |
| 2010/0106330 A1 | 4/2010 | Grohman |
| 2010/0106333 A1 | 4/2010 | Grohman et al. |
| 2010/0106334 A1 | 4/2010 | Grohman et al. |
| 2010/0106787 A1 | 4/2010 | Grohman |
| 2010/0106809 A1 | 4/2010 | Grohman |
| 2010/0106810 A1 | 4/2010 | Grohman |
| 2010/0106814 A1 | 4/2010 | Hadzidedic et al. |
| 2010/0106815 A1 | 4/2010 | Grohman et al. |
| 2010/0106925 A1 | 4/2010 | Grohman et al. |
| 2010/0106957 A1 | 4/2010 | Grohman et al. |
| 2010/0107007 A1 | 4/2010 | Grohman et al. |
| 2010/0107070 A1 | 4/2010 | Devineni et al. |
| 2010/0107071 A1 | 4/2010 | Pavlak et al. |
| 2010/0107072 A1 | 4/2010 | Mirza et al. |
| 2010/0107073 A1 | 4/2010 | Wallaert |
| 2010/0107074 A1 | 4/2010 | Pavlak et al. |
| 2010/0107076 A1 | 4/2010 | Grohman |
| 2010/0107083 A1 | 4/2010 | Grohman |
| 2010/0107103 A1 | 4/2010 | Wallaert |
| 2010/0107109 A1 | 4/2010 | Filbeck et al. |
| 2010/0107110 A1 | 4/2010 | Mirza |
| 2010/0107111 A1 | 4/2010 | Mirza |
| 2010/0107112 A1 | 4/2010 | Jennings et al. |
| 2010/0107232 A1 | 4/2010 | Grohman et al. |
| 2010/0115364 A1 | 5/2010 | Grohman |
| 2010/0131884 A1 | 5/2010 | Shah |
| 2010/0142526 A1 | 6/2010 | Wong |
| 2010/0145528 A1 | 6/2010 | Bergman et al. |
| 2010/0145629 A1 | 6/2010 | Botich et al. |
| 2010/0168924 A1 | 7/2010 | Tessier et al. |
| 2010/0169419 A1 | 7/2010 | DeVilbiss et al. |
| 2010/0179696 A1 | 7/2010 | Grohman et al. |
| 2010/0211546 A1 | 8/2010 | Grohman et al. |
| 2010/0241245 A1 | 9/2010 | Wiemeyer et al. |
| 2010/0259931 A1 | 10/2010 | Chemel et al. |
| 2010/0264846 A1 | 10/2010 | Chemel et al. |
| 2010/0270933 A1 | 10/2010 | Chemel et al. |
| 2010/0272102 A1 | 10/2010 | Kobayashi |
| 2010/0295474 A1 | 11/2010 | Chemel et al. |
| 2010/0295475 A1 | 11/2010 | Chemel et al. |
| 2010/0295482 A1 | 11/2010 | Chemel et al. |
| 2010/0301768 A1 | 12/2010 | Chemel et al. |
| 2010/0301769 A1 | 12/2010 | Chemel et al. |
| 2010/0301770 A1 | 12/2010 | Chemel et al. |
| 2010/0301771 A1 | 12/2010 | Chemel et al. |
| 2010/0301772 A1 | 12/2010 | Hahnlen et al. |
| 2010/0301773 A1 | 12/2010 | Chemel et al. |
| 2010/0301774 A1 | 12/2010 | Chemel et al. |
| 2010/0305761 A1 | 12/2010 | Remsburg |
| 2010/0314458 A1 | 12/2010 | Votaw et al. |
| 2010/0319362 A1 | 12/2010 | Hisaoka |
| 2011/0001436 A1 | 1/2011 | Chemel et al. |
| 2011/0001438 A1 | 1/2011 | Chemel et al. |
| 2011/0004823 A1 | 1/2011 | Wallaert |
| 2011/0004824 A1 | 1/2011 | Thorson et al. |
| 2011/0007016 A1 | 1/2011 | Mirza et al. |
| 2011/0007017 A1 | 1/2011 | Wallaert |
| 2011/0010620 A1 | 1/2011 | Mirza et al. |
| 2011/0010621 A1 | 1/2011 | Wallaert et al. |
| 2011/0010652 A1 | 1/2011 | Wallaert |
| 2011/0010653 A1 | 1/2011 | Wallaert |
| 2011/0010660 A1 | 1/2011 | Thorson et al. |
| 2011/0032932 A2 | 2/2011 | Pyeon et al. |
| 2011/0040785 A1 | 2/2011 | Steenberg et al. |
| 2011/0061014 A1 | 3/2011 | Frader-Thompson et al. |
| 2011/0063126 A1 | 3/2011 | Kennedy et al. |
| 2011/0066297 A1 | 3/2011 | Saberi et al. |
| 2011/0137467 A1 | 6/2011 | Leen et al. |
| 2011/0160915 A1 | 6/2011 | Bergman et al. |
| 2011/0251726 A1 | 10/2011 | McNulty et al. |
| 2012/0012662 A1 | 1/2012 | Leen et al. |
| 2012/0046792 A1 | 2/2012 | Secor |
| 2012/0065805 A1 | 3/2012 | Montalvo |
| 2012/0116593 A1 | 5/2012 | Amundson et al. |
| 2012/0181010 A1 | 7/2012 | Schultz et al. |

FOREIGN PATENT DOCUMENTS

| | | |
|---|---|---|
| EP | 2241836 A1 | 10/2010 |
| EP | 2241837 A1 | 10/2010 |
| GB | 2117573 A | 10/1983 |
| WO | 02056540 A2 | 7/2002 |
| WO | 2008100641 A1 | 8/2008 |

OTHER PUBLICATIONS

Related U.S. Appl. No. 29/345,748, filed Oct. 21, 2009 to Timothy Wallaert et al., entitled "Thin Cover Plate for an Electronic System Controller".

Related U.S. Appl. No. 29/345,747, filed Oct. 21, 2009 to Timothy Wallaert et al., entitled "Thin Cover Plate for an Electronic System Controller".

Related U.S. Appl. No. 12/603,508, filed Oct. 21, 2009 to Wojciech Grohman, entitled "Alarm and Diagnostics System and Method for a Distributed-Architecture Heating, Ventilation and Air Conditioning Network".

Related U.S. Appl. No. 12/603,450, filed Oct. 21, 2009 to Wojciech Grohman, entitled "Alarm and Diagnostics System and Method for a Distributed-Architecture Heating, Ventilation and Air Conditioning Network ".

Related U.S. Appl. No. 12/603,382, filed Oct. 21, 2009 to Wojciech Grohman, entitled "Device Abstraction System and Method for a Distributed-Architecture Heating, Ventilation and Air Conditioning System".

Related U.S. Appl. No. 12/603,504, filed Oct. 21, 2009 to Amanda Filbeck et al., entitled "System and Method of Use for a User Interface Dashboard of a Heating, Ventilation and Air Conditioning Network".

Related U.S. Appl. No. 12/603,449, filed Oct. 21, 2009 to Wojciech Grohman et al., entitled "System and Method of Use for a User Interface Dashboard of a Heating, Ventilation and Air Conditioning Network".

Related U.S. Appl. No. 12/603,460, filed Oct. 21, 2009 to Wojciech Grohman et al., entitled "System and Method of Use for a User Interface Dashboard of a Heating, Ventilation and Air Conditioning Network".

Related U.S. Appl. No. 12/603,526, filed Oct. 21, 2009 to Wojciech Grohman et al., entitled "Communication Protocol System and Methof for a Distributed-Architecture Heating, Ventilation and Air Conditioning Network K".

Related U.S. Appl. No. 12/603,532, filed Oct. 21, 2009 to Wojciech Grohman, entitled "Communication Protocol System and Method for a Distributed-Architecture Heating, Ventilation and Air Conditioning Network".

Related U.S. Appl. No. 12/603,475, filed Oct. 21, 2009 to Suresh Kumar Devineni et al., entitled "System and Method of Use for a User Interface Dashboard of a Heating, Ventilation and Air Conditioning Network".

Related U.S. Appl. No. 12/603,362, filed Oct. 21, 2009 to Wojciech Grohman et al., entitled "Architecture Heating, Ventilation and Air Conditioning System".

Related U.S. Appl. No. 12/603,473, filed Oct. 21, 2009 to Wojciech Grohman et al., entitled "System and Method for Zoning a Distributed-Architecture Heating, Ventilation and Air Conditioning Network".

Related U.S. Appl. No. 12/603,496, filed Oct. 21, 2009 to Wojciech Grohman et al., entitled "Device Abstraction System and Method for a Distributed-Architecture Heating, Ventilation and Air Conditioning System".

Related U.S. Appl. No. 12/603,482, filed Oct. 21, 2009 to Muhammad Mirza et al., entitled "System and Method of Use for a User Interface Dashboard of a Heating, Ventilation and Air Conditioning Network".

(56) References Cited

OTHER PUBLICATIONS

Related U.S. Appl. No. 12/603,488, filed Oct. 21, 2009 to Muhammad Mirza et al., entitled "System and Method of Use for a User Interface Dashboard of a Heating, Ventilation and Air Conditioning Network".
Related U.S. Appl. No. 12/603,495, filed Oct. 21, 2009 to Thomas Pavlak et al., entitled "System and Method of Use for a User Interface Dashboard of a Heating, Ventilation and Air Conditioning Network".
Related U.S. Appl. No. 12/603,497, filed Oct. 21, 2009 to Muhammad Mirza et al., entitled "System and Method of Use for a User Interface Dashboard of a Heating, Ventilation and Air Conditioning Network".
Related U.S. Appl. No. 12/603,431, filed Oct. 21, 2009 to Wojciech Grohman et al., entitled "General Control Technique in a Heating, Ventilation and Air Conditioning Network".
Related U.S. Appl. No. 12/603,502, filed Oct. 21, 2009 to Jacob Jennings et al., entitled "System and Method of Use for a User Interface Dashboard of a Heating, Ventilation and Air Conditioning Network".
Related U.S. Appl. No. 12/603,489, filed Oct. 21, 2009 to Wojciech Grohman et al., entitled "System and Method for Zoning a Distributed-Architecture Heating, Ventilation and Air Conditioning Network".
Related U.S. Appl. No. 12/603,527, filed Oct. 21, 2009 to Darko Hadzidedic, entitled "Memory Recovery Scheme and Data Structure in a Heating, Ventilation and Air Conditioning Network".
Related U.S. Appl. No. 12/603,479, filed Oct. 21, 2009 to Wojciech Grohman et al., entitled "Device Abstraction System and Method for a Distributed-Architecture Heating, Ventilation and Air Conditioning System".
Related U.S. Appl. No. 12/603,536, filed Oct. 21, 2009 to Timothy Wallaert et al., entitled "Communication Protocol System and Method for a Distributed-Architecture Heating, Ventilation and Air Conditioning Network".
Related U.S. Appl. No. 12/603,509, filed Oct. 21, 2009 to Timothy Wallaert et al., entitled "System and Method of Use for a User Interface Dashboard of a Heating, Ventilation and Air Conditioning Network".
Related U.S. Appl. No. 12/603,512, filed Oct. 21, 2009 to Wojciech Grohman et al., entitled "Programming and Configuration in a Heating, Ventilation and Air Conditioning Network".
Related U.S. Appl. No. 12/603,464, filed Oct. 21, 2009 to Wojciech Grohman et al., entitled "Alarm and Diagnostics System and Method for a Distributed-Architecture Heating, Ventilation and Air Conditioning Network".
Related U.S. Appl. No. 12/603,528, filed Oct. 21, 2009 to Wojciech Grohman et al., entitled "Memory Recovery Scheme and Data Structure in a Heating, Ventilation and Air Conditioning Network".
Related U.S. Appl. No. 12/603,525, filed Oct. 21, 2009 to Wojciech Grohman et al., entitled "Method of Controlling Equipment in a Heating, Ventilation and Air Conditioning Network".
Related U.S. Appl. No. 12/603,520, filed Oct. 21, 2009 to Darko Hadzidedic et al., entitled "Alarm and Diagnostics System and Method for a Distributed-Architecture Heating, Ventilation and Air Conditioning Network".
Related U.S. Appl. No. 12/603,539, filed Oct. 21, 2009 to Wojciech Grohman et al., entitled "Communication Protocol System and Method for a Distributed-Architecture Heating, Ventilation and Air Conditioning Network".
Related U.S. Appl. No. 12/603,420, filed Oct. 21, 2009 to Darko Hadzidedic et al., entitled "Alarm and Diagnostics System and Method for a Distributed-Architecture Heating, Ventilation and Air Conditioning Network".
Related U.S. Appl. No. 12/603,483, filed Oct. 21, 2009 to Wojciech Grohman et al., entitled "Device Abstraction System and Method for a Distributed-Architecture Heating, Ventilation and Air Conditioning System".
Related U.S. Appl. No. 12/603,514, filed Oct. 21, 2009 to Thomas Pavlak et al., entitled "System and Method of Use for a User Interface Dashboard of a Heating, Ventilation and Air Conditioning Network".
Related U.S. Appl. No. 12/603,515, filed Oct. 21, 2009 to Wojciech Grohman et al., entitled "Alarm and Diagnostics System and Method for a Distributed-Architecture Heating, Ventilation and Air Conditioning Network".
Related U.S. Appl. No. 12/603,490, filed Oct. 21, 2009 to Wojciech Grohman, entitled "System Recovery in a Heating, Ventilation and Air Conditioning Network".
Related U.S. Appl. No. 12/603,523, filed Oct. 21, 2009 to Wojciech Grohman et al., entitled "Alarm and Diagnostics System and Method for a Distributed-Architecture Heating, Ventilation and Air Conditioning".
Related U.S. Appl. No. 12/603,493, filed Oct. 21, 2009 to Wojciech Grohman et al., entitled "System Recovery in a Heating, Ventilation and Air Conditioning Network".
Related U.S. Appl. No. 12/603,547, filed Oct. 21, 2009 to Wojciech Grohman, entitled "Communication Protocol System and Method for a Distributed-Architecture Heating, Ventilation and Air Conditioning Network".
Related U.S. Appl. No. 12/603,531, filed Oct. 21, 2009 to Wojciech Grohman, entitled "Memory Recovery Scheme and Data Structure in a Heating, Ventilation and Air Conditioning Network".
Related U.S. Appl. No. 12/603,555, filed Oct. 21, 2009 to Wojciech Grohman, entitled "Communication Protocol System and Method for a Distributed-Architecture Heating, Ventilation and Air Conditioning Network".
Related U.S. Appl. No. 12/603,562, filed Oct. 21, 2009 to Wojciech Grohman et al., entitled "Communication Protocol System and Method for a Distributed-Architecture Heating, Ventilation and Air Conditioning Network".
Related U.S. Appl. No. 12/603,566, filed Oct. 21, 2009 to Wojciech Grohman, entitled "Communication Protocol System and Method for a Distributed-Architecture Heating, Ventilation and Air Conditioning Network".
Related U.S. Appl. No. 12/603,451, filed Oct. 21, 2009 to Timothy Wallaert, entitled "Alarm and Diagnostics System and Method for a Distributed-Architecture Heating, Ventilation and Air Conditioning Network".
Related U.S. Appl. No. 12/603,553, filed Oct. 21, 2009 to Wojciech Grohman et al., entitled "Communication Protocol System and Method for a Distributed-Architecture Heating, Ventilation and Air Conditioning Network".
Related U.S. Appl. No. 12/603,487, filed Oct. 21, 2009 to Wojciech Grohman, entitled "System Recovery in a Heating, Ventilation and Air Conditioning Network".
Related U.S. Appl. No. 12/603,558, filed Oct. 21, 2009 to Wojciech Grohman, entitled "Communication Protocol System and Method for a Distributed-Architecture Heating, Ventilation and Air Conditioning Network".
Related U.S. Appl. No. 12/603,468, filed Oct. 21, 2009 to Wojciech Grohman et al., entitled "Programming and Configuration in a Heating, Ventilation and Air Conditioning Network".
Related U.S. Appl. No. 12/603,560, filed Oct. 21, 2009 to Wojciech Grohman, entitled "Communication Protocol System and Method for a Distributed-Architecture Heating, Ventilation and Air Conditioning Network".
Related U.S. Appl. No. 12/603,519, filed Oct. 21, 2009 to Thomas Pavlak, entitled "System and Method of Use for a User Interface Dashboard of a Heating, Ventilation and Air Conditioning Network".
Related U.S. Appl. No. 12/603,499, filed Oct. 21, 2009 to Jimmy Curry et al., entitled "Alarm and Diagnostics System and Method for a Distributed-Architechture Heating, Ventilation and Air Conditioning Network".
Checket-Hanks, B., "Zoning Controls for Convenience's Sakes, High-End Residential Controls Move Into New Areas," Air Conditioning, Heating & Refrigeration News, ABI /INFORM Global, Jun. 28, 2004, 3 pages.
Leeb, G., "A User Interface for Home-Net," IEEE Transactions on Consumer Electronics, vol. 40, Issue 4, Nov. 1994, pp. 897-902.

(56) References Cited

OTHER PUBLICATIONS

"IPMI—Intelligent Platform Management Interface Specification v1.5," Document Revision 1.1, Intel Hewlett-Packard NEC Dell, Feb. 20, 2002, 460 pages.

Nash, H., "Fire Alarm Systems for Health Care Facilities," IEEE Transactions on Industry Applications, vol. 1A-19, No. 5, Sep./Oct. 1983, pp. 848-852.

Bruggeman, E., et al., "A Multifunction Home Control System," IEEE Transactions on Consumer Electronics, CE-29, Issue 1, Feb. 1983, 10 pages.

Fischer, H., et al., "Remote Building Management and DDc-Technology to Operate Distributed HVAC-Installations," The first International Telecommunications Energy Special Conference, TELESCON '94, Apr. 11-15, 1994, pp. 127-132.

"Definition of encase," The Free Dictionary, http://www.thefreedictionary.com/encase, 2013, 2 pages.

"Define Track at Dictionary.com," http://dictionary.reference.com/browse/track, Mar. 12, 2013, 3 pages.

"Definition of Track by Macmillan Dictionary," http://www.macmillandictionary.com/dictionary/british/track, Mar. 12, 2013, 4 pages.

"Definition of track by the Free Online Dictionary, Thesaurus, and Encyclopedia," http://www.thefreedictionary.com/ track, Mar. 12, 2013, 6 pages.

"Field Display for Tridium JACE Controllers Product Data," HVAC Concepts, Inc. 2005, 22 pages.

"HVAC Concepts," JACE Network-Installation, 2004, 2 pages.

Gallas, B., et al., "Embedded Pentium ® Processor System Design for Windows CE," WESCON 1998, pp. 114-123.

"iView-100 Series (iView/iView-100-40) Handheld Controller User's Manual," ICP DAS, Mar. 2006, Version 2.0.

"Spectre™ Commercial Zoning System, Engineering Data," Lennox, Bulletin No. 210366E, Oct. 2002, 33 pages.

Sharma, A., "Design of Wireless Sensors Network for Building Management Systems," University of California-Berkley, 2003, 57 pages.

"Linux Programmer's Manual," UNIX Man Pages: Login (1), http://unixhelp.ed.ac.uk/CGI/man-cgi?login, Util-linux 1.6, Nov. 4, 1996, 4 pages.

\* cited by examiner

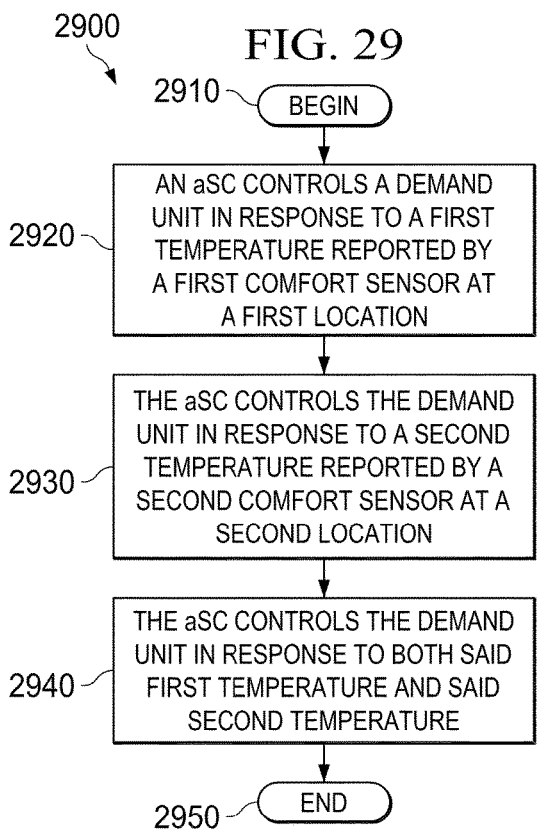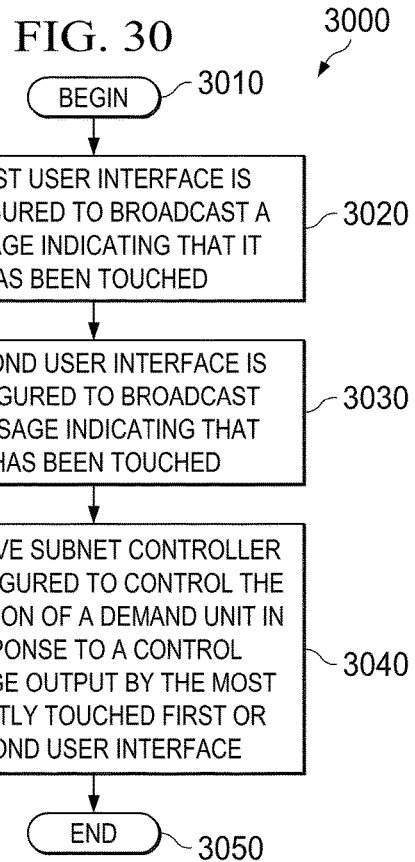

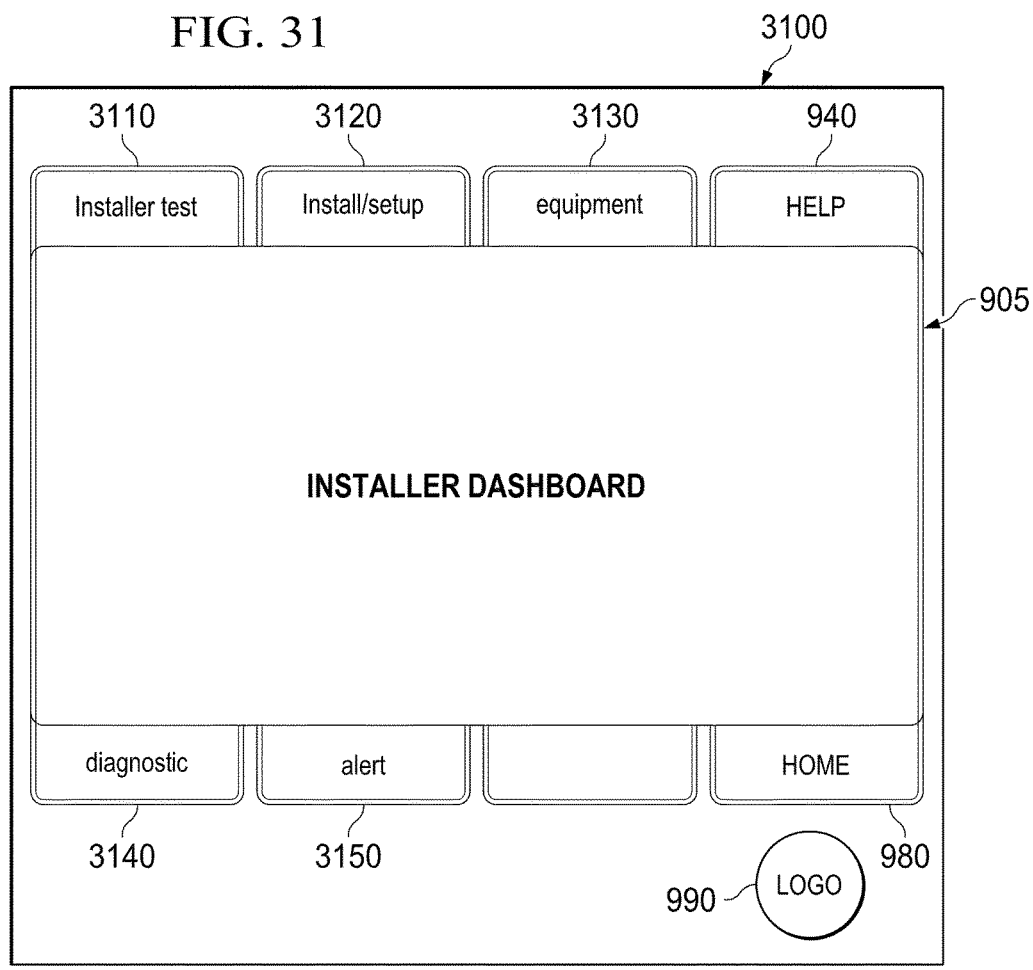
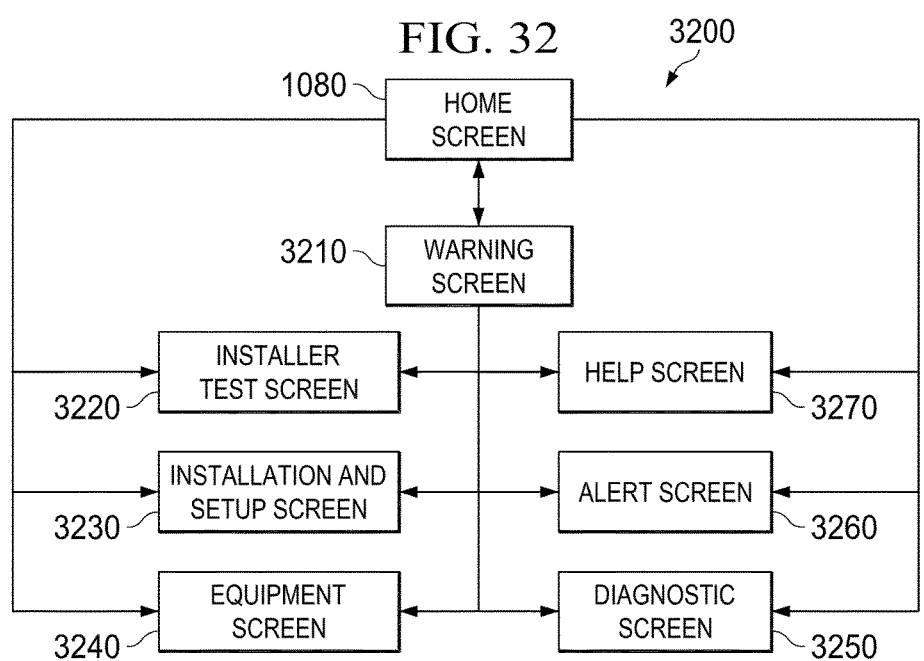

SYSTEM AND METHOD FOR ZONING A DISTRIBUTED-ARCHITECTURE HEATING, VENTILATION AND AIR CONDITIONING NETWORK

CROSS-REFERENCE TO RELATED APPLICATIONS

This application claims the benefit of U.S. Provisional Application Ser. No. 61/167,135, filed by Grohman, et al., on Apr. 6, 2009, entitled "Comprehensive HVAC Control System", and is a continuation-in-part application of application Ser. No. 12/258,659, filed by Grohman on Oct. 27, 2008 now abandoned, entitled "Apparatus and Method for Controlling an Environmental Conditioning Unit," both of which are commonly assigned with this application and incorporated herein by reference. This application is also related to the following U.S. patent applications, which are filed on even date herewith, commonly assigned with this application and incorporated herein by reference:

| Ser. No. | Inventors | Title |
|---|---|---|
| 12/603,464 | Grohman, et al. | "Alarm and Diagnostics System and Method for a Distributed-Architecture Heating, Ventilation and Air Conditioning Network" |
| 12/603,534 | Wallaert, et al. | "Flush Wall Mount Controller and In-Set Mounting Plate for a Heating, Ventilation and Air Conditioning System" |
| 12/603,449 | Thorson, et al. | "System and Method of Use for a User Interface Dashboard of a Heating, Ventilation and Air Conditioning Network" |
| 12/603,382 | Grohman | "Device Abstraction System and Method for a Distributed-Architecture Heating, Ventilation and Air Conditioning Network" |
| 12/603,526 | Grohman, et al. | "Communication Protocol System and Method for a Distributed-Architecture Heating, Ventilation and Air Conditioning Network" |
| 12/603,527 | Hadzidedic | "Memory Recovery Scheme and Data Structure in a Heating, Ventilation and Air Conditioning Network" |
| 12/603,490 | Grohman | "System Recovery in a Heating, Ventilation and Air Conditioning Network" |
| 12/603,473 | Grohman, et al. | "System and Method for Zoning a Distributed-Architecture Heating, Ventilation and Air Conditioning Network" |
| 12/603,525 | Grohman, et al. | "Method of Controlling Equipment in a Heating, Ventilation and Air Conditioning Network" |
| 12/603,512 | Grohman, et al. | "Programming and Configuration in a Heating, Ventilation and Air Conditioning Network" |
| 12/603,431 | Mirza, et al. | "General Control Techniques in a Heating, Ventilation and Air Conditioning Network" |

TECHNICAL FIELD

This application is directed, in general, to HVAC systems and, more specifically, to a system and method for logical manipulation of system features.

BACKGROUND

Climate control systems, also referred to as HVAC systems (the two terms will be used herein interchangeably), are employed to regulate the temperature of premises, such as a residence, office, store, warehouse, vehicle, trailer, or commercial or entertainment venue. The most basic climate control systems either move air (typically by means of an air handler having a fan or blower), heat air (typically by means of a furnace) or cool air (typically by means of a compressor-driven refrigerant loop). A thermostat is typically included in a conventional climate control system to provide some level of automatic temperature control. In its simplest form, a thermostat turns the climate control system on or off as a function of a detected temperature. In a more complex form, the thermostat may take other factors, such as humidity or time, into consideration. Still, however, the operation of a thermostat remains turning the climate control system on or off in an attempt to maintain the temperature of the premises as close as possible to a desired set point temperature.

Climate control systems as described above have been in wide use since the middle of the twentieth century and have, to date, generally provided adequate temperature management.

SUMMARY

One aspect provides an HVAC data processing and communication network. In an embodiment, the network includes a first zone and a second zone. The first zone has a first demand unit and a first subnet controller configured to control an operation of the first demand unit via a data bus. The second zone has a second demand unit and a second subnet controller configured to control an operation of the second demand unit via the data bus. The second subnet controller is further configured to communicate with the first subnet controller via the data bus.

Another aspect provides a method of manufacturing an HVAC data processing and communication network. In an embodiment, the method includes configuring a first subnet controller and a second subnet controller. The first subnet controller is configured to control an operation of a first demand unit in a first zone via a data bus. The second subnet controller is configured to control an operation of a second demand unit in a second zone via the data bus. The method further includes configuring the first subnet controller to communicate with the second subnet controller via the data bus.

BRIEF DESCRIPTION

Reference is now made to the following descriptions taken in conjunction with the accompanying drawings, in which:

FIGS. 27-30 illustrates methods of the disclosure;

FIG. 31 illustrates an installer dashboard; and

FIG. 32 illustrates transitions between service screens.

DETAILED DESCRIPTION

As stated above, conventional climate control systems have been in wide use since the middle of the twentieth century and have, to date, generally provided adequate temperature management. However, it has been realized that more sophisticated control and data acquisition and processing techniques may be developed and employed to improve the installation, operation and maintenance of climate control systems.

Described herein are various embodiments of an improved climate control, or HVAC, system in which at least multiple components thereof communicate with one another via a data bus. The communication allows identity, capability, status and operational data to be shared among the components. In some embodiments, the communication also allows commands to be given. As a result, the climate control system may be more flexible in terms of the number of different premises in which it may be installed, may be easier for an installer to install and configure, may be easier for a user to operate, may provide superior temperature and/or relative humidity (RH) control, may be more energy efficient, may be easier to diagnose, may require fewer, simpler repairs and may have a longer service life.

Figure 1:
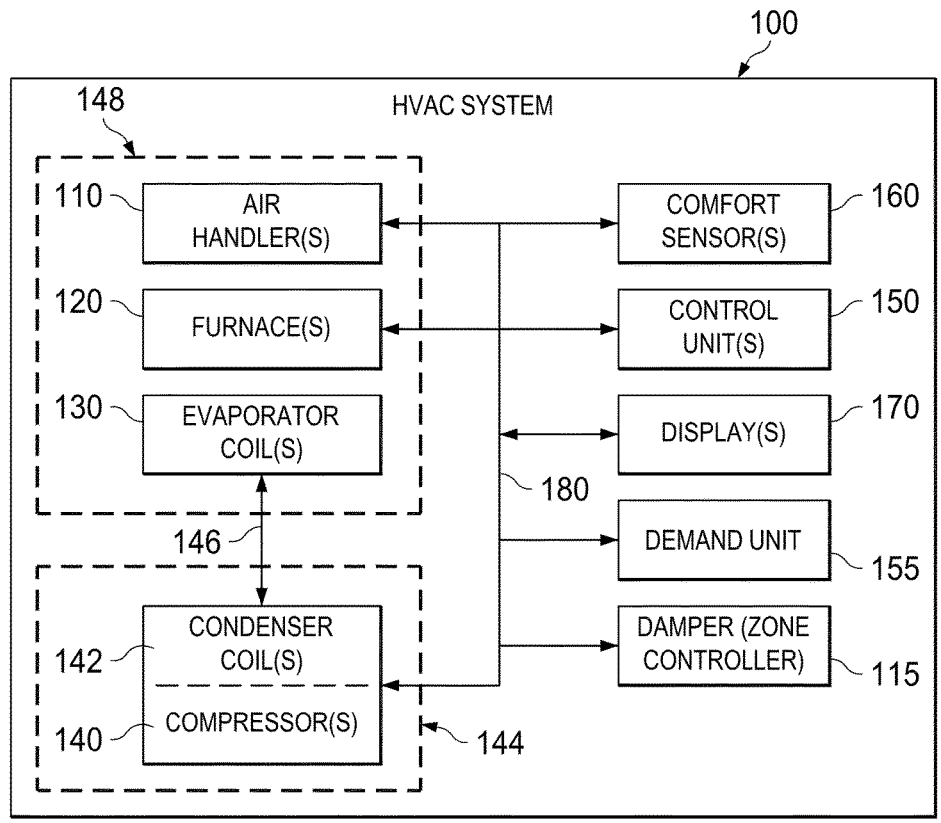
FIG. 1 is a high-level block diagram of an HVAC system according to various embodiments of the disclosure.

FIG. 1 is a high-level block diagram of a networked HVAC system, generally designated 100. The HVAC system 100 may be referred to herein simply as "system 100" for brevity. In one embodiment, the system 100 is configured to provide ventilation and therefore includes one or more air handlers 110. In an alternative embodiment, the ventilation includes one or more dampers 115 to control air flow through air ducts (not shown.) Such control may be used in various embodiments in which the system 100 is a zoned system. In an alternative embodiment, the system 100 is configured to provide heating and therefore includes one or more furnaces 120, typically associated with the one or more air handlers 110. In an alternative embodiment, the system 100 is configured to provide cooling and therefore includes one or more refrigerant evaporator coils 130, typically associated with the one or more air handlers 110. Such embodiment of the system 100 also includes one or more compressors 140 and associated condenser coils 142, which are typically associated with one or more so-called "outdoor units" 144. The one or more compressors 140 and associated condenser coils 142 are typically connected to an associated evaporator coil 130 by a refrigerant line 146. In an alternative embodiment, the system 100 is configured to provide ventilation, heating and cooling, in which case the one or more air handlers 110, furnaces 120 and evaporator coils 130 are associated with one or more "indoor units" 148, e.g., basement or attic units that may also include an air handler.

For convenience in the following discussion, a demand unit 155 is representative of the various units exemplified by the air handler 110, furnace 120, and compressor 140, and more generally includes an HVAC component that provides a service in response to control by the control unit 150. The service may be, e.g., heating, cooling, humidification, dehumidification, or air circulation. A demand unit 155 may provide more than one service, and if so, one service may be a primary service, and another service may be an ancillary service. For example, for a heating unit that also circulates air, the primary service may be heating, and the ancillary service may be air circulation (e.g. by a blower).

The demand unit 155 may have a maximum service capacity associated therewith. For example, the furnace 120 may have a maximum heat output (often expressed in terms of British Thermal Units (BTU) or Joules), or a blower may have a maximum airflow capacity (often expressed in terms of cubic feet per minute (CFM) or cubic meters per minute (CMM)). In some cases, the demand unit 155 may be configured to provide a primary or ancillary service in staged portions. For example, blower may have two or more motor speeds, with a CFM value associated with each motor speed.

One or more control units 150 control one or more of the one or more air handlers 110, the one or more furnaces 120 and/or the one or more compressors 140 to regulate the temperature of the premises, at least approximately. In various embodiments to be described, the one or more displays 170 provide additional functions such as operational, diagnostic and status message display and an attractive, visual interface that allows an installer, user or repairman to perform actions with respect to the system 100 more intuitively. Herein, the term "operator" will be used to refer collectively to any of the installer, the user and the repairman unless clarity is served by greater specificity.

One or more separate comfort sensors 160 may be associated with the one or more control units 150 and may also optionally be associated with one or more displays 170. The one or more comfort sensors 160 provide environmental data, e.g. temperature and/or humidity, to the one or more control units 150. An individual comfort sensor 160 may be physically located within a same enclosure or housing as the control unit 150, in a manner analogous with a conventional HVAC thermostat. In such cases, the commonly housed comfort sensor 160 may be addressed independently. However, the one or more comfort sensors 160 may be located separately and physically remote from the one or more control units 150. Also, an individual control unit 150 may be physically located within a same enclosure or housing as a display 170, again analogously with a conventional HVAC thermostat. In such embodiments, the commonly housed control unit 150 and display 170 may each be addressed independently. However, one or more of the displays 170 may be located within the system 100 separately from and/or physically remote to the control units 150. The one or more displays 170 may include a screen such as a liquid crystal or OLED display (not shown).

Although not shown in FIG. 1, the HVAC system 100 may include one or more heat pumps in lieu of or in addition to the one or more furnaces 120, and one or more compressors 140. One or more humidifiers or dehumidifiers may be employed to increase or decrease humidity. One or more dampers may be used to modulate air flow through ducts (not shown). Air cleaners and lights may be used to reduce air pollution. Air quality sensors may be used to determine overall air quality.

Finally, a data bus 180, which in the illustrated embodiment is a serial bus, couples the one or more air handlers 110, the one or more furnaces 120, the one or more evaporator condenser coils 142 and compressors 140, the one or more control units 150, the one or more remote comfort sensors 160 and the one or more displays 170 such that data may be communicated therebetween or thereamong. As will be understood, the data bus 180 may be advantageously employed to convey one or more alarm messages or one or more diagnostic messages. All or some parts of the data bus 180 may be implemented as a wired or wireless network.

The data bus 180 in some embodiments is implemented using the Bosch CAN (Controller Area Network) specification, revision 2, and may be synonymously referred to herein as a residential serial bus (RSBus) 180. The data bus 180 provides communication between or among the aforementioned elements of the network 200. It should be understood that the use of the term "residential" is nonlimiting; the network 200 may be employed in any premises whatsoever, fixed or mobile. Other embodiments of the data bus 180 are also contemplated, including e.g., a wireless bus, as mentioned previously, and 2-, 3- or 4-wire networks, including IEEE-1394 (Firewire™, i.LINK™, Lynx™), Ethernet, Universal Serial Bus (e.g., USB 1.x, 2.x, 3.x), or similar standards. In wireless embodiments, the data bus 180 may be implemented, e.g., using Bluetooth™, Zigbee or a similar wireless standard.

Figure 2:
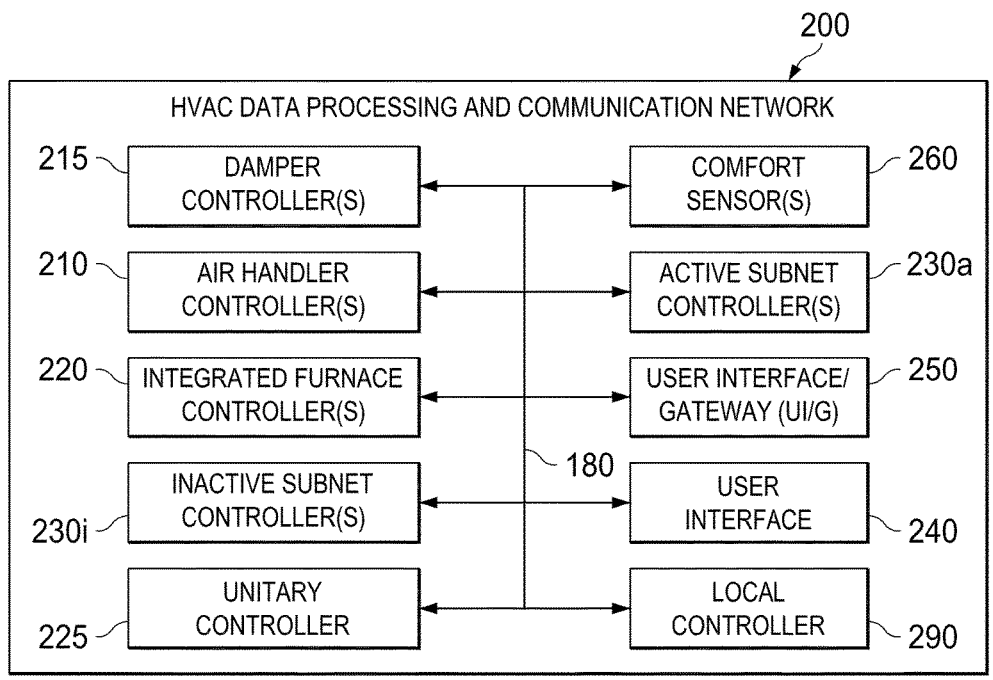
FIG. 2 is a high-level block diagram of one embodiment of an HVAC data processing and communication network.

FIG. 2 is a high-level block diagram of one embodiment of an HVAC data processing and communication network 200 that may be employed in the HVAC system 100 of FIG. 1. One or more air handler controllers (AHCs) 210 may be associated with the one or more air handlers 110 of FIG. 1. One or more integrated furnace controllers (IFCs) 220 may be associated with the one or more furnaces 120. One or more damper controller modules 215, also referred to herein as a zone controller module 215, may be associated with the one or more dampers 115. One or more unitary controllers 225 may be associated with one or more evaporator coils 130 and one or more condenser coils 142 and compressors 140 of FIG. 1. The network 200 includes an active subnet controller (aSC) 230a and an inactive subnet controller (iSC) 230i. The aSC 230a may act as a network controller of the system 100. The aSC 230a is responsible for configuring and monitoring the system 100 and for implementation of heating, cooling, humidification, dehumidification, air quality, ventilation or any other functional algorithms therein. Two or more aSCs 230a may also be employed to divide the network 200 into subnetworks, or subnets, simplifying network configuration, communication and control. Each subnet typically contains one indoor unit, one outdoor unit, a number of different accessories including humidifier, dehumidifier, electronic air cleaner, filter, etc., and a number of comfort sensors, subnet controllers and user interfaces. The iSC 230i is a subnet controller that does not actively control the network 200. In some embodiments, the iSC 230i listens to all messages broadcast over the data bus 180, and updates its internal memory to match that of the aSC 230a. In this manner, the iSC 230i may backup parameters stored by the aSC 230a, and may be used as an active subnet controller if the aSC 230a malfunctions. Typically there is only one aSC 230a in a subnet, but there may be multiple iSCs therein, or no iSC at all. Herein, where the distinction between an active or a passive SC is not germane the subnet controller is referred to generally as an SC 230.

A user interface (UI) 240 provides a means by which an operator may communicate with the remainder of the network 200. In an alternative embodiment, a user interface/gateway (UI/G) 250 provides a means by which a remote operator or remote equipment may communicate with the remainder of the network 200. Such a remote operator or equipment is referred to generally as a remote entity. A comfort sensor interface 260, referred to herein interchangeably as a comfort sensor (CS) 260, may provide an interface between the data bus 180 and each of the one or more comfort sensors 160. The comfort sensor 260 may provide the aSC 230a with current information about environmental conditions inside of the conditioned space, such as temperature, humidity and air quality.

For ease of description, any of the networked components of the HVAC system 100, e.g., the air handler 110, the damper 115, the furnace 120, the outdoor unit 144, the control unit 150, the comfort sensor 160, the display 170, may be described in the following discussion as having a local controller 290. The local controller 290 may be configured to provide a physical interface to the data bus 180 and to provide various functionality related to network communication. The SC 230 may be regarded as a special case of the local controller 290, in which the SC 230 has additional functionality enabling it to control operation of the various networked components, to manage aspects of communication among the networked components, or to arbitrate conflicting requests for network services among these components. While the local controller 290 is illustrated as a stand-alone networked entity in FIG. 2, it is typically physically associated with one of the networked components illustrated in FIG. 1.

Figure 3:
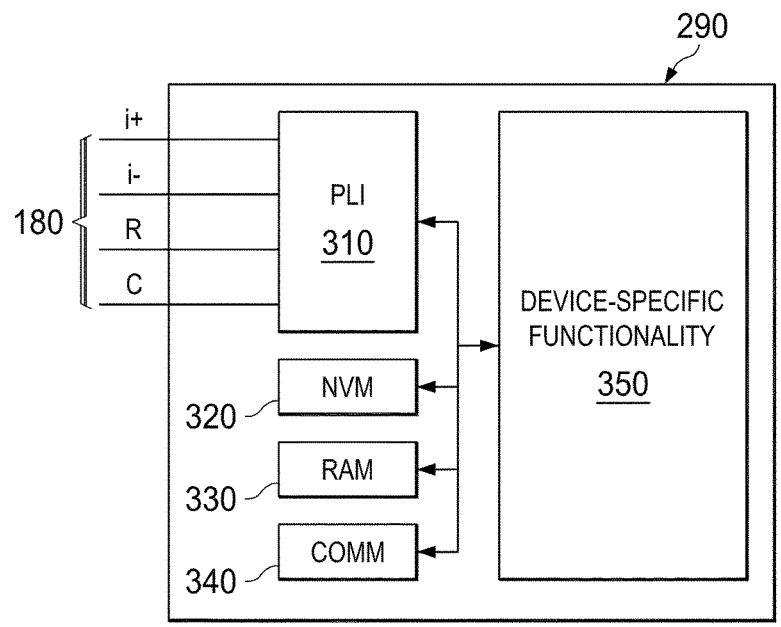
FIG. 3 is a block diagram of a local controller of the disclosure.

FIG. 3 illustrates a high-level block diagram of the local controller 290. The local controller 290 includes a physical layer interface (PLI) 310, a non-volatile memory (NVM) 320, a RAM 330, a communication module 340 and a functional block 350 that may be specific to the demand unit 155, e.g., with which the local controller 290 is associated. The PLI 310 provides an interface between a data network, e.g., the data bus 180, and the remaining components of the local controller 290. The communication module 340 is configured to broadcast and receive messages over the data network via the PLI 310. The functional block 350 may include one or more of various components, including without limitation a microprocessor, a state machine, volatile and nonvolatile memory, a power transistor, a monochrome or color display, a touch panel, a button, a keypad and a backup battery. The local controller 290 may be associated with a demand unit 155, and may provide control thereof via the functional block 350, e.g. The NVM 320 provides local persistent storage of certain data, such as various configuration parameters, as described further below. The RAM 330 may provide local storage of values that do not need to be retained when the local controller 290 is disconnected from power, such as results from calculations performed by control algorithms. Use of the RAM 330 advantageously reduces use of the NVM cells that may degrade with write cycles.

In some embodiments, the data bus 180 is implemented over a 4-wire cable, in which the individual conductors are assigned as follows:

R—the "hot"—a voltage source, 24 VAC, e.g.
C—the "common"—a return to the voltage source.
i+—RSBus High connection.
i−—RSBus Low connection.

The disclosure recognizes that various innovative system management solutions are needed to implement a flexible, distributed-architecture HVAC system, such as the system 100. More specifically, cooperative operation of devices in the system 100, such as the air handler 110, outdoor unit 144, or UI 240 is improved by various embodiments presented herein. More specifically still, embodiments are presented of zoning of a distributed architecture or networked HVAC system than provide simplified installation and operation relative to a conventional HVAC system.

Figure 4:
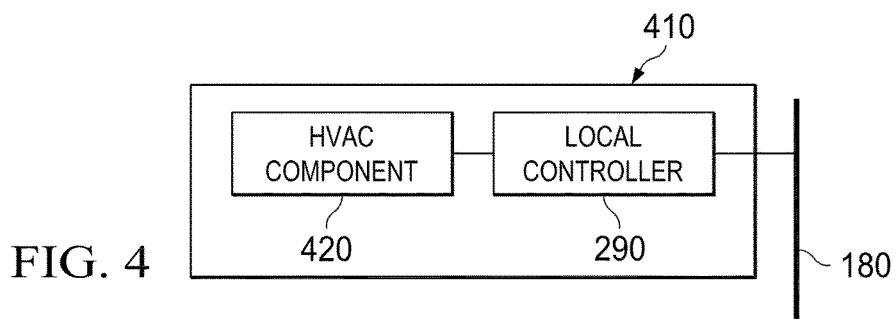
FIG. 4 is a block diagram of a networked HVAC system device of the disclosure.

FIG. 4 illustrates a device 410 according to the disclosure. The following description pertains to the HVAC data processing and communication network 200 that is made up of a number of system devices 410 operating cooperatively to provide HVAC functions. Herein after the system device 410 is referred to more briefly as the device 410 without any loss of generality. The term "device" applies to any component of the system 100 that is configured to communicate with other components of the system 100 over a wired or wireless network. Thus, the device 410 may be, e.g., the air handler 110 in combination with its AHC 210, or the furnace 120 in combination with its IFC 220. This discussion may refer to a generic device 410 or to a device 410 with a specific recited function as appropriate. An appropriate signaling protocol may be used to govern communication of one device with another device. While the function of various devices 410 in the network 200 may differ, each device 410 shares a common architecture for interfacing with other devices, e.g. the local controller 290 appropriately configured for the HVAC component 420 with which the local controller 290 is associated. The microprocessor or state machine in the functional block 350 may operate to perform any task for which the device 410 is responsible, including, without limitation, sending and responding to messages via the data bus 180, controlling a motor or actuator, or performing calculations.

In various embodiments, signaling between devices 410 relies on messages. Messages are data strings that convey information from one device 410 to another device 410. The purpose of various substrings or bits in the messages may vary depending on the context of the message. Generally, specifics regarding message protocols are beyond the scope of the present description. However, aspects of messages and messaging are described when needed to provide context for the various embodiments described herein.

Figure 5:
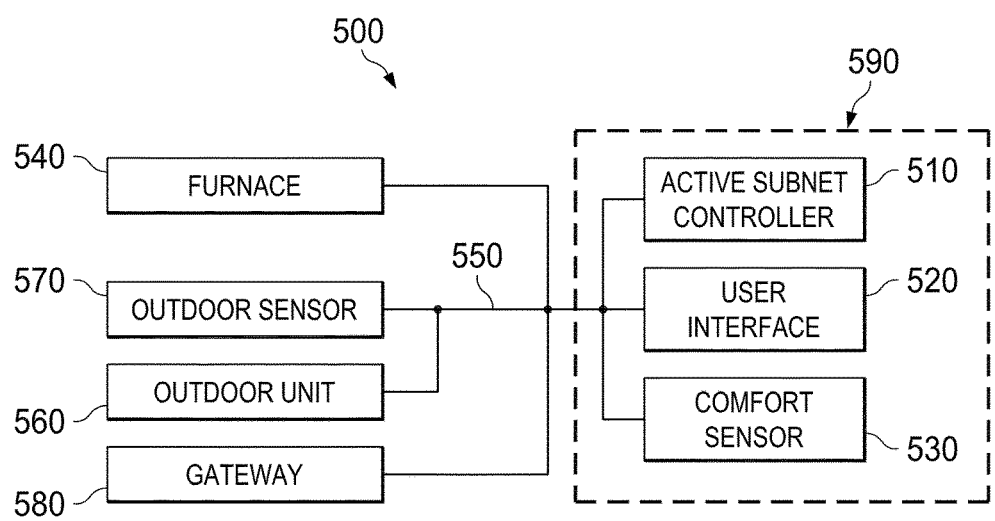
FIG. 5 illustrates an example grouping of devices in an HVAC system.

FIG. 5 illustrates an embodiment of the disclosure of a network of the disclosure generally designated 500. The network 500 includes an aSC 510, a user interface 520, a comfort sensor 530 and a furnace 540 configured to communicate over a data bus 550. In some embodiments these devices form a minimum HVAC network. In addition, the network 500 is illustrated as including an outdoor unit 560, an outdoor sensor 570, and a gateway 580. The furnace 540 and outdoor unit 560 are provided by way of example only and not limited to any particular demand units. The aSC 510 is configured to control the furnace 540 and the outdoor unit 560 using, e.g., command messages sent via the data bus 550. The aSC 510 receives environmental data, e.g. temperature and/or humidity, from the comfort sensor 530, the furnace 540 via a local temperature sensor, the outdoor sensor 570 and the outdoor unit 560. The data may be transmitted over the data bus 550 by way of messages formatted for this purpose. The user interface 520 may include a display and input means to communicate information to, and accept input from, an operator of the network 500. The display and input means may be, e.g., a touch-sensitive display screen, though embodiments of the disclosure are not limited to any particular method of display and input.

The aSC 510, comfort sensor 530 and user interface 520 may optionally be physically located within a control unit 590. The control unit 590 provides a convenient terminal to the operator to effect operator control of the system 100. In this sense, the control unit is similar to the thermostat used in conventional HVAC systems. However, the control unit 590 may only include the user interface 520, with the aSC 510 and comfort sensor 530 remotely located from the control unit 590.

As described previously, the aSC 510 may control HVAC functionality, store configurations, and assign addresses during system auto configuration. The user interface 520 provides a communication interface to provide information to and receive commands from a user. The comfort sensor 530 may measure one or more environmental attributes that affect user comfort, e.g., ambient temperature, RH and pressure. The three logical devices 510, 520, 530 each send and receive messages over the data bus 550 to other devices attached thereto, and have their own addresses on the network 500. In many cases, this design feature facilitates future system expansion and allows for seamless addition of multiple sensors or user interfaces on the same subnet. The aSC 510 may be upgraded, e.g., via a firmware revision. The aSC 510 may also be configured to release control of the network 500 and effectively switch off should another SC present on the data bus 550 request it.

Configuring the control unit 590 as logical blocks advantageously provides flexibility in the configuration of the network 500. System control functions provided by a subnet controller may be placed in any desired device, in this example the control unit 590. The location of these functions therein need not affect other aspects of the network 500. This abstraction provides for seamless upgrades to the network 500 and ensures a high degree of backward compatibility of the local controllers 290 present in the network. The approach provides for centralized control of the system, without sacrificing flexibility or incurring large system upgrade costs.

For example, the use of the logical aSC 510 provides a flexible means of including control units on a same network in a same conditioned space. The system, e.g., the system 100, may be easily expanded. The system retains backward compatibility, meaning the network 500 may be updated with a completely new type of equipment without the need to reconfigure the system, other than substituting a new control unit 590, e.g. Moreover, the functions provided by the subnet controller may be logically placed in any physical device, not just the control unit 590. Thus, the manufacturer has greater flexibility in selecting devices, e.g., control units or UIs, from various suppliers.

In various embodiments, each individual subnet, e.g., the network 500, is configured to be wired as a star network, with all connections to the local controller 290 tied at the furnace 120 or the air handler 110. Thus, each indoor unit, e.g., the furnace 120, may include three separate connectors configured to accept a connection to the data bus 180. Two connectors may be 4-pin connectors: one 4-pin connector may be dedicated for connecting to an outdoor unit, and one may be used to connect to equipment other than the outdoor unit. The third connector may be a 2-pin connector configured to connect the subnet of which the indoor unit is a member to other subnets via the i+/i− signals. As described previously, a 24 VAC transformer associated with the furnace 120 or air handler 110 may provide power to the local controllers 290 within the local subnet via, e.g., the R and C lines. The C line may be locally grounded.

Figure 6:
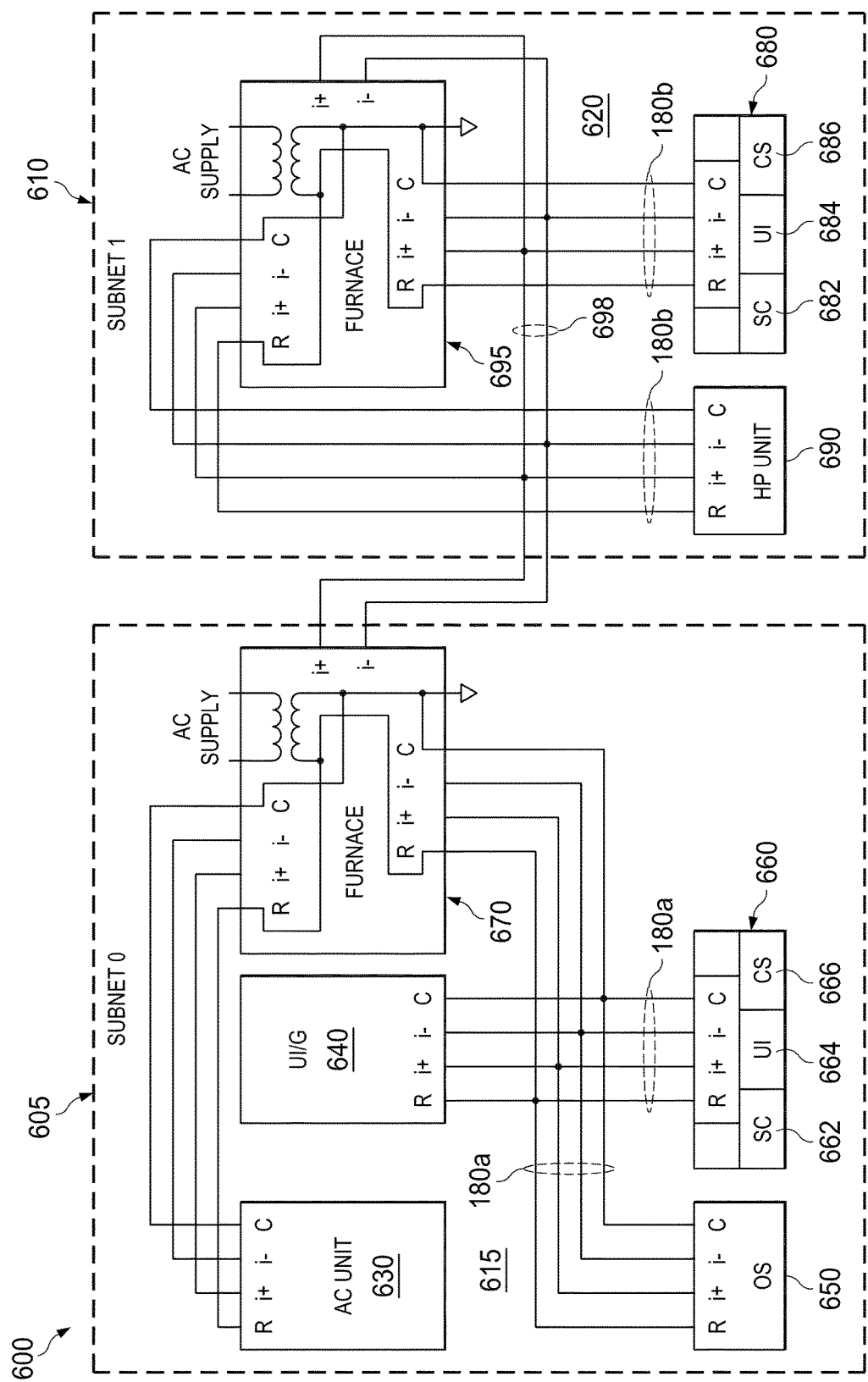
FIG. 6 illustrates two subnets in communication over a network connection.

FIG. 6 illustrates a detailed connection diagram of components of a network 600 according to one embodiment of the disclosure. The network 600 includes a zone 605 and a zone 610. The zones 605, 610 are illustrated without limitation as being configured as subnets 615, 620, respectively. The subnet 615 includes an air conditioning (AC) unit 630, a UI/G 640, an outside sensor (OS) 650, a control unit 660, and a furnace 670. The control unit 660 includes an SC 662, a UI 664 and a comfort sensor 666, each of which is independently addressable via a data bus 180a. The subnet 620 includes a control unit 680, a heat pump 690 and a furnace 695. The control unit 680 houses an SC 682, a UI 684 and a comfort sensor 686, each of which is independently addressable via a data bus 180b. In various embodiments and in the illustrated embodiment each individual subnet, e.g., the subnets 615, 620 are each configured to be wired as a star network, with connections to all devices therein made at a furnace an air handler associated with that subnet. Thus, e.g., each of the devices 630, 640, 650, 660 is connected to the data bus 180a at the furnace 670. Similarly, each device 680, 690 is connected to the subnet 620 at the furnace 695. Each furnace 670, 695, generally representative of the indoor unit 148, may include a connection block configured to accept a connection to the RSBus 180. For example, two terminals of the connection block may be 4-pin connectors. In one embodiment, one 4-pin connector is dedicated to connecting to an outdoor unit, for example the connection from the furnace 670 to the AC unit 630. Another 4-pin connector is used to connect to equipment other than the outdoor unit, e.g., from the furnace 670 to the UI/G 640, the OS 650, and the control unit 660. A third connector may be a 2-pin connector configured to connect one subnet to another subnet. In the network 600, e.g., the subnet 615 is connected to the subnet 620 via a wire pair 698 that carries the i+/i− signals of the serial bus. As described previously with respect to the furnace 120, a transformer located at the furnace 670 may provide power to the various components of the subnet 615, and a transformer located at the furnace 695 may provide power to the various components of the subnet 620 via R and C lines. As illustrated, the C line may be locally grounded.

This approach differs from conventional practice, in which sometimes a master controller has the ability to see or send commands to multiple controllers in a single location, e.g., a house. Instead, in embodiments of which FIG. 6 is representative there is no master controller. Any controller (e.g. UI, or SC) may communicate with any device, including other controllers, to make changes, read data, etc. Thus, e.g., user located on a first floor of a residence zoned by floor may monitor and control the state of a zone conditioning a second floor of the residence without having to travel to the control unit located on the second floor. This provides a significant convenience to the operator.

Figure 7A:
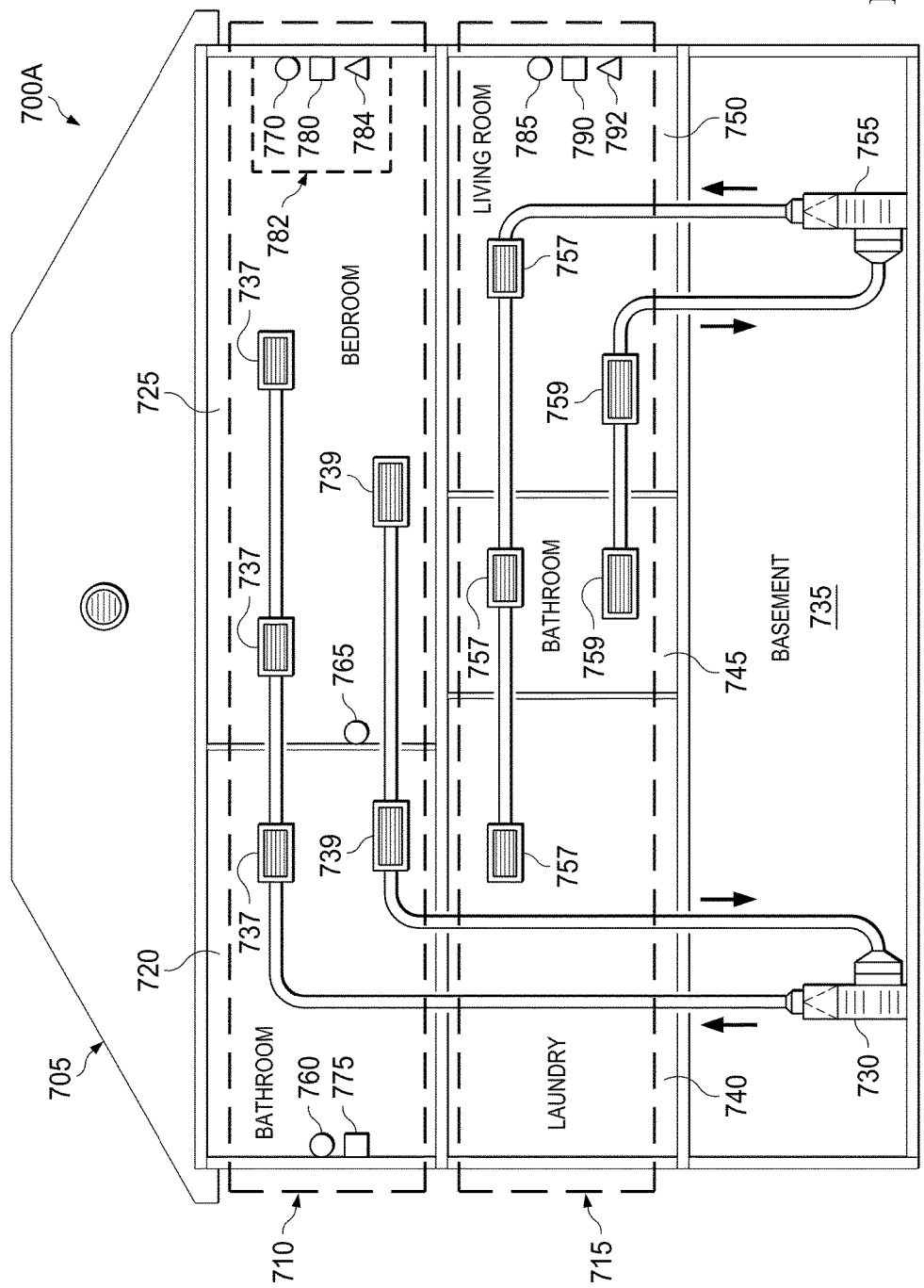
FIGS. 7A and 7B illustrate a conditioned building with two HVAC zones.

FIG. 7A illustrates an example embodiment of a zoned HVAC system, generally denoted 700A. A residence 705 has an HVAC data processing and communication network that includes two zones 710, 715. The zone 710 includes a bathroom 720 and a bedroom 725. A demand unit 730, e.g., a gas or electric furnace, located in a basement 735 provides heated or cooled air to the zone 710 via source vents 737 and return vents 739. The zone 715 includes a laundry room 740, a bathroom 745 and a living room 750. A demand unit 755, which again may be a gas or electric furnace, provides heated or cooled air to the zone 715 via source vents 757 and return vents 759.

The zone 710 also includes comfort sensors 760, 765, 770, user interfaces 775, 780 and a subnet controller 784. The zone 715 includes a comfort sensor 785, a user interface 790, and a subnet controller 792. The subnet controller 792 may be optionally omitted with the subnet controller 784 is configured to control both of the zones 710, 715. The comfort sensors 760, 765, 770, user interfaces 775, 780 and the demand unit 730 are networked to form a first subnet. The comfort sensor 785, user interface 790 and demand unit 755 are networked to form a second subnet. The two subnets are in turn connected to form the network as described with respect to FIG. 6.

In the illustrated embodiment, the user interfaces 775, 780 are physically associated with the first zone 710, and the user interface 790 is physically associated with the second zone 715. Furthermore, the subnet controller 784 is physically associated with the first zone 710, and the subnet controller 792 is physically associated with the second zone 715. Herein, a user interface or subnet controller is physically associated with a zone when the subject user interface or subnet controller is located in a space that is conditioned by that zone. Thus, e.g., the subnet controller 784 is not physically associated with the second zone 715. A subnet controller or user interface may be logically associated with a particular zone, even if the subnet controller or user interface is not physically associated with that zone. By logically associated, it is meant that the subnet controller or user interface may operate in some configurations to control the ambient conditions of the zone with which the subnet controller or user interface is logically associated.

Herein and in the claims, a zone is a portion of a networked HVAC system that includes at least one demand unit, at least one user interface and at least one comfort sensor. In some cases, as described below, a single demand unit may serve more than one zone. A room of a conditioned structure typically is only conditioned by a single zone. Thus, e.g., the rooms 720, 725 receive air from one of the vents 737, and the rooms 740, 745, 750 receive air from one of the vents 757. A zone may be physically configured to condition one level of a multi-level structure such as the residence 705, but this need not be the case. For example, a networked HVAC system may be zoned to provide independent conditioning of southern and northern facing portions of a structure to account for differing heating and cooling loads.

The comfort sensors 760, 765, 770 may be positioned in any location at which a user wishes to locally sense a temperature or RH. In some cases a particular comfort sensor is collocated with a user interface, such as, e.g. the comfort sensor 770 and user interface 780. A collocated comfort sensor and user interface may be logical devices of a single physical unit, or may be discrete physical units. For example, it may be convenient for the comfort sensor 770 and the user interface 780 to be located in an enclosure 782 to present to the operator a familiar look and feel associated with conventional thermostats. Optionally, the subnet controller 784 is also located within the enclosure 782. As described previously, the comfort sensor 770 and the user interface 780 remain independently addressable in the subnet and the network even with housed in a same enclosure. In other cases a comfort sensor is located without being collocated with a user interface. One example is the comfort sensor 765. As described further below, any of the user interfaces 775, 780, 790 may be collocated with an active subnet controller, which may control any demand unit in the HVAC network to maintain a temperature or RH measured by any of the comfort sensors 760, 765, 770, 785.

Figure 7B:
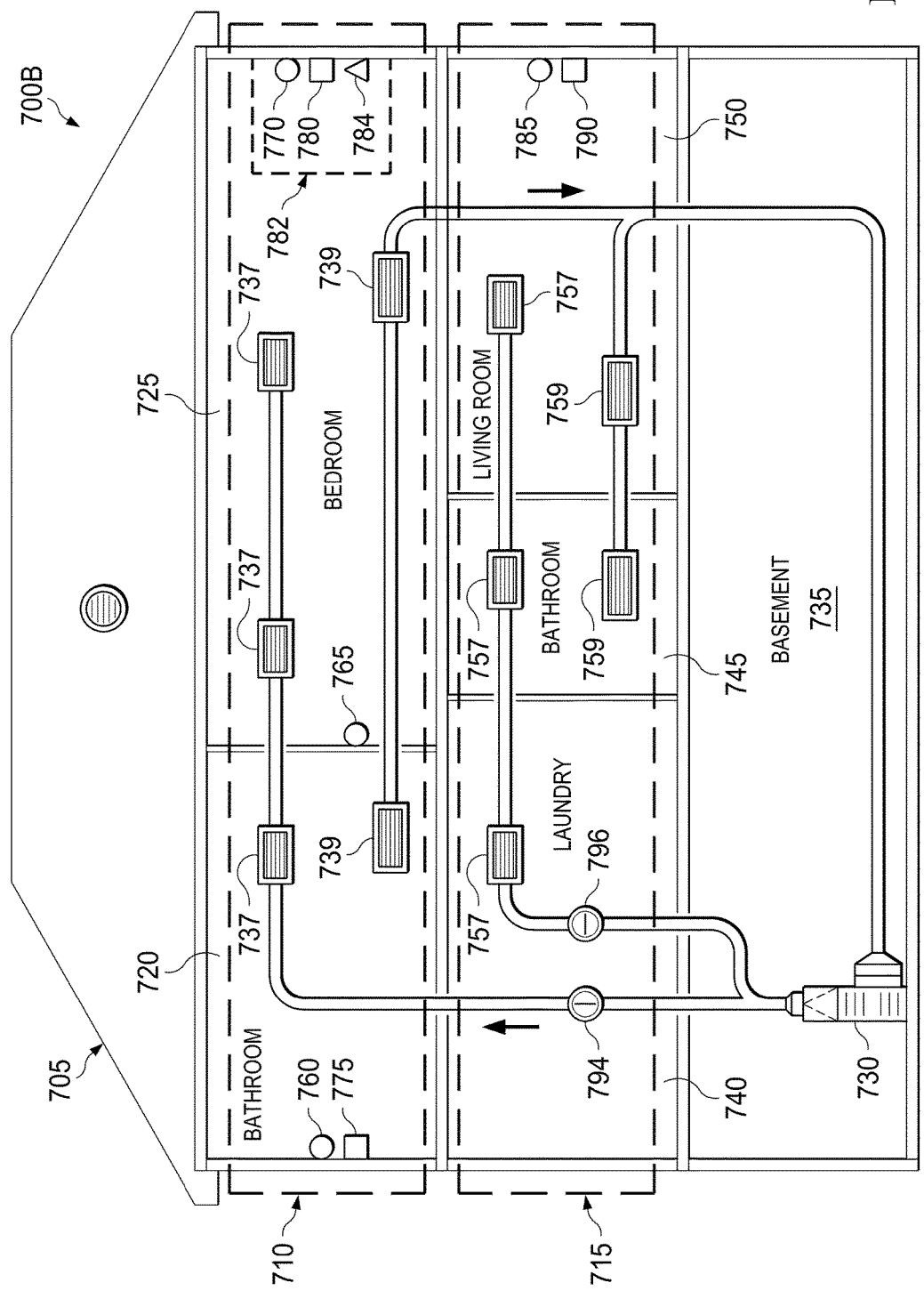

FIG. 7B illustrates an example embodiment of a zoned HVAC system, generally denoted 700B. In the system 700B, the demand unit 730 provides heating and/or cooling to both zones 710, 715. The system 700B is illustrative of embodiments in which one or more dampers 115, acting as zone controllers, open or close air paths to various portions of the system 700B to provide zoned operation. In the illustrated embodiment, a zone controller 794 (e.g. a damper) controls air flow to the zone 710, while a zone controller 796 (e.g. another damper) controls air flow to the zone 715. Each zone controller 794, 796 is controlled by a corresponding zone controller module 215 (not shown). The zone controllers 794, 796 are controlled by an active subnet controller, e.g., the subnet controller 784, that is configured to use one or more of the comfort sensors 760, 765, 770 to control the temperature of the zone 710, and to use the comfort sensor 785 to control the temperature of the zone 715. In various embodiments, the temperatures of the zones 710, 715 are independently controlled by controlling air flow to the zones via the zone controllers 794, 796. In some embodiments, the demand unit 730 is configured to provide greater air flow to one of the zones 710, 715 than the other to compensate for greater heating or cooling load or air flow requirements.

The subnet controller 784 may be configured to automatically detect the presence or register the absence of the demand units 730, 755 and the zone controllers 794, 796. In some embodiments, the subnet controller 784 automatically self-configures for zoned operation, e.g. independently controlling the temperature of the zones 710, 715, in the event that both of the demand units 730, 755 are detected. In another embodiment, the subnet controller 784 automatically self-configures for zoned operation in the event that only one of the demand units 730, 755 is detected, but both of the zone controllers 794, 796 are detected. In another embodiment, the subnet controller 784 automatically self-configures for unzoned operation in the event that only one of the demand units 730, 755 is detected, and neither of the zone controllers 794, 796 is detected. In other embodiments, the subnet controller 784 is configured for zoned or unzoned operation manually by an installer via the user interface 780.

In an embodiment, the zones 710, 715 are configured as separate active subnets. In such embodiments, the subnet controller 784 and the subnet controller 792 (FIG. 7A) are both active subnet controllers. Each of the subnet controllers 784, 792 may discover the presence of the other of the subnet controllers 784, 792, and thereby detect the presence of the associated active subnet, during a system initialization state. Discovery may be made, e.g., via a message sent by one of the subnet controllers 784, 792 to the demand units 730, 755 prompting the demand units 730 755 to respond. The subnet controllers 784, 792 may be configured to recognize that each zone 710, 715 meets or exceeds a minimum configuration necessary to support zoned operation and self-configure such that each subnet controller 784, 792 acts as an active subnet controller within its respective zone 710, 715. In some cases, one or both of the subnet controllers 784, 792 is configured such that discovery of both demand units 730, 755 is sufficient to trigger self-configuration for zoned operation.

Figure 8:
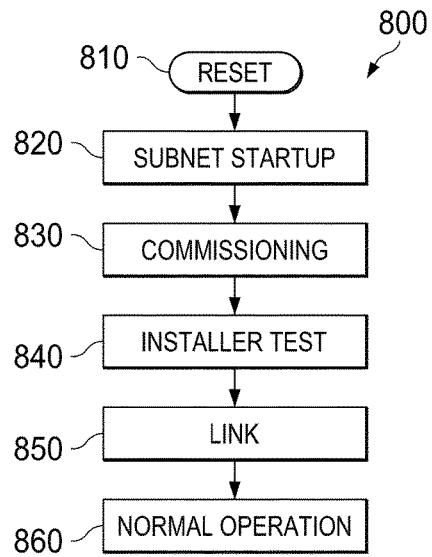
FIG. 8 illustrates operating states of the active subnet controller.

FIG. 8 illustrates an embodiment of a state sequence generally designated 800 that describes a set of states in which the aSC 230a may operate. In a state 810, the aSC 230a is reset. The state 810 may be reached by a power-up reset or a maintenance command, e.g. The aSC 230a advances to an initialization state 820, designated "subnet startup". Optionally, each local controller 290 may perform a memory functional test, e.g., a CRC check, between the reset state 810 and the subnet startup state 820.

In the subnet startup state 820, the one or more subnet controllers 230 may discover which devices are present in the network 200. Discovery may take the form, e.g., of a series of discovery messages over the data bus 180 from the one or more subnet controllers 230, and associated reply messages from the devices present.

Recalling that in various embodiments there may only be a single active subnet controller in a subnet, the one or more subnet controllers 230 arbitrate to determine which assumes the role of the aSC 230a. This arbitration may take place during the subnet startup state 820. If there is only one subnet controller 230, then the arbitration process is trivial. If there is a plurality of subnet controllers 230, the subnet controllers 230 of the plurality may exchange messages over the data bus 180 that are configured to allow the subnet controllers 230 to determine the most suitable subnet controller 230 to act as the aSC 230a. This arbitration may be based on a set of features and parameters of each subnet controller and may further be designed to ensure that the "best" subnet controller 230 available controls the subnet. For example, one subnet controller 230 may be a more recent manufacturing revision than another subnet controller 230, or may be configured to control a new component of the system 100 that other subnet controllers 230 are not configured to control. Is these examples, the subnet controller 230 with the more recent revision, or that is configured to control the new component would be regarded as the "best" subnet controller 230.

After this arbitration, one subnet controller 230 may become the aSC 230a, and from this point on may perform all control functions related to operation of the subnet of which it is a part. The aSC 230a may determine that the subnet is in a configuration state or a verification state, and may further assign or reassign all operating parameters such as equipment types and subnet IDs to all members of network 200. Generally, in a configuration state the aSC 230a may assign all system parameters to all the members of the network 200. In the verification state, the aSC 230a may verify that the parameters stored by each local controller 290 are correct, and restore any values that are determined to be incorrect.

In the discovery process, the aSC 230a may determine that a plurality of demand units 155 is present in the network 200. For example, the aSC 230a may send a message addressed to a demand unit 155, in response to which the demand unit 155 sends a reply message. In some cases, the aSC 230a may detect the presence of one or more damper controller modules 215 and comfort sensors 260. In this event, the aSC 230a may automatically self-configure for zoned operation. Self-configuration may include, e.g., associating a first comfort sensor 260 and a first UI 240 with a first zone, and associating a second comfort sensor 260 and a second UI 240 with a second zone. The zones may, but need not, correspond to different subnets of the network 200. In the event that no damper controller module 215 is discovered, e.g. a single furnace 120, the aSC 230a may self-configure for unzoned operation.

After the subnet startup state 820, the network 200 may enter a commissioning state 830. Generally, during the commissioning state 830 functional parameters of each local controller 290 may be set to properly operate within the context of each other local controller 290. For example, a blower unit may be configured during the commissioning state 830 to provide an air flow rate that is consistent with a heat output rate of a heat pump. The network 200 may remain in the commissioning state 830 until each local controller 290 therein is configured.

After the commissioning state 830, the network 200 enters an installer test state 840. In some cases, the network 200 remains in the installer test state 840 only as long as is necessary to determine if installer test functions are requested. If none are requested, the sequence 800 may advance immediately to a link state 850. If installer test functions are requested, e.g. via the UI 240, then the network 200 remains in the installer test state 840 until all requested functions are complete and then advances to the link state 850.

The sequence 800 may enter the link mode, e.g., upon request by an installer via the UI 240. For example, during installation, an installation routine may provide an option to enter the link state 850 to link subnets, e.g., the subnets 615, 620 (FIG. 6). In the link state 850, any subnets of the network 200 are configured to operate together. For example, a first subnet ID may be assigned to each local controller 290 in the subnet 615, and a different second subnet ID may be assigned to each local controller 290 in the subnet 620.

After the operations necessary to link the subnets, the sequence 800 may advance to the normal operating state 860. It is expected that the system 100 will be in the normal operating state 860 for the vast majority of its operation.

FIGS. 9-30 and associated discussion describe various aspects of the operation of a user interface. In various embodiments, the user interface includes a display to present information to a user. In various embodiments the display is touch-sensitive to allow the user to select display modes and operational attributes by touching an appropriately configured portion of the display.

Figure 9:
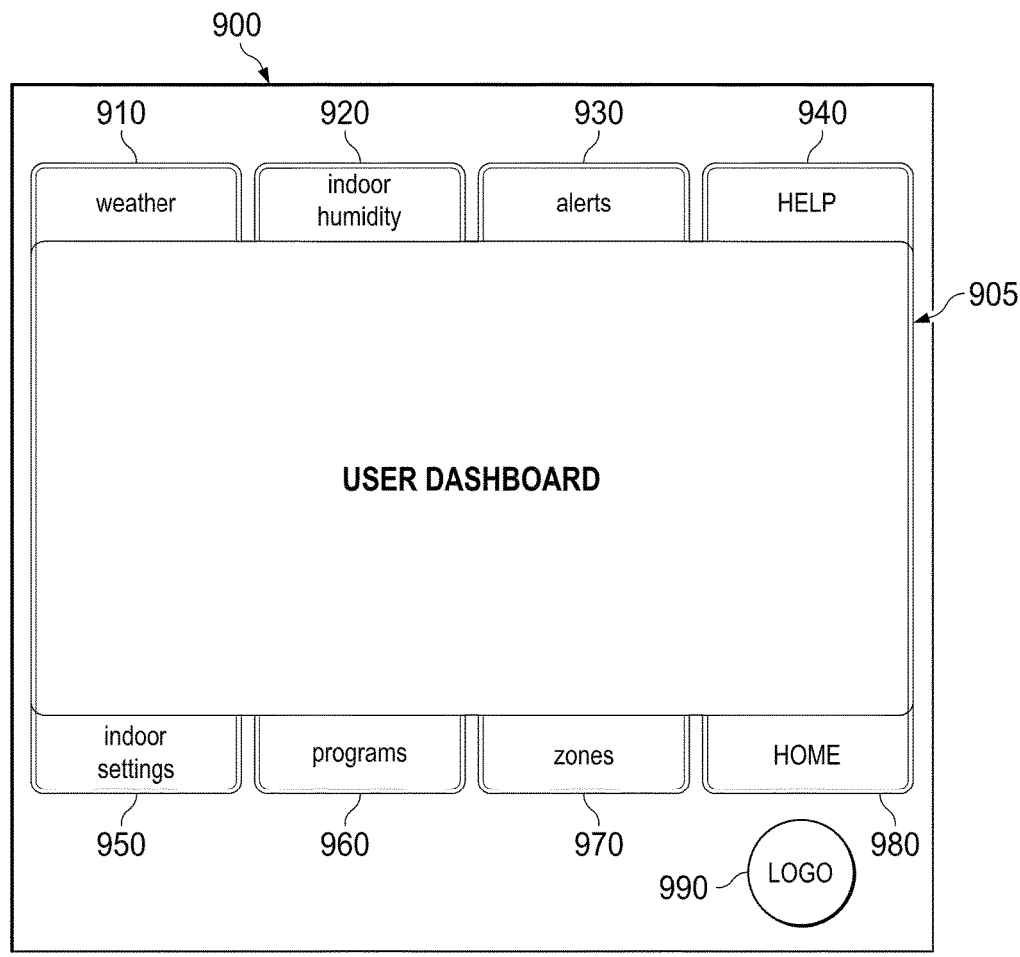
FIG. 9 illustrates a user interface display with a user dashboard.

Turning first to FIG. 9, illustrated is a user dashboard 900. The user dashboard 900 may be considered a general "palette" upon which information is presented to a user of the user interface. In some embodiments an installer dashboard is used to present information to an installer or service provider, the installer dashboard being presented in an installer mode that is not accessible to the operator in routine operation. The user dashboard 900 may be implemented using a touch-screen device, e.g. In the illustrated embodiment, eight tabs 910, 920, 930, 940, 950, 960, 970, 980 are shown without limitation. The various tabs may be associated with functions or routines associated with different operational aspects of the system 100. Each tab may further have a unique screen associated therewith appropriate to the functions or routines provided under that tab. A service soft switch 990 may provide a means for a service technician to access one or more service screens as discussed with respect to FIG. 31 below. Selection of soft switches on the service screens may invoke various setup and/or calibration routines, e.g. Optionally, the switch 990 may also double as a manufacturer logo.

In the illustrated embodiment, selection of the tab 910 accesses weather-related functions. The tab 920 is associated with indoor humidity display and control. When the tab 930 is selected the user dashboard 900 presents alert data to the user. The tab 940 provides help information.

Along the bottom of the user dashboard 900, the tab 950 is associated with indoor settings, e.g., operational attributes of the HVAC system that result in a particular temperature and/or RH of the conditioned space of a residence. For example, pressing the tab 950 may cause the display 905 to present an indoor temperature settings screen as described further below. The tab 960 allows the user to view and modify operating programs. The tab 970 allows the user to view and modify operating attributes of one or more zones of the HVAC system. The tab 980 selects a home screen that may provide a summary of operational attributes and environmental data.

The user dashboard 900 may be regarded as tailored for used when the system 100 is not zoned. For instance, when an HVAC system is zoned, typically a temperature set point is set for each zone. Thus, the tab 950, which in the illustrated embodiment is configured to provide access to "indoor settings", may be undesirable in a zoned system 100, since each zone may have a temperature setting specific to that zone. Thus, in some cases, discussed below with respect to FIG. 22B, the tabs 950, 960 may be replaced with tabs appropriate to zoned applications.

The screens associated with each tab 910, 920, 930, 940, 950, 960, 970, 980 may be accessed by touching the desired tab. Thus, in one embodiment, touching the tab 910 presents a screen associated with weather-related functions. Each screen associated with a particular tab may be accessed by touching that tab. In addition, in some cases a screen associated with one tab may be accessed directly from a screen associated with a different tab. Thus, for example, a screen associated with the indoor settings tab 950 may include a link, in the form of a soft switch, to a screen associated with the "indoor humidity" tab 920. This aspect is expanded upon below.

Figure 10:
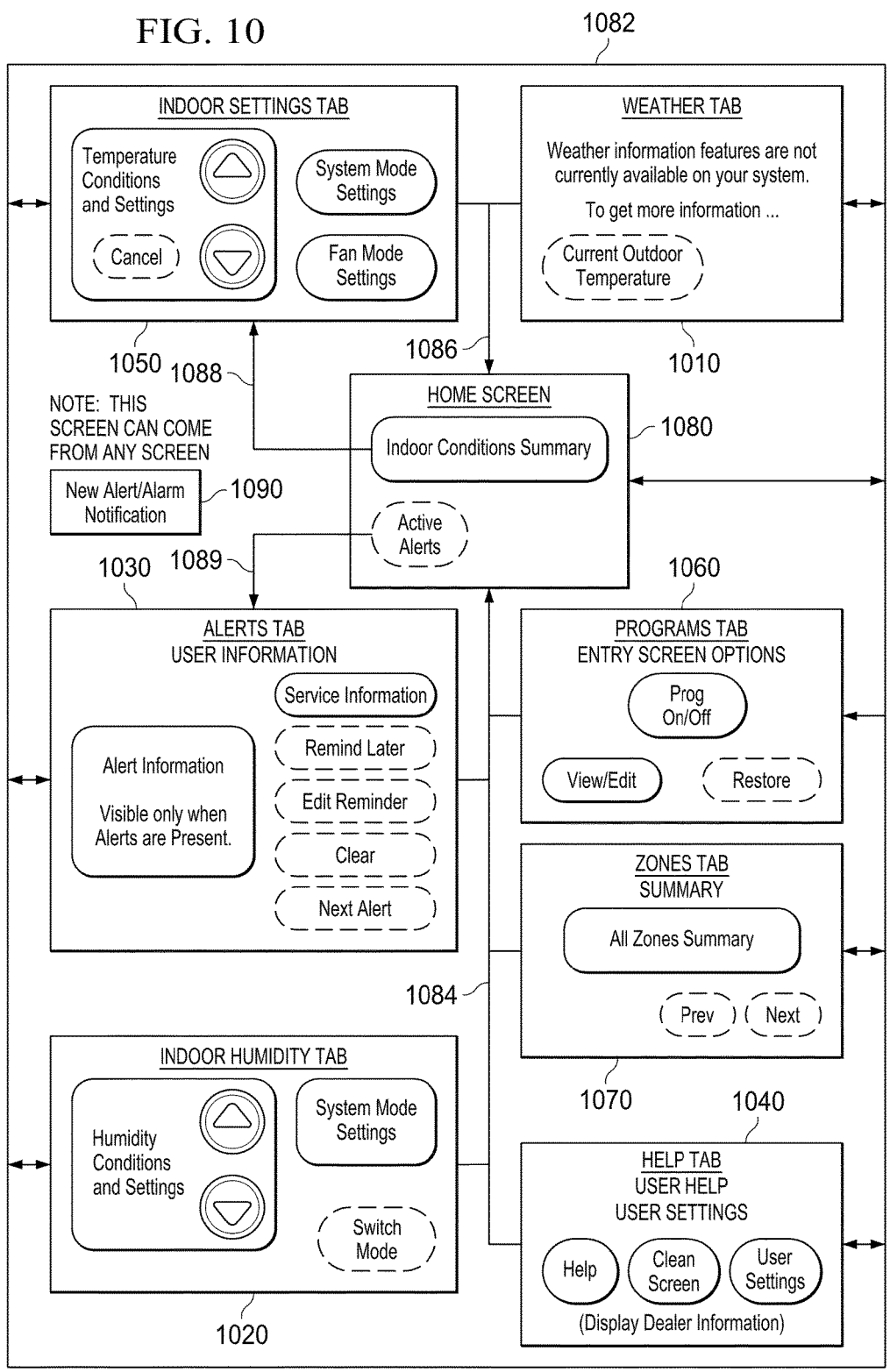
FIG. 10 is an embodiment of the disclosure illustrating navigation between screens of the user interface.

FIG. 10 illustrates an example embodiment of access transitions between the various screens associated with each tab 910, 920, 930, 940, 950, 960, 970, 980. A weather screen 1010 is associated with the weather tab 910. An indoor humidity screen 1020 is associated with the indoor humidity tab 920. An alert screen 1030 is associated with the alerts tab 930. A help screen 1040 is associated with the help tab 940. An indoor settings screen 1050 is associated with the indoor settings tab 950. A programs screen 1060 is associated with the programs tab 960. A zones summary screen 1070 is associated with the zones tab 970. A home screen 1080 is associated with the home tab 980.

A path 1082 connecting each of the screens 1010, 1020, 1030, 1040, 1050, 1060, 1070, 1080 reflects the ability of the used to access each screen by touching the tab associated with that screen, regardless of the present state of the display 905. In some embodiments, each of the screens 1010, 1020, 1030, 1040, 1050, 1060, 1070, 1080 times out after a period of inactivity, e.g. about 5 seconds. Paths 1084, 1086 may represent the screen transition that results upon timeout. In some embodiments the home screen 1080 includes a soft switch that activates the indoor settings screen 1050 to allow the user to easily navigate to functionality thereof via a path 1088. In some embodiments the home screen 1080 also includes an active alert annunciator that when selected causes the alert screen 1030 to be displayed via a path 1089. Finally, in some embodiments an alert may be displayed via a pop-up alert window 1090. The pop-up alert window 1090 may be displayed from any other screen, and so is illustrated as being independent of the paths 1082, 1084, 1086, 1088 and 1089.

Figure 11:
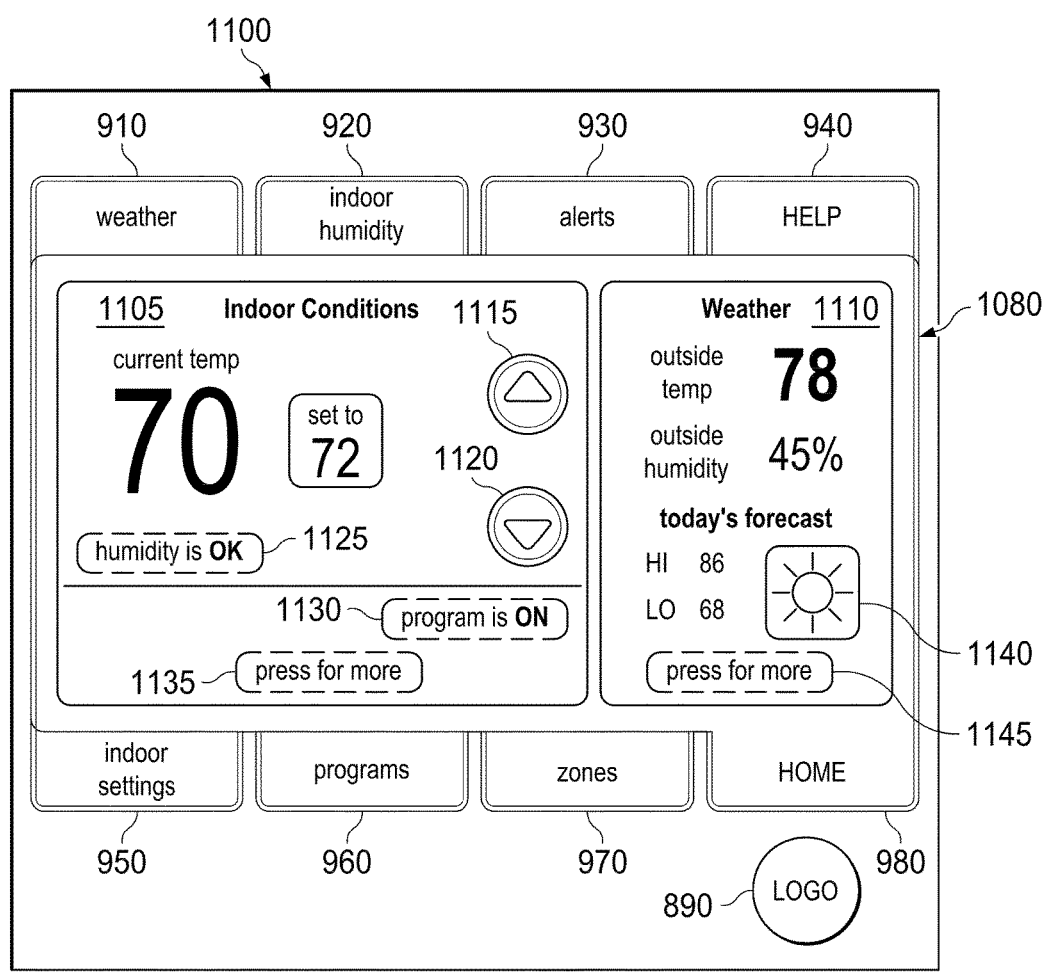
FIG. 11 is an embodiment of the disclosure illustrating a home screen of the user interface display.

Turning to FIG. 11, an embodiment, generally designated 1100, of the home screen 1080 is illustrated without limitation. The features of the home screen 1080, described following, are examples of features that some residential users of the system 100 may find useful. Those of ordinary skill in the pertinent arts will appreciate that other features, and graphical layout of features, are within the scope of the disclosure.

The home screen 1080 includes two panels 1105, 1110. The panel 1105 presents a current status of indoor conditions, while the panel 1110 presents weather information. The panel 1105 includes a display of current temperature, as determined by a comfort sensor 160 e.g., and a temperature set point. The temperature set point may be selected by soft switches 1115, 1120. A humidity status message 1125 indicates whether indoor humidity, which again may be determined by a comfort sensor 160, is within selected limit. A program status message 1130 indicates whether the UI 240 is running a heating/cooling program, as described further below. Finally, a "press for more" soft switch 1135 provides a means to enter a display mode that provides additional information and configuration choices to the user.

The panel 1110 includes an indication of outside air temperature, as determined, e.g., by an optional outdoor sensor. Outside humidity may be displayed, also as determined by an outdoor sensor. A condensed weather forecast may also be provided, including, e.g., anticipated high and low temperature and a sky condition graphic 1140. A "press for more" soft switch 1145 provides a means to enter a display mode to obtain additional weather-related information. The weather information may be received by the aSC 230*a* via the UI/G 250, e.g., or may be inferred from barometric pressure trends.

Figure 12:
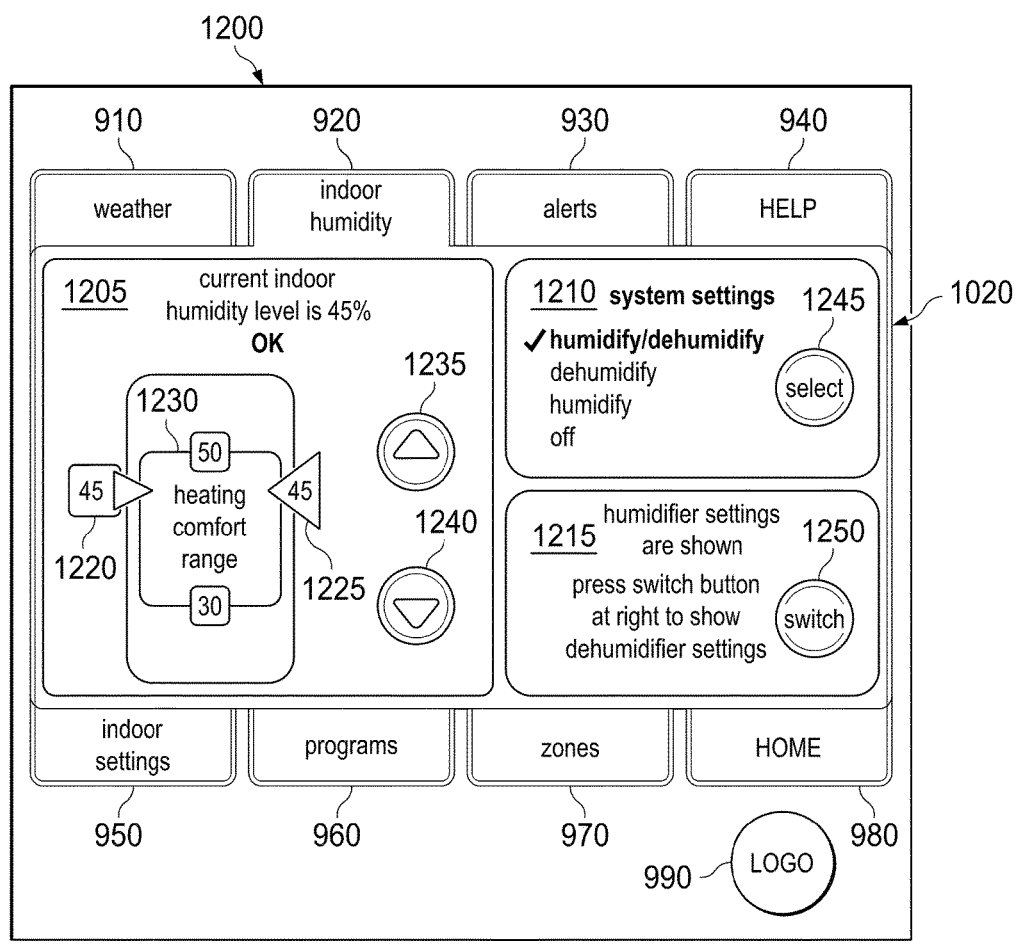
FIG. 12 is an embodiment of the disclosure illustrating an indoor humidity screen of the user interface display.

FIG. 12 illustrates an example embodiment, generally designated 1200, of the indoor humidity screen 1020 that may be displayed in response to selecting the humidity status message 1025, or selecting the humidity tab 920. In the illustrated embodiment, the indoor humidity screen 1020 includes subpanels 1205, 1210, 1215. The subpanel 1205 displays current indoor humidity 1220, humidity set point 1225, and a graphic 1230 representing a range of humidity values. Advantageously, in some embodiments, the graphic 1230 is predetermined, e.g., via firmware, to span a range of humidity that is expected to be comfortable to occupants of the structure conditioned by the system 100. Soft switches 1235, 1240 provide a means to respectively increase or increase the humidity set point.

The subpanel 1210 presents a summary view of settings of the system 100 relevant to humidity control. In various embodiments the system 100 may be configured to provide humidification, dehumidification or both. In the example embodiment of the subpanel 1210, humidify/dehumidify is checked, indicating to the user that the system 100 is enabled to increase or decrease moisture in the air to control for the humidity set point. In other embodiments, only dehumidification or only humidification is enabled, such as to reduce energy consumption, or because needed equipment is not installed to provide the unselected function, e.g. In some embodiments, "off" is checked, such as when no humidification/dehumidification capability is present in the system 100. A soft switch 1245 provides a means to switch between the various configuration options shown in the subpanel 1210.

The subpanel 1215 provides a status message indicating whether the indoor humidity screen 1020 is configured to display humidification settings or dehumidification settings. A soft switch 1250 provides a means to switch between humidification status and dehumidification status.

Figure 13:
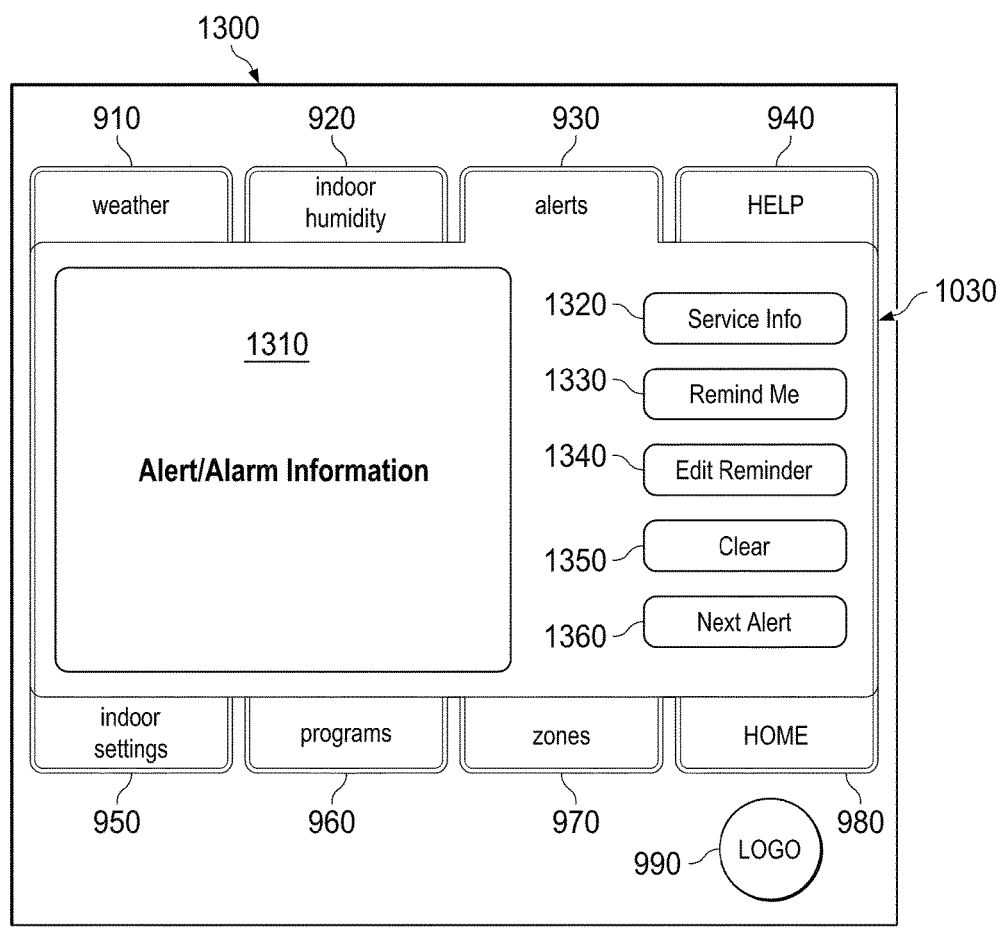
FIG. 13 is an embodiment of the disclosure illustrating an alert screen of the user interface display.

FIG. 13 illustrates an example embodiment, generally designated 1300, of the alert screen 1030 of the disclosure. In the illustrated embodiment, the alert screen 1030 includes an alert field 1310 and soft switches 1320, 1330, 1340, 1350, 1360. The alert field 1310 may be used to display information relevant to a system status of condition, such as a maintenance item, component failure, etc. A maintenance item may be replacement of a consumable part, such as a filter, humidifier pad, or UV lamp. The set of functions provided by the soft switches 1320, 1330, 1340, 1350, 1360 may be tailored to provide the operator with convenient access to various alert-related utilities.

An embodiment is presented without limitation to the types of utilities provided thereby. More specifically, the soft switch 1320 provides service information. The soft switch 1330 provides a reminder function. The soft switch 1340 provides a means to edit alert reminders. The soft switch 1350 clears an alert or alarm, and the soft switch 1360 selects the next alert/alarm when multiple alerts or alarms are active simultaneously.

Figure 14A:
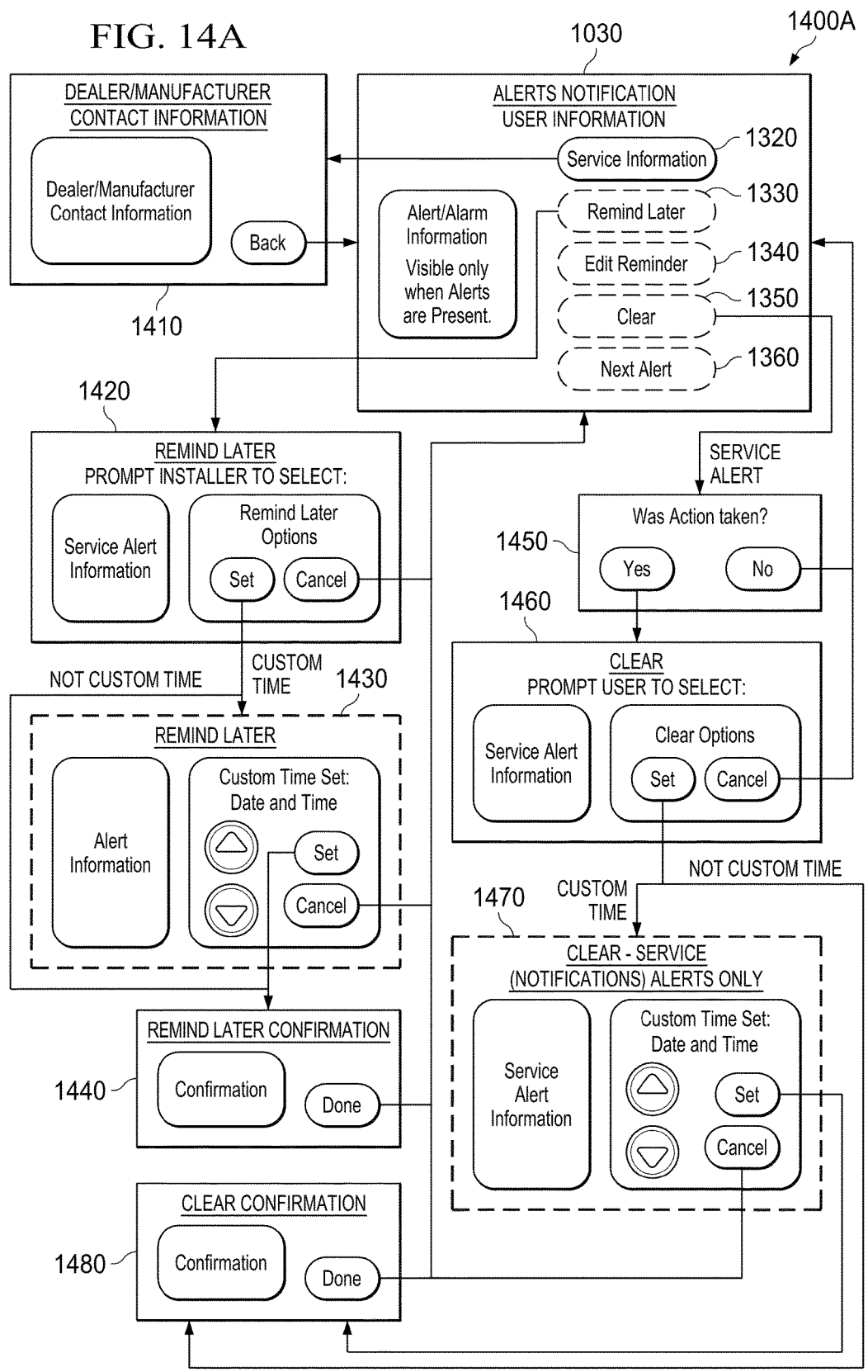
FIG. 14A is an embodiment of the disclosure illustrating navigation of the alert screen and associated subscreens of the user interface display.

FIG. 14A illustrates one embodiment generally designated 1400A of managing alerts/alarms in the system 100. Those skilled in the pertinent art will appreciate that the UI 240 may be configured to provide other functionality than that illustrated by FIG. 14A within the scope of the disclosure. Referring first to the service soft switch 1320, selection thereof may cause a service screen 1410 to be displayed. The service screen 1410 may present service-related information to the user, such as, e.g., local service provider contact information, a manufacturer or dealer help line, etc. Pressing a "back" switch returns the display to the alert screen 1030.

In some embodiments the reminder soft switch 1330 is inactive (e.g., "grayed out") for high-priority alarms or alerts, such as for a failed fan motor. For those cases in which the switch 1330 is active, the display 905 transitions to a screen 1420 when the user selects the switch 1330. The screen 1420 may present more detailed information about the alert. For example, a description of a replacement consumable may be presented, or information on the advisability of delaying action. The user may press a "cancel" switch to return the display 905 to the alert screen 1030.

Alternatively, the user may press a "set" switch, which cases a screen 1430 to be displayed. The screen 1430 may display the same or different information regarding the alert, and may present an adjustable time field and soft switches to allow the user to select a future time or a delay time before being reminded again of the alert/alarm. In an embodiment, the reminder delay time may be set to one of 1 day, 1 week, 1 month and three months. In another embodiment, the reminder delay time may be set to a custom time delay of any duration. The alert will then be generated again after the expiration of the time delay. The user may select a "cancel" switch to return to the alert screen 1030 without saving changes, or a "set" switch to advance to a screen 1440. The screen 1440 may present to the user a summary of the requested delay time for confirmation. The user may press a "done" switch to return the display 905 to the alert screen 1030.

In some cases, the alert/alarm is cleared, e.g., after replacing a consumable. The user may select the clear soft switch 1350 to reset the alert/alarm. The alert/alarm may be generated again at a future date after the expiration of a time period associated with that alert/alarm. For example, a filter may be routinely replaced every three months. The UI 240, the SC 230 or a demand unit using the filter may be configured to generate the alert/alarm after the expiration of three months.

Thus, when the user selects the clear soft switch 1350, the display 905 advances to a screen 1450. The screen 1450 presents a confirmation message to confirm that a service activity related to the alert/alarm has been performed. If the user selects a "no" switch, the display 905 returns to the alert screen 1030. If the user selects a "yes" switch, the display advances to a screen 1460. The screen 1460 may present information associated with the alert/alarm, and a "set" switch and "cancel" switch. If the user selects the cancel switch, the display 905 returns to the alert screen 1030. If the user selects the set switch, then, the display 905 may advance to one of two screens in the illustrated embodiment.

The display 905 advances to a screen 1470 in the case that the alert/alarm has a custom service period associated therewith. In this case, the screen 1470 may again present service information, and also presents a time field and selection switches. The user may select the desired service time, and select a "set" switch. Alternatively, the user may select a "cancel" switch, which returns the display 905 to the alert screen 1030. For the case that the user selects the "set" switch, the display 905 advances to a confirmation screen 1480. The screen 1480 presents a confirmation message and a "done" switch. The display 905 returns to the alert screen 1030 when the user selects the "done" switch.

For the case that an alert/alarm does not have a custom time associate therewith, the alert/alarm may have a default time associated therewith. In this case, when the user selects the "set" switch on the screen 1460, the display 905 advances directly to the screen 1480 for confirmation.

Referring again to the alert screen 1030, the edit soft switch 1340 provides a means for the operator to edit a reminder already stored in aSC 230a memory. Selecting the switch 1340 may display a screen listing active reminders available for editing. Selection of a reminder from the list may then cause the display 905 to advance to the screen 1430, wherein the operator may enter desired delay time.

Figure 14B:
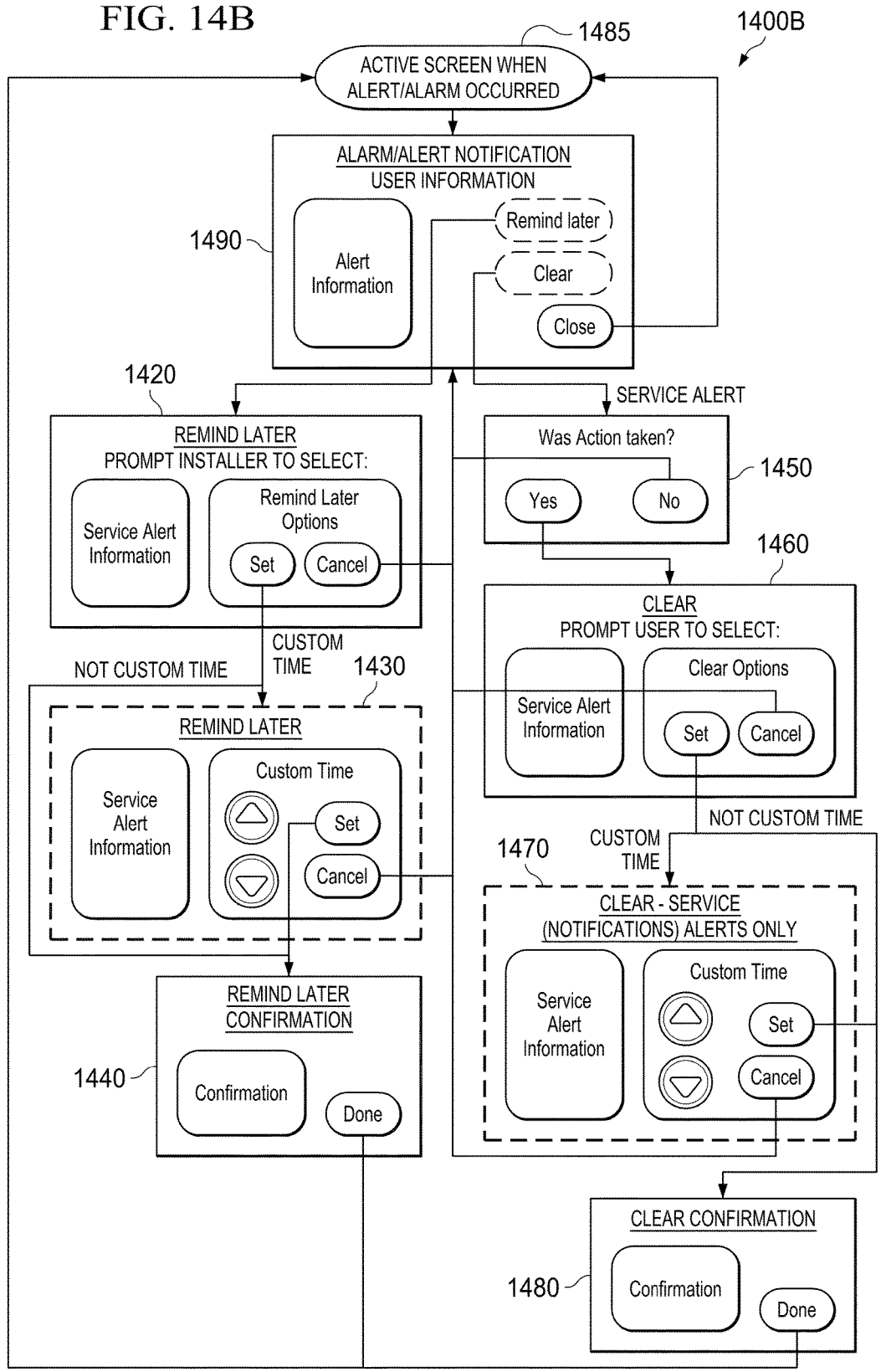
FIG. 14B is an embodiment of the disclosure illustrating navigation of a pop-up alert screen and associated subscreens of the user interface display.

FIG. 14B illustrates another embodiment of a method generally designated 1400B of managing alerts/alarms in the system 100. The method 1400B generally pertains to alerts/alarms that are displayed on the display 905 by a pop-up window. Thus, the method 1400B begins with a state 1485 that may be entered from any active screen of the display 905. From the state 1485, the method 1400B displays a screen 1490 that presents information regarding the alert/alarm to the operator. The screen 1490, an alternate embodiment of the alert screen 1030, includes a "remind later" switch, a "clear" switch and a "done" switch. When the operator selects the "remind later" switch, the method advances to the screen 1420, and continues as described previously. When the operator selects the "clear" switch, the method advances to the screen 1450, and continues as described previously. When the user selects the "done" switch, the method 1400B returns to the state 1485, e.g., the screen that was active before the screen 1490 was displayed.

Figure 15:
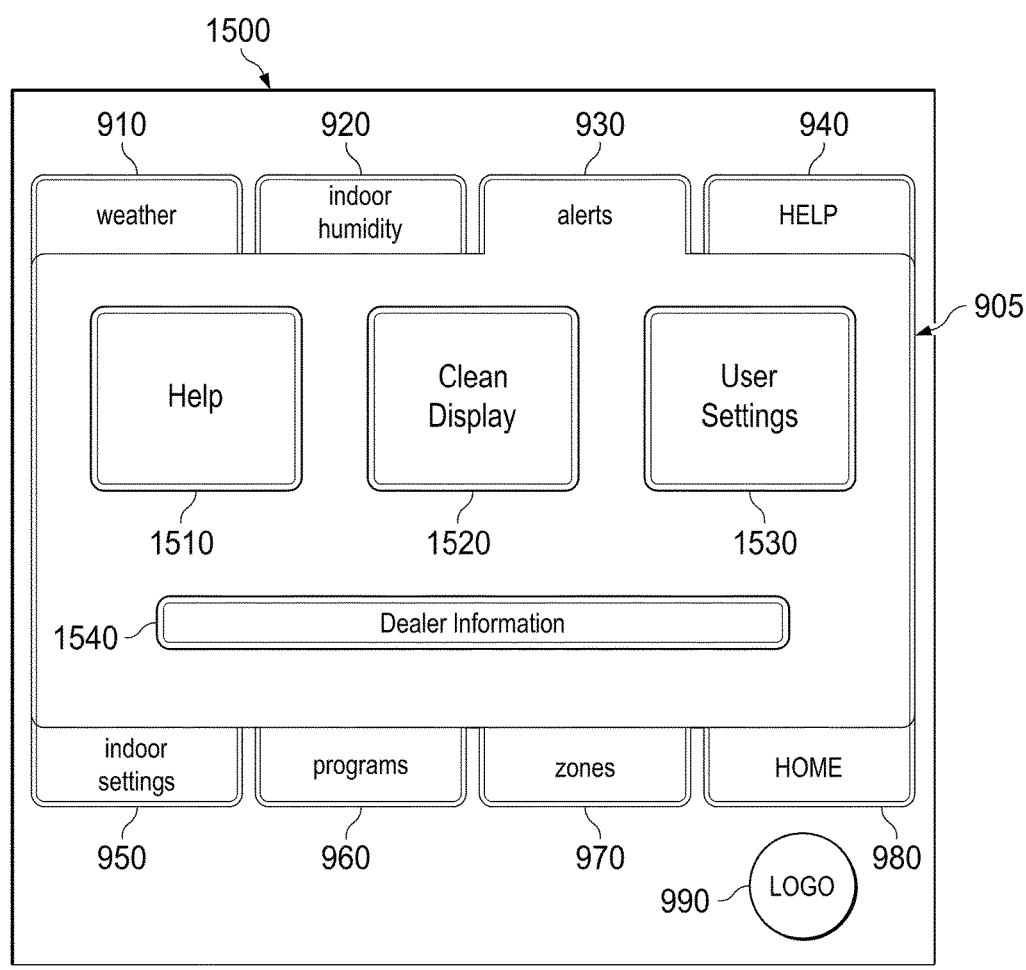
FIG. 15 is an embodiment of the disclosure illustrating a help screen of the user interface display.

Turning now to FIG. 15, a help screen generally designated 1500 is illustrated. The help screen 1500 may be displayed by the display 905 when the operator selects the help tab 940. In the illustrated embodiment, the help screen 1500 displays a help field 1510, a clean display field 1520, a user settings field 1530, and a dealer information field 1540. The behavior of the fields 1510, 1520, 1530 are described in the context of FIG. 16, below. The field 1540, when selected, may present to the operator information regarding the dealer, manufacturer or installer, such as contact information, address, etc.

Figure 16:
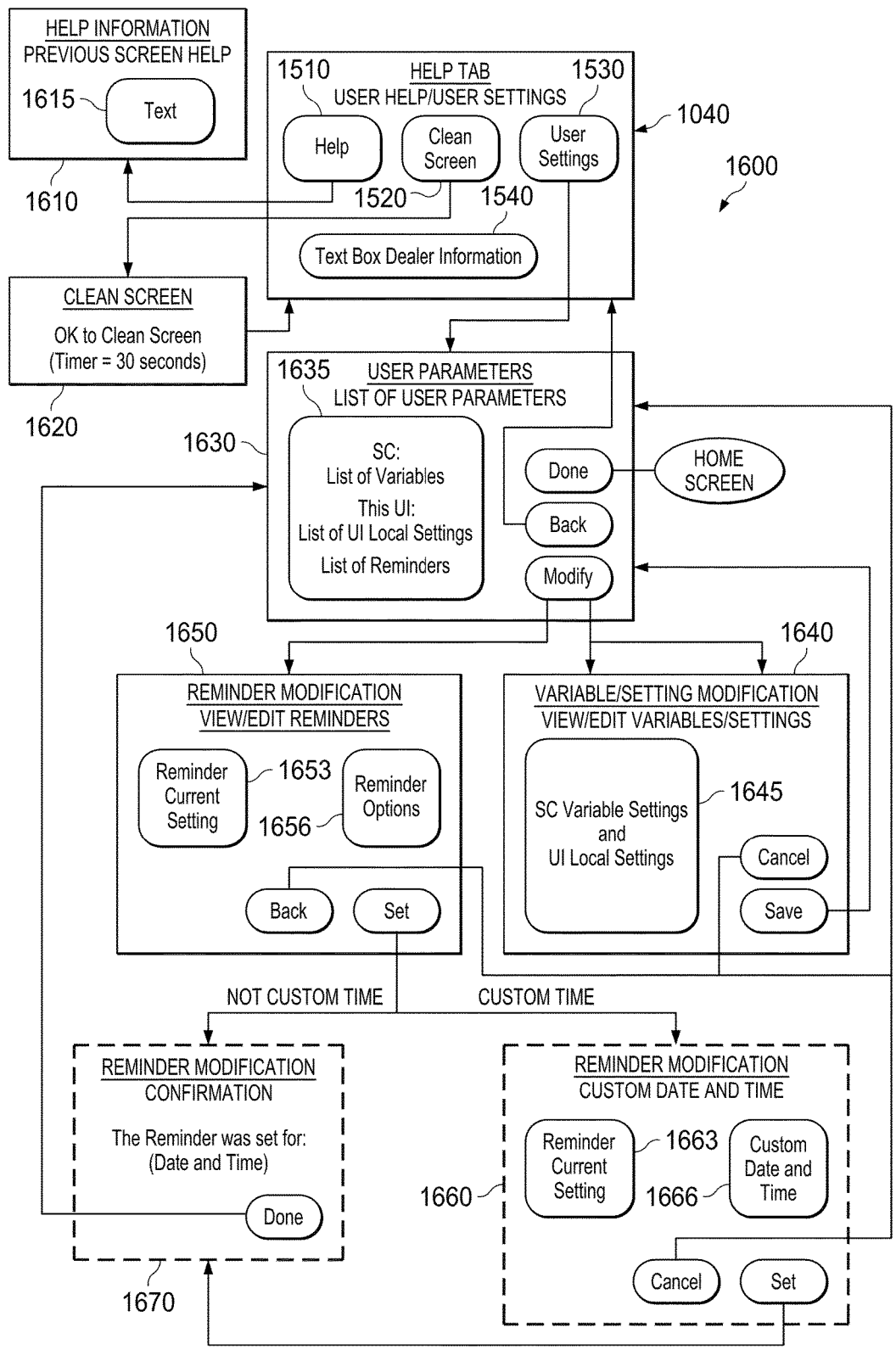
FIG. 16 is an embodiment of the disclosure illustrating navigation of the help screen and associated subscreens.

FIG. 16 illustrates an embodiment of a method generally designated 1600 of providing help to the operator via the display 905. Addressing first the help field 1510, selection thereof causes the display 905 to advance to a screen 1610. The screen 1610 displays textual information to the operator in a text field 1615. In some embodiments, the text field 1615 is also configured to be touch-sensitive, so that the display text may be advanced to a previous or a prior page, e.g., or so the display 905 reverts to a screen that was displayed prior to selection of the help field 1510.

Selection of the clean display field 1520 causes the display 905 to advance to a screen 1620. The screen 1620 is configured to allow the display 905 to be cleaned. Thus, e.g., a suitable message may be displayed, and all touch-sensitive regions of the display 905 may be disabled so that no inadvertent action is selected by contact during cleaning. The display 905 may be further configured to automatically return to the screen 1040 after a limited period, e.g., about 30 seconds, thus terminating the cleaning period.

When the user settings field 1530 is selected, the display 905 advances to a screen 1630. The screen 1630 provides an initial screen for selection of a family of parameters to modify. In one embodiment, the screen 1630 presents a field 1635 that displays a list of subnet controller variables, a list of local UI settings, and a list of reminders. In some embodiments, each list is sequentially presented to the user by a brief touch or tap of the field 1635. In another embodiment, the various list items are accessed by scrolling through a list of items. The user may select a list item by tapping thereon and selecting a "modify" switch. The action taken by the display 905 may be context sensitive, e.g., may depend on the type of parameter selected. For example, in the illustrated embodiment, selecting a subnet controller or a UI parameter causes the display 905 to advance to a screen 1640 when the modify switch is selected. Alternatively, selecting a reminder item causes the display 905 to advance to a screen 1650 when the modify switch is selected.

When the screen 1640 is active, the display 905 may present a modification field 1645. The field 1645 may be configured to provide, e.g., up/down arrows or alpha-numeric keypad to allow the operator to modify the selected parameter. After modifying the parameter value, the user may select a "save" switch to store the modified parameter value and return to the screen 1630. Alternatively, the user may select a "cancel" switch that causes the display 905 to return to the screen 1630 without modifying the selected parameter.

As described, in the event that the user selects a reminder for modification, the screen 1630 may advance to the screen 1650. The screen 1650 is illustrated having a "reminder current setting" field 1653 and a "reminder options" field 1656. The field 1653 may present the current settings associated with the selected reminder. The field 1656 may include up/down switches or a keypad to allow the operator to modify the reminder settings or options. The operator may select a "set" switch to save the modifications, or a "back" switch to return to the screen 1630 without saving changes. The action resulting from selecting the "set" switch may depend on the type of reminder, e.g., a reminder that allows a custom reminder time or a reminder that does not. If the reminder allows a custom reminder time to be associated therewith, selecting the "set" switch causes the display 905 to advance to a screen 1660. If the reminder has a fixed reminder time associated therewith, the display 905 advances to a screen 1670.

Within the screen 1660, a "reminder current setting" field 1663 and a "custom date & time" field 1666 are presented. The field 1663 may present the current value of the reminder time. The field 1666 may include up/down switches or a keypad to make changes. The operator may select a "cancel" switch to exit the screen 1660 without saving changes to the selected reminder, or may select a "set" switch to advance to the screen 1670. Within the screen 1670, the display 905 may present a confirmation of the selected reminder and reminder time. The operator may then select a "done" switch, thereby causing the display 905 to return to the screen 1630.

Figure 17:
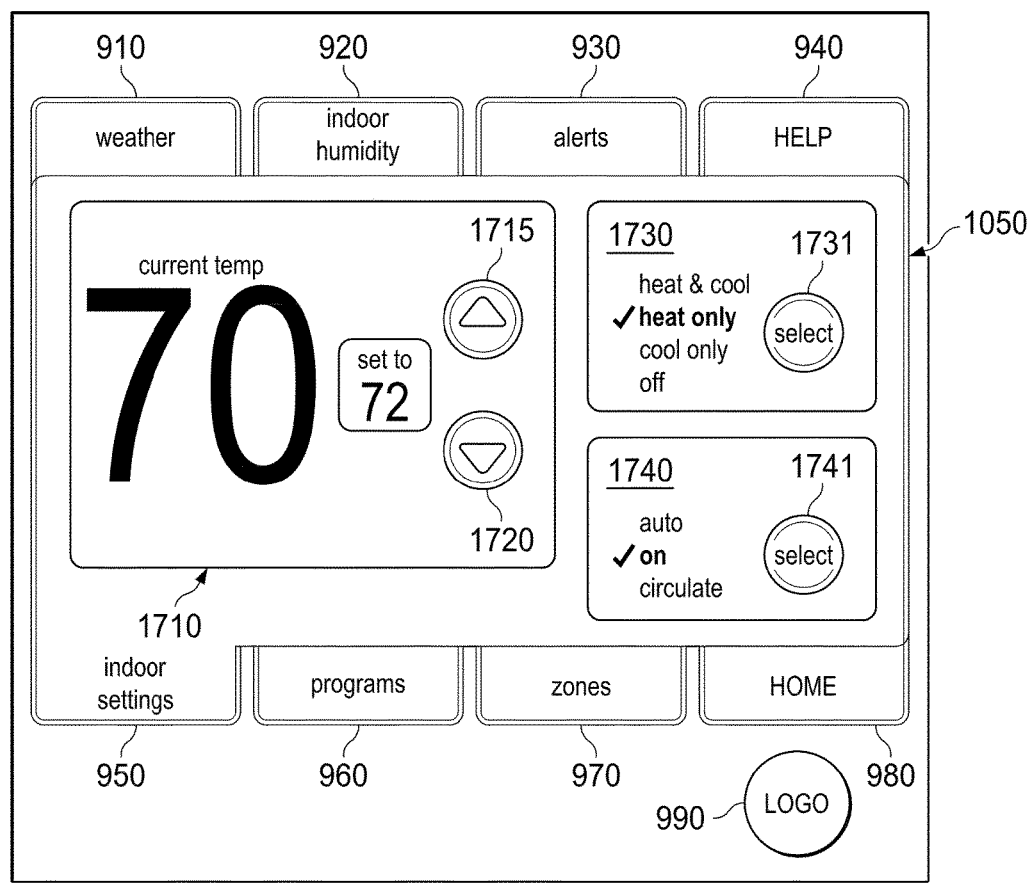
FIG. 17 is an embodiment of the disclosure illustrating an indoor settings screen of the user interface display.

Turning now to FIG. 17, illustrated is an embodiment of the indoor settings screen 1050. The indoor settings screen 1050 includes a temperature conditions and settings field 1710. The field 1710 may include, e.g., current indoor temperature and temperature set points. In some embodiments the temperature set points may be selected by up/down switches 1715, 1720. A system settings field 1730 indicates whether the system 100 is configured to heat, cool or heat and cool, or is off. A select switch 1731 may be used to change the system setting. A fan settings field 1740 indicates whether the fan associated with an air handler 110, e.g. is configured to operate automatically, is constantly on, or is set to circulate air. In this context, the system 100 circulates air by ensuring the fan operates with a minimum duty cycle, independent of heating and cooling requirements, so ensure a desired turnover rate of the air in the zone. Such operation may be advantageous, e.g., for air filtering. A select switch 1741 may be used to change the fan setting. In some cases, the indoor settings screen 1050 pertains to a selected zone.

Figure 18:
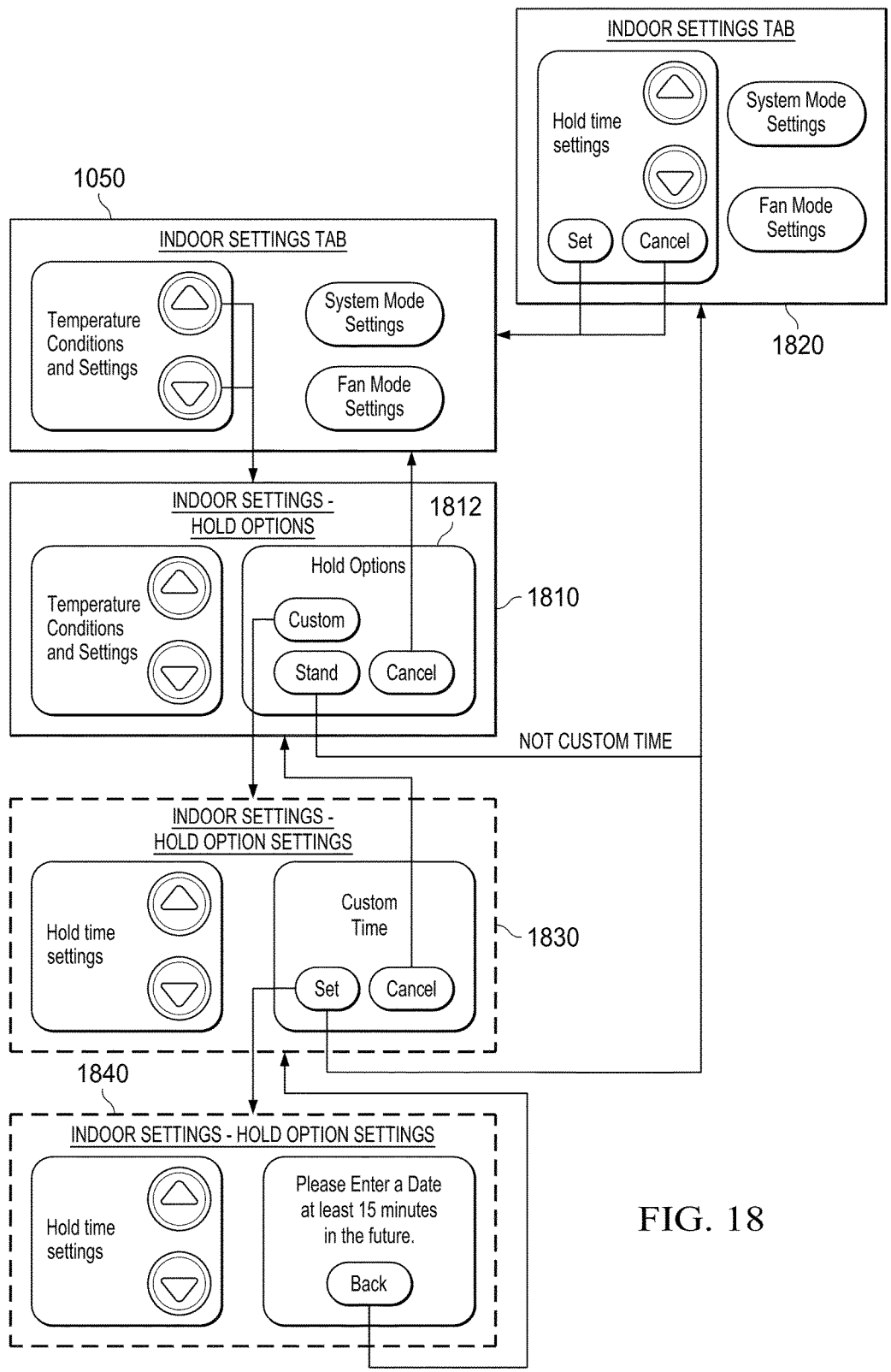
FIG. 18 is an embodiment of the disclosure illustrating navigation of the indoor settings screen and associated subscreens of the user interface display.

FIG. 18 illustrates an embodiment in which the UI 240 is running a program schedule. In some embodiments, selecting either of the switches 1715, 1720 causes the indoor settings screen 1050 to advance to a screen 1810. The screen 1810 provides a "hold options" field 1812. Selection of a "cancel" switch therein returns the display 905 to the indoor settings screen 1050. On the other hand, selection of a "standard" switch advances to a screen 1820. Within the screen 1820, the user may select a pre-programmed hold period from one or more options. Without limitation, pre-programmed hold periods may be 1 hour, 2 hours, 8 hours, or 24 hours. In some embodiments, the screen 1820 may provide the operator the option of holding the temperature and/or system and/or fan set points until a next scheduled period of the running program schedule. If the operator selects a "set" switch the UI 240 saves the hold options and returns to the indoor settings screen 1050. Alternatively, the operator may select a "cancel" switch to return to the indoor settings screen 1050 without saving any hold options.

Returning to the screen 1810, if the operator selects a "custom" switch in the field 1812, the display 905 advances to a screen 1830. Within the screen 1830, the user may select a "cancel" switch to return to the screen 1810. If the user selects a "set" switch, the display 905 advances to a screen 1840 on the first invocation of the set switch. Within the screen 1840, the operator may select a custom hold time. In one example, the hold time limited to a time at least 15 minutes in the future. The operator may then select a "back" switch to return to the screen 1830. Upon selecting the "set" switch on the screen 1830 for a second time, the display 905 advances to the screen 1820, which operates as previously described.

Figure 19:
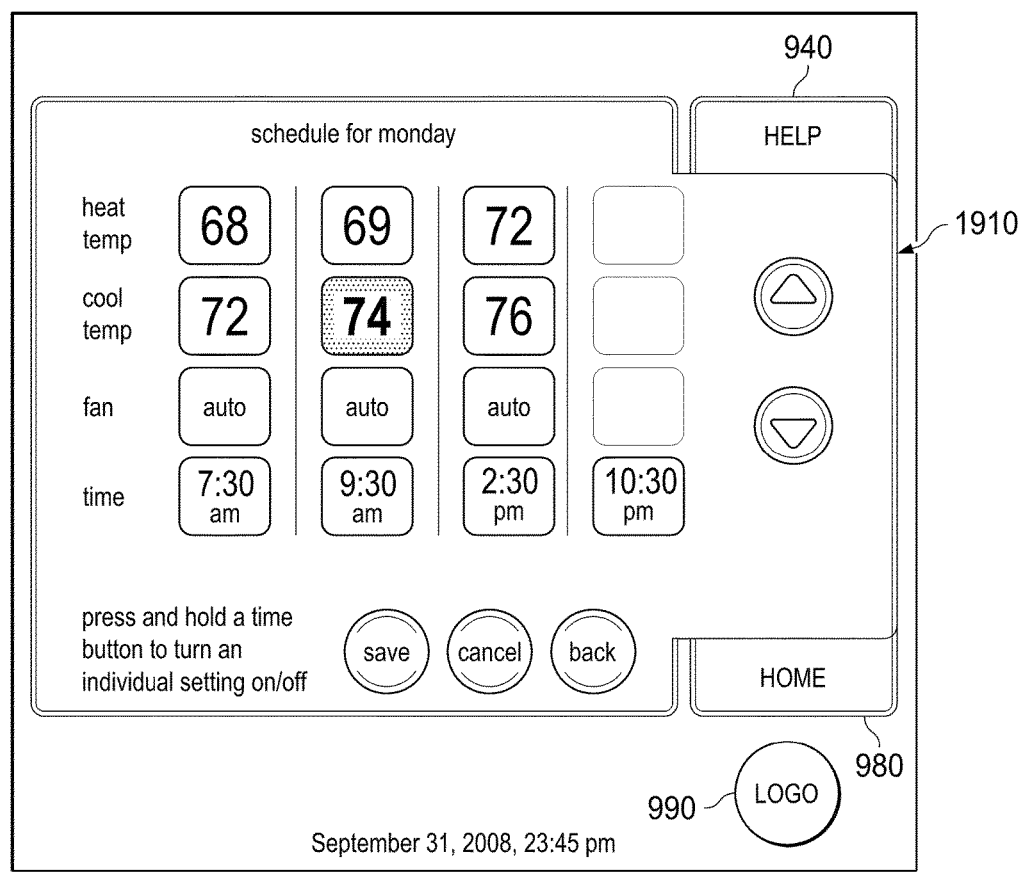
FIG. 19 is an embodiment of the disclosure illustrating a program screen of the user interface display.

FIG. 19 illustrates an example embodiment of a program screen 1910 configured to program a temperature schedule. The programs screen 1910 may be displayed, e.g., by selecting the programs tab 960 (FIG. 9). The programs screen 1910 includes four program columns. Each column has an associated time at which a program period begins. Each column allows the operator to select a heat temperature, a cool temperature, and a fan mode. Note that in the fourth column, with a corresponding time of 10:30 PM, the heat temperature, cool temperature, and fan mode are missing, indicating that this program period is not being used in the current program. Note also that in the illustrated embodiment the tabs 910, 920, 930, 950, 960, 970 are absent. The operator is thus restricted to selecting the help tab 940 or the home tab 980. Those skilled in the pertinent art will appreciate that other choices of screen configuration are within the scope of the disclosure. Of course, selecting other switches, e.g. a "save", "cancel" or "back" switch may cause another screen to be displayed. Those skilled in the pertinent art will appreciate that other choices of screen configuration are within the scope of the disclosure.

The UI 240 may be preprogrammed by the manufacturer with a temperature program. In one illustrative embodiment, the UI 240 is preprogrammed with an Energy Star compliant schedule. The following table illustrates one such schedule:

| PERIOD | TIME | HEAT | COOL | FAN |
| --- | --- | --- | --- | --- |
| 1 | 6 AM | 70 | 78 | Auto |
| 2 | 8 AM | 62 | 85 | Auto |
| 3 | 5 PM | 70 | 78 | Auto |
| 4 | 10 PM | 62 | 82 | Auto |

The Energy Star schedule may be a "default" schedule that the operator may modify or restore in various circumstances as described further below.

Figure 20:
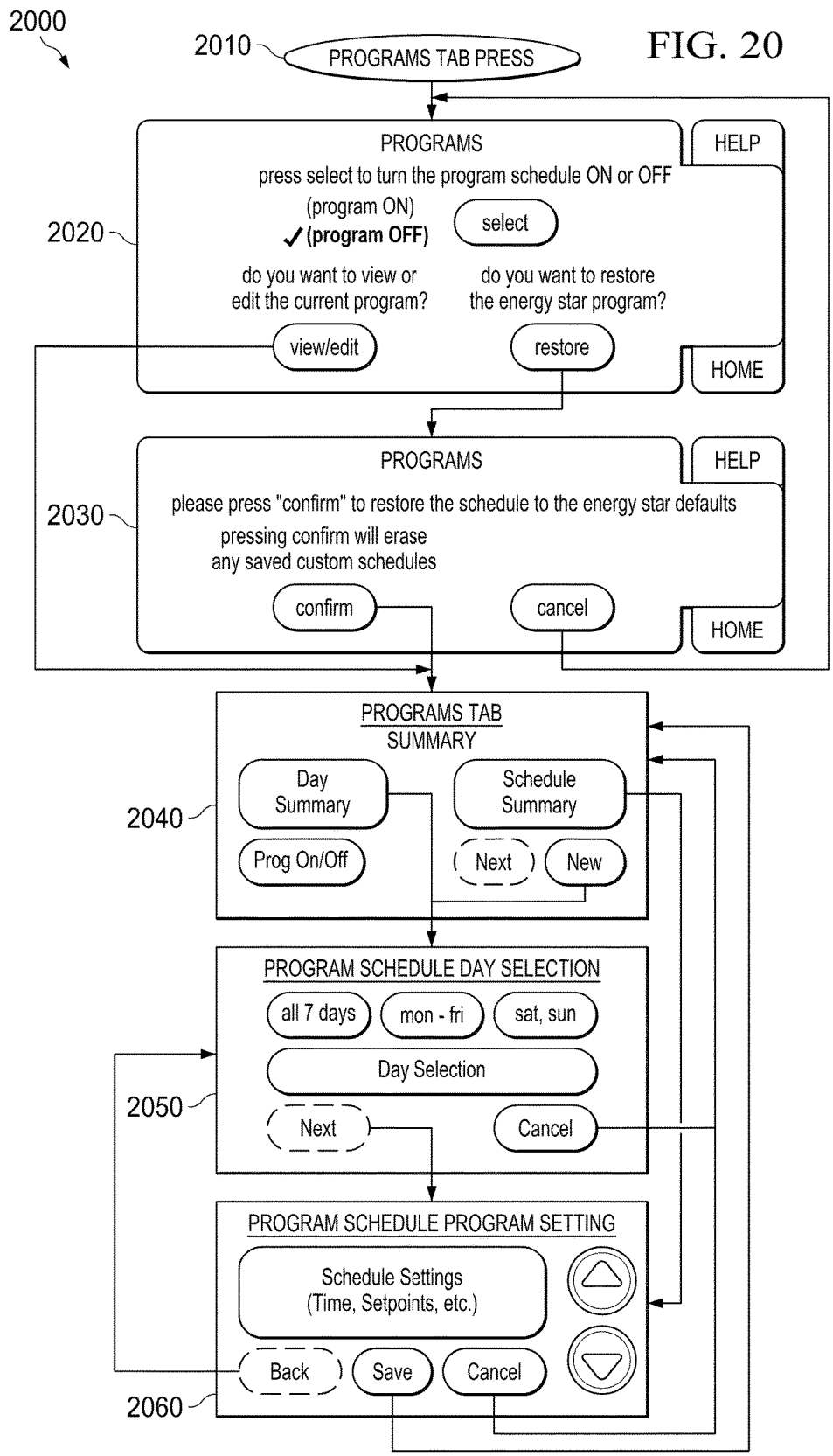
FIG. 20 is an embodiment of the disclosure illustrating navigation of the program screen and associated subscreens of the user interface display.

FIG. 20 illustrates an embodiment of a method 2000 of operating the UI 240 to program an operating schedule. The method 2000 begins with an event 2010 corresponding to selection of the programs tab 960 by the operator. The display 905 then presents a screen 2020 that prompts the operator to select whether to enable operation of a stored program. If the operator chooses to disable program operation or to maintain disabled program operation if program operation was already disabled, the operator may end the dialog by selecting the home tab 980. Alternatively, if the operator wishes to operate the system 100 using a program schedule, the operator may select a "view/edit" switch or a "restore" switch.

As the UI 240 is configured in the method 2000, selection of the "restore" switch of the screen 2020 restores the operating program to a preprogrammed operating program, e.g., the Energy Star default program exemplified by the table above. If the operator elects to restore the program by selecting the "restore" switch of the screen 2020, then the display advances to a confirmation screen 2030. Selection of a cancel switch therein causes the display 905 to return to the screen 2020 without saving changes. Alternatively, selection of a "confirm" switch causes the display 905 to advance to a summary screen 2040.

The screen 2040 presents a program schedule group that includes a day summary field and a schedule summary field. These fields are configured in the illustrated embodiment to cause the display 905 to advance to another screen when selected. These fields may also include a summary of the associated program entity. Thus, e.g., the day summary field may present a summary of the day or days associated with a program group, and the schedule summary field may present a summary of the time and set points associated with the program group.

When the operator selects the day summary field, the display 905 advances to a screen 2050. Alternatively the screen 2050 may be displayed if the operator selects a "new" switch in the screen 2040. In the illustrated embodiment the screen 2050 includes a "7 day" field, a "mon-fri" field and a "sat-sun" field. Selection of one of these fields selects the days of the week associated with that switch. Alternatively, the operator may select a "day selection" field that allows the operator to select any combination of days that are not otherwise scheduled. The operator may select a "cancel" switch to discard changes and return to the screen 2040, or may select a "next" field to advance to a screen 2060.

The screen 2060 includes a "schedule settings" field and up/down arrows. The user may select a value within the schedule settings field, e.g., time or set points, and change the selected parameter to a desired value using the up/down arrows. The user may select a "cancel" switch to discard changes and return to the screen 2040, or may select a "back" switch to return to the screen 2050. From this screen, the operator may select another unscheduled day or days and select parameters associated with these days via the screen 2060. The operator may select a "save" switch in the screen 2060 to save all changes to the schedule and return to the screen 2040.

Figure 21:
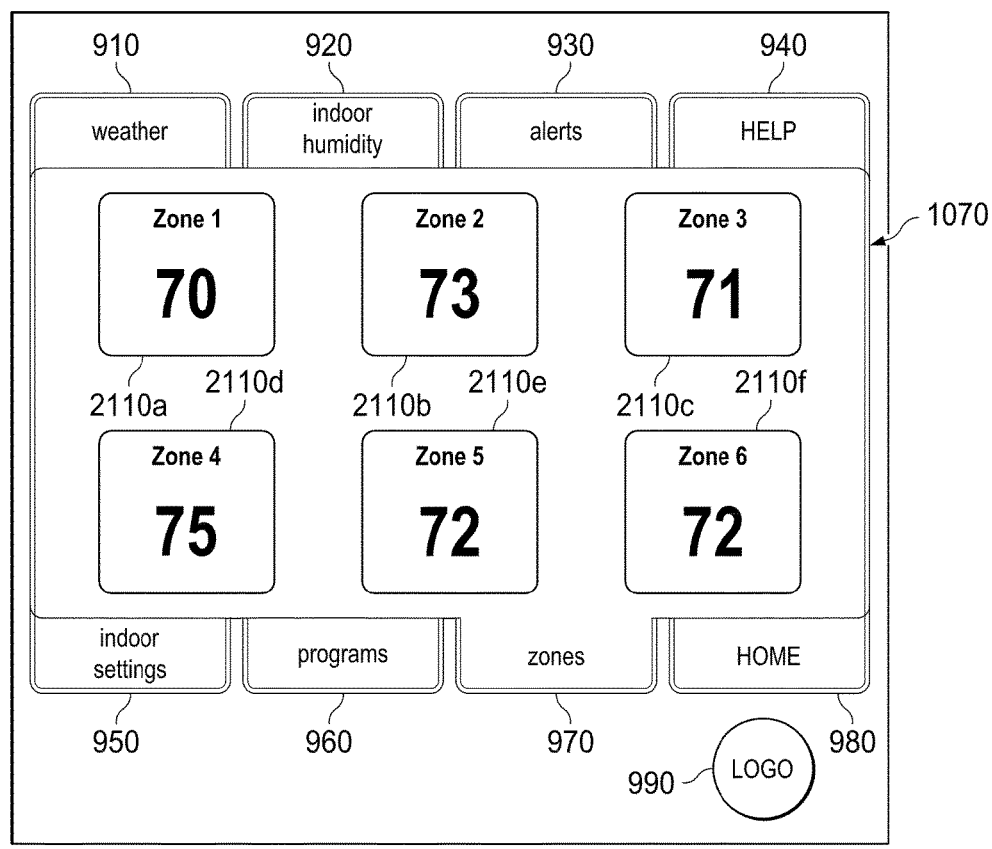
FIG. 21 is an embodiment of the disclosure illustrating a zones screen of the user interface display.

Turning now to FIG. 21, illustrated is an embodiment of the zones summary screen 1070. The zones summary screen 1070 displays one or more zone summary fields, e.g. fields 2110a-f, one summary field 2110a-f being associated with each zone of the system 100. Each summary field 2110a-f includes the zone name and the current temperature of that zone. The zone name may be named more specifically, e.g., kitchen, upstairs, etc. While six zones are shown in the illustrated embodiment, in some cases the system 100 includes more that six zones, or includes more zones than will fit on a single screen of the display 905. In such a case, the zones summary screen 1070 may include a "next" switch and a "previous" switch to navigate among as many screens as are necessary to present all the zones.

Figure 22A:
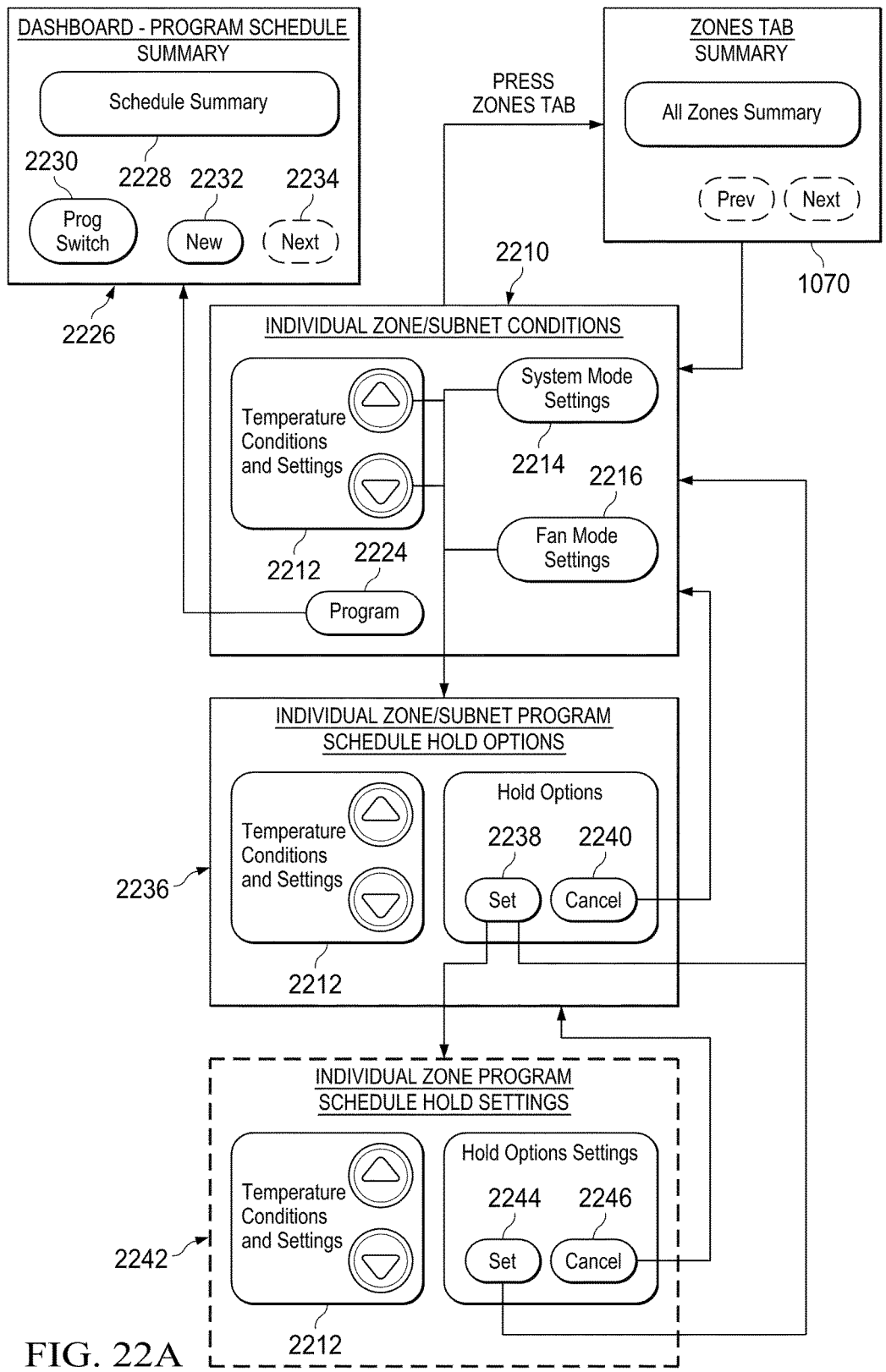
FIG. 22A is an embodiment of the disclosure illustrating navigation of the zones screen and associated subscreens of the user interface display.

FIG. 22A illustrates an embodiment generally designated 2200 of operation of the display 905 when the zones tab 970 is selected. From the zones summary screen 1070, the display 905 may advance to a zone setting screen 2210 when, e.g., one of the zone summary fields 2110a-f is selected.

Figure 22B:
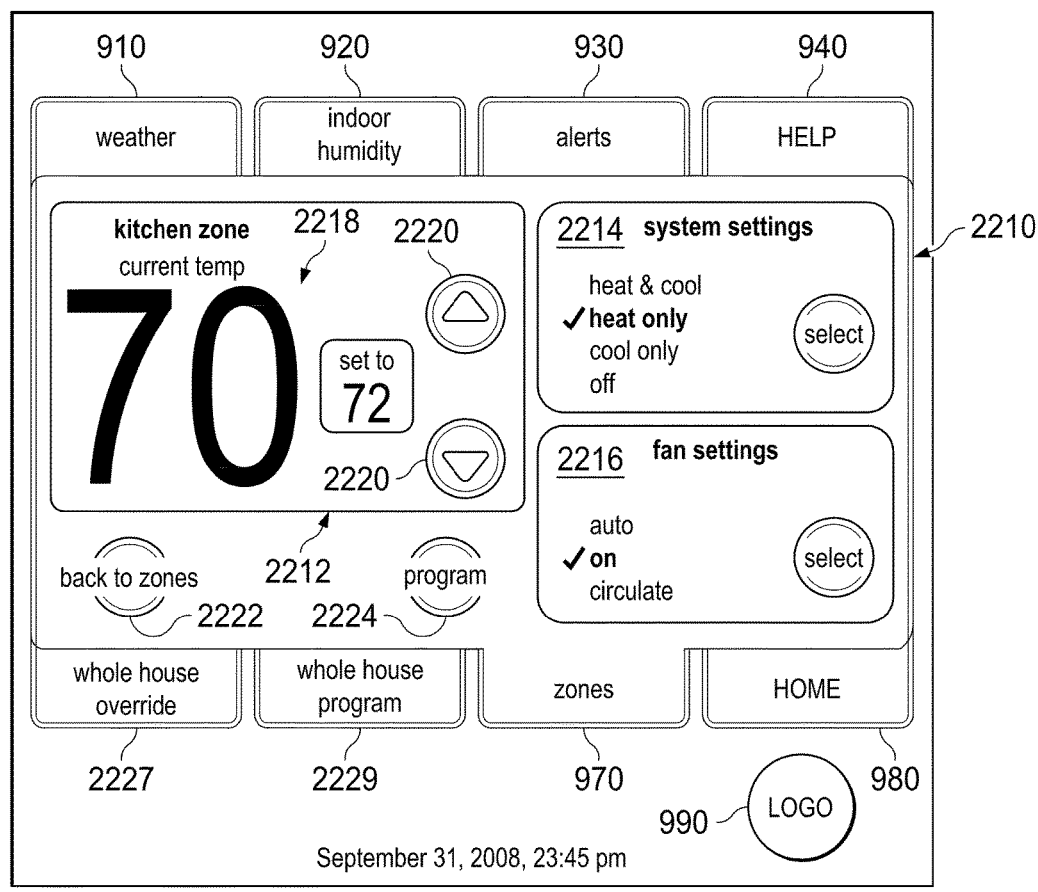
FIG. 22B is an embodiment of the disclosure illustrating a zones detail screen.

Turning momentarily to FIG. 22B, illustrated is one embodiment of the zone setting screen 2210 for a particular zone, e.g. a "kitchen zone". The screen 2210 includes a setpoint field 2212, a system settings field 2214 and a fan settings field 2216. The fields 2212, 2214, 2216 display information about and allow changes to only parameters associated with an indicated zone, e.g. "kitchen". The setpoint field 2212 may be functionally similar to the indoor settings screen 1050 (see, e.g., FIGS. 17 and 18), and may include, e.g., a temperature/set point display 2218, and up/down switches 2220 to adjust the temperature set point. The screen 2210 also includes a back switch 2222 that when selected may return the display 905 to the zones summary screen 1070. A program switch 2224 may be used to activate a program screen, e.g. similar to the programs screen 1910, associated with the indicated zone. In the illustrated embodiment, the screen 2210 includes a whole-house override tab 2227 and a whole house program tab 2229 the operation of which is discussed below.

The operation of the screen 2210 may be similar to that of the indoor settings screen 1050, but may be configured to control only aspects of the selected zone. The operator may make any desired changes and then select the zones tab 970 to return to the zones summary screen 1070 if desired to make changes to other zones. Alternatively, the operator may select any of the other tabs 910, 920, 930, 940, 950, 960, 980 to exit the screen 2210.

Returning to FIG. 22A, when the operator selects the program switch 2224, the display 905 may advance to a program summary screen 2226. The summary screen 2226 may include a schedule summary field 2228 that may present to the operator a summary of a step programmed for the zone selected via one of the zone summary fields 2110a-f. A program switch 2230 may be configured to select a program operation mode for the selected zone. For example, successive selection of the switch 2230 may cycle the program operation for the selected zone between off, independent program operation, and operation in which the selected zone follows a house-level program. When independent program operation is selected, a "new" switch 2232 may become active, allowing the operator to add a step to the program for the selected zone. If there are multiple program events for the selected zone, a "next" switch 2234 may also be active, allowing the operator to cycle through the existing program events.

Returning to the screen 2210, if the operator selects any of the setpoint field 2212, the system settings field 2214 or the fan settings field 2216, the display 905 may advance to a hold options screen 2236. The screen 2236 may again present the user the setpoint field 2212, and further provide a set switch 2238 and a clear switch 2240. Selection of the clear switch 2240 may return the display 905 to the screen 2210.

Selection of the set switch 2238 may cause the display 905 to advance to a hold settings screen 2242. The screen 2242 may again present the user with the setpoint field 2212, and further provide a set switch 2244 and a clear switch 2246. Selection of the clear switch 2246 may return the display 905 to the screen 2236. Selection of the set switch 2244 may save a temperature set point selected via the up/down switches 2220 and return the display 905 to the screen 2210.

As noted above, the screen 2210 includes a "whole house override" tab 2227 and a "whole house program" tab 2229. These tabs may be used as an alternative to the tabs 950, 960, or may temporarily replace the tabs 950, 960 only after the user selects the zones tab 970. In this sense, the screen 2210 is tailored for use when the system 100 is zoned. In some cases, the tabs 2227, 2229 may revert to the tabs 950, 960 after the operator exits a screen sequence associated with the zones tab 970.

The whole house override tab 2227 may allow the operator to view, edit, or enable an override function for all zones in the house. In some embodiments the override is effective regardless of the program schedule a particular the zone is running. The whole house override tab 2227 may also provide a means for the operator to override a current program schedule in each zone.

The whole house program tab 2229 may allow the operator to view, edit, or enable current program schedule events, and to create additional program schedule events associated with the whole house program schedule. The house program tab 2229 also may be configured to provide a means to program event times, temperature set points, and the fan mode for each period of the day.

Figure 23:
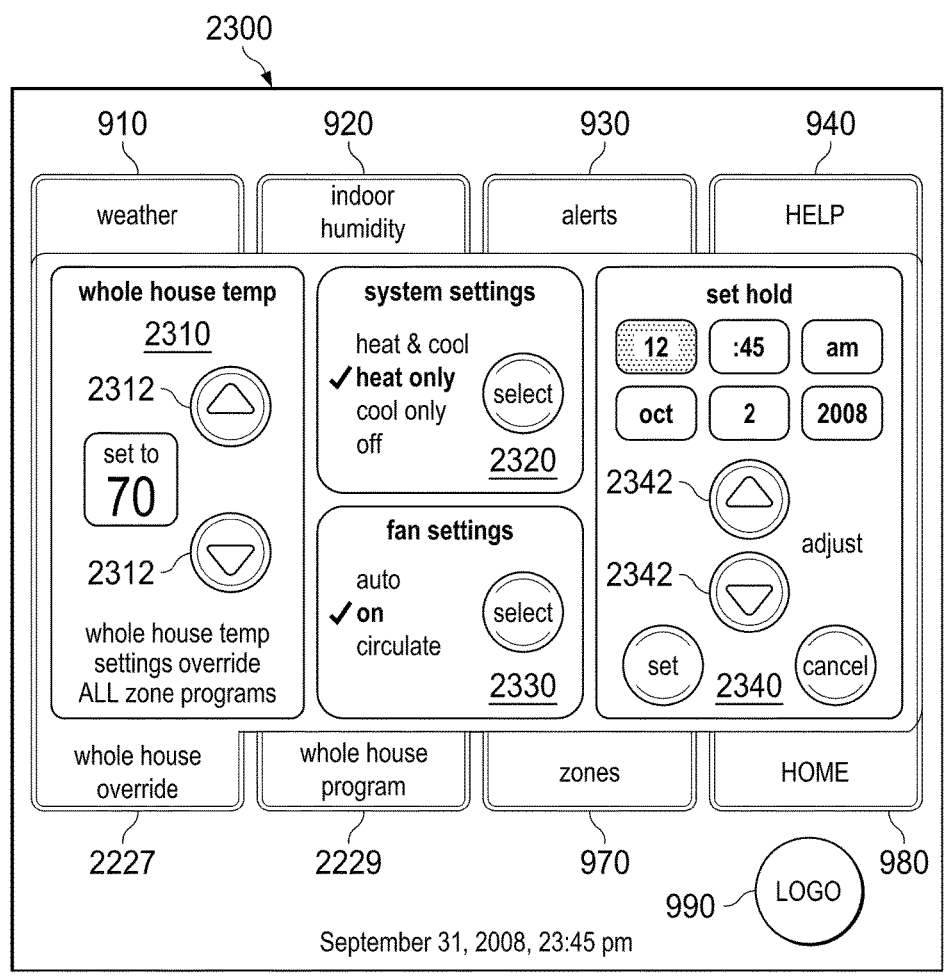
FIG. 23 is an embodiment of a whole-house override screen.

Turning to FIG. 23, illustrated is an embodiment of a whole house override screen 2300 that may be displayed when the whole house override tab 2227 is selected. The override screen embodiment 2300 includes a whole house temperature field 2310 with which the operator may view a temperature setting and make adjustments to the temperature via up/down switches 2312. A system settings field 2320 may be used to view and select a system operation mode, e.g., heat & cool, heat only, cool only and off. A fan settings field 2330 may be used to view and select a fan operating mode, e.g., auto, fan and circulate. A hold options field 2340 may be used to view and select a hold time. The hold options field 2340 includes, e.g., an adjustable hold time and date, a set switch and a clear switch. Time and date values may be adjusted by adjustment switches 2342.

Advantageously, the override screen 2300 provides a means to override program schedules until the hold time and date for all zones in the system 100 from a single display screen, e.g., a single UI 240. The UI 240 may communicate the requested hold settings to each subnet controller corresponding to each zone in the network 200. Each subnet controller may then control the operation of its corresponding zones to, e.g., hold a temperature until the specified end time.

Figure 24:
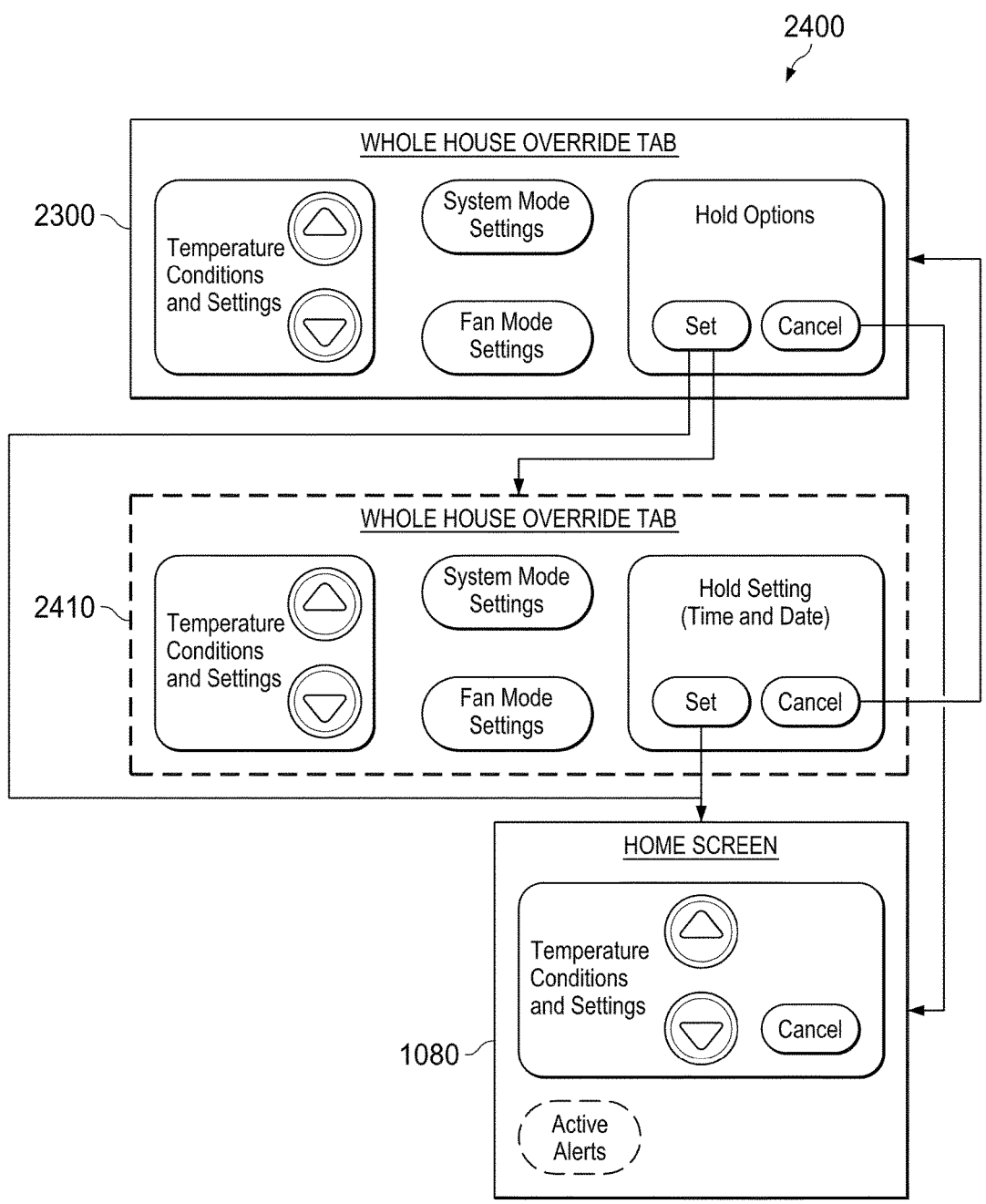
FIG. 24 is an embodiment of a method of navigating the whole-house override screen and associated subscreens of the user interface display.

FIG. 24 illustrates operation of the override screen 2300 for overriding zone settings in the system 100. The override screen 2300 may be accessed by selecting the whole house override tab 2227. If the operator selects a clear ("C") switch, the display 905 may return to the home screen 1080 and discard any changes the operator may have made. If the operator selects a set ("S") switch of the screen 2300, the display 905 may advance to a screen 2410 in which adjustment arrows may become active to select a custom time & date hold time. Selecting a clear switch of the screen 2410 may discard any changes and return the display 905 to the screen 2300. Alternatively, selecting a set switch of the screen 2410 may return the display 905 to the home screen 1080. In the case that the operator does not select the custom hold time option in the screen 2300, selecting the set switch thereof also may return the display 905 to the home screen 1080.

Figure 25:
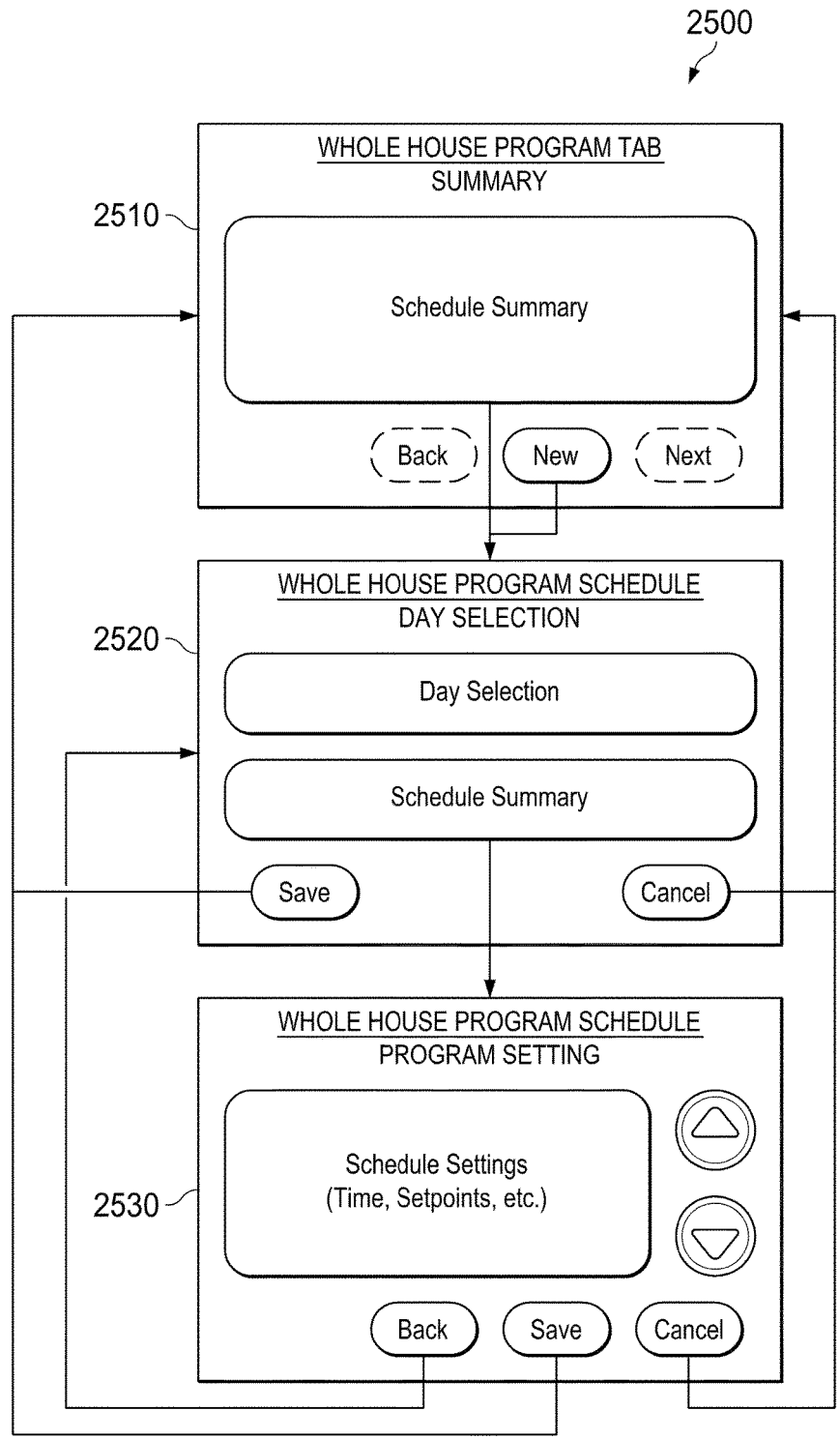
FIG. 25 is an embodiment of the disclosure illustrating navigation of whole-house program screen and associated subscreens of the user interface display.

FIG. 25 illustrates a method generally designated 2500 of setting parameters of a whole house program for the system 100. A whole house program screen 2510 may be displayed when the whole house program tab 2229 (FIG. 22B) is selected. The whole house program may override any zone settings previously set. The screen 2510 may present a schedule summary field, and "new", "back" and "next" switches. Selecting the schedule summary field or the "new" switch may cause the display 905 to advance to a day selection screen 2520. The screen 2520 may include a "day selection" field and a "schedule summary" field, e.g. If a whole house program entry already exists, the day selection field may display the day of that entry. The schedule summary field may display the times and set points associated with the displayed day. If a whole house program does not already exist, or in the event the operator selected the "new" switch of the screen 2510, the "day selection" field may be selected to choose a day for a schedule entry. The operator may then select the "schedule summary" field to advance to a program setting screen 2530.

The screen 2530 may include a "schedule settings" field. The schedule settings field may include time and temperature set point subfields. The operator may select a desired subfield and use up/down switches to select a desired value of the selected parameter. Selecting a "cancel" switch in the screen 2520 or the screen 2530 may discard any entries and return the display 905 to the screen 2510. Selecting a "save" switch in the screens 2520, 2530 may return the display 905 to the screen 2510 while saving the entries. A "back" switch on the screen 2530 may cause the display 905 to return to the screen 2520, e.g. to select a different day before saving. In cases in which there are multiple entries in the whole house program, the "back" and "next" switches of the screen 2510 may be active, allowing the operator to select an existing schedule entry in the whole house program for modification.

Figure 26:
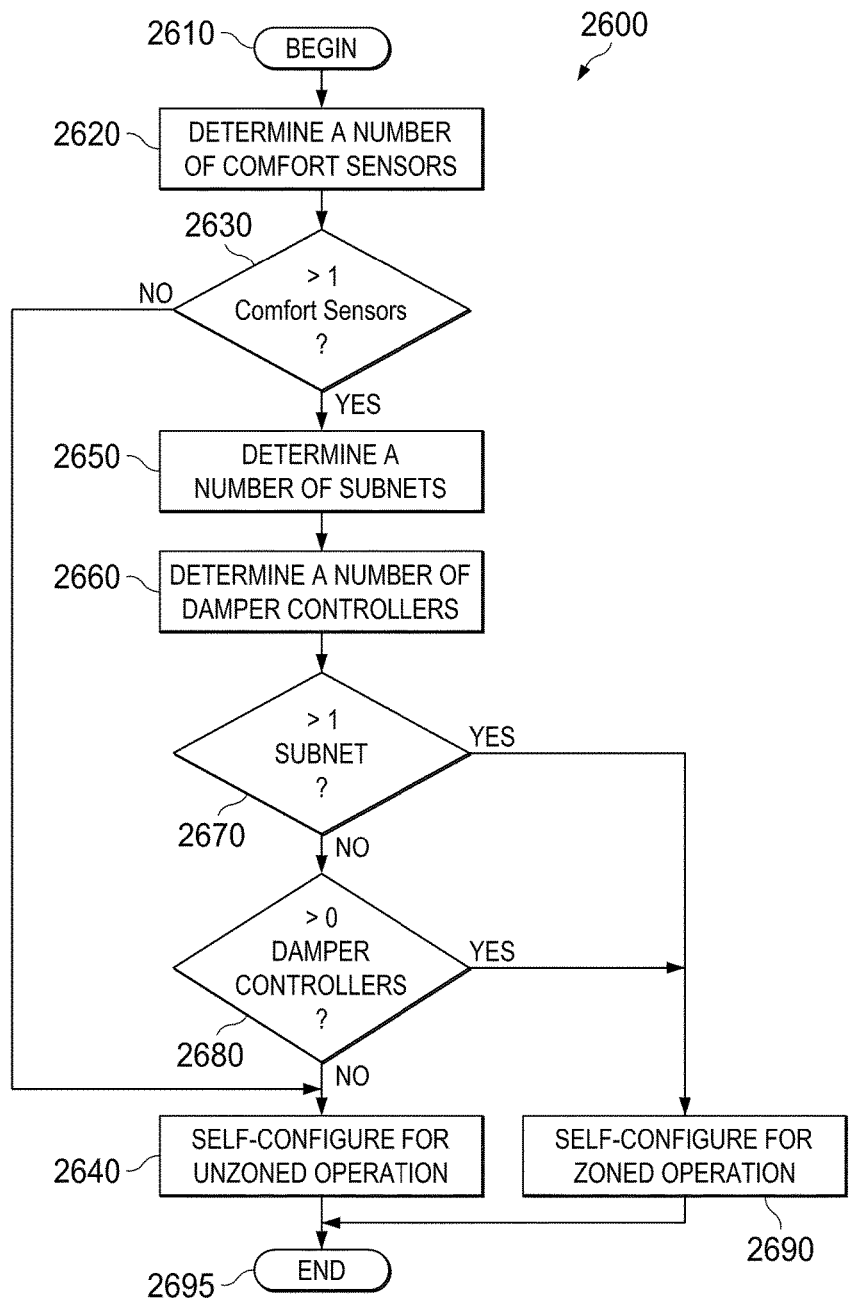
FIG. 26 illustrates a method of the disclosure of configuring an HVAC system for zoned operation.

FIG. 26 illustrates a method generally designated 2600 of configuring the system 100. The method 2600 may be advantageously implemented with a microcontroller or finite state machine, e.g. A method of manufacturing the UI 240 may include configuring the UI 240 to implement the method 2600. In some embodiments, as exemplified by the method 2600, the UI 240 is configured to automatically configure the operation of the system 100 for zoned operation. The method 2600 begins with an entry state 2610, which may be entered from any appropriate operating state of the system 100. In one embodiment, the entry state 2610 is entered during an initialization phase of the system 100, e.g. the link state 850.

In a state 2620 the UI 240 may discover the presence of a number of instances of the comfort sensor 260 in the network 200. Discovery may be made, e.g., by exchange of messages between the UI 240 and a number of comfort sensors 260 over the data bus 180. In a decisional state 2630, the method 2600 advances to a state 2640 in the event that the UI 240 discovers only a single comfort sensor 260. In the state 2640 the UI 240 self-configures for unzoned operation. Self-configuration may include, e.g., setting various operating parameters associated with zoned operation to values consistent with operating a single zone, including various display options for the display 905. The method 2600 ends with a state 2695 from which the UI 240 may return to a calling routine.

If more than one comfort sensor is discovered in the state 2620, the method 2600 branches from the state 2630 to a state 2650 in which the UI 240 discovers a number of subnets in the network 200. As described with respect to FIG. 5, a minimum subnet may include one instance of each of the UI 240 and the comfort sensor 160, and a demand unit 155, each networked via a four-wire RSBus. The method 2600 advances to a state 2660 in which the aSC 230a may discover a number of damper controller modules 215 in the network 200. In a decisional state 2670, the method 2600 advances to a decisional state 2680 in the event that the UI 240 does not discover additional subnets. In the state 2680, in the event that no instances of the damper controller module 215 are discovered the method 2600 advances to the state 2640 to self-configure for unzoned operation as previously described.

In the event more than one subnet is discovered in the state 2650, or more than one damper controller is discovered in the state 2660, the method 2600 branches from the state 2670 or the state 2680, respectively, to a state 2690. In the state 2690 the UI 240 self-configures for zoned operation. Self-configuration may include, e.g., configuring the UI 240 to display a screen tailored for use with an unzoned system in the event that the subnet controller discovers only comfort sensor. Self configuration may also include configuring the UI 240 to display a screen tailored for use in a zoned system in the event that the subnet controller discovers more than one comfort sensor 260 and either of more than one subnet or a damper controller module 215. Any additional discovery needed to configure the system 100 may also be performed in the state 2690.

Configuration for zoned or unzoned operation may include, e.g., opening or closing dampers, communicating with other user interfaces to assign active and inactive subnet controllers, and setting fan operating parameters to account for air circulation requirements. When configuring for zoned operation, the UI 240 may also set various internal parameters to enable presentation of zone configuration screens via the display 905. Alternatively, when configuring for unzoned operation, the UI 240 may set internal parameters to disable various screens associated with zoned operation so these screens are not presented to an operator.

Figure 27:
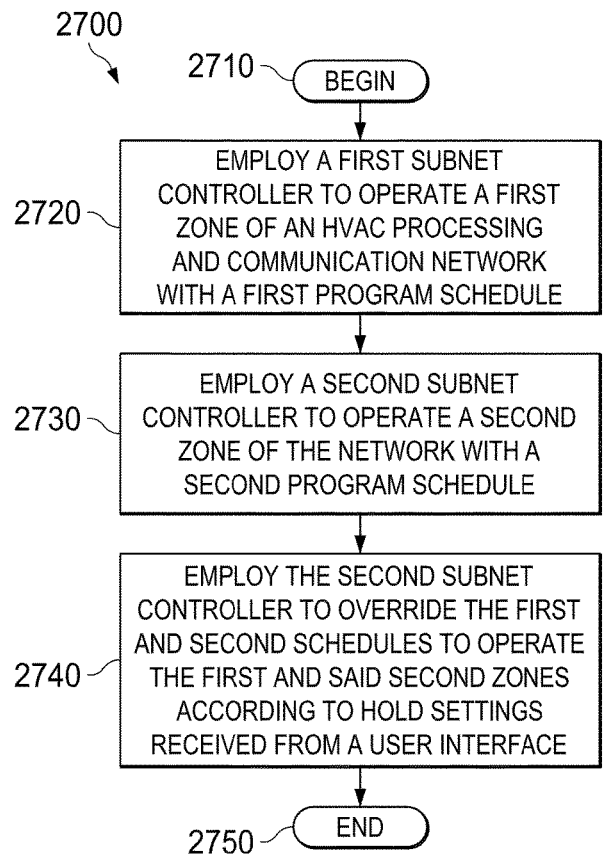

FIG. 27 illustrates a method generally designated 2700 of operating a user interface. The method is described in a nonlimiting example with reference to FIG. 7A. A method of manufacturing a user interface may include configuring a user interface to implement the method 2700. The method 2700 begins with a step 2710 that may be entered from any appropriate operational state of the system 100.

In a step 2720, the subnet controller 784 operates the zone 710 of the system 700A. The subnet controller 784 operates the zone 710 with a first program schedule. In a step 2730, the subnet controller 792 operates the zone 715 with a second program schedule. In a step 2740, one of the user interfaces 775, 780, 790 communicates a hold setting message to the subnet controller 784. The subnet controller 792 overrides the first and second schedules to operate the zone 710 and the zone 715 according to the hold settings communicated by the hold settings message. The method 2700 ends with a terminating step 2750.

In general the hold setting message may include, e.g., a temperature and/or a humidity, a hold start time, a hold stop time, or a hold duration. In a relatively simple embodiment, the message instructs the subnet controller 784 to maintain a temperature the subnet controller 792 is currently configured to maintain until the hold is released by a later message. In a more complex embodiment, the message includes start time, an end time and a temperature that may be different form the current temperature. In some embodiments, the hold settings are whole-house settings.

Conventional HVAC zoning uses a single thermostat in each zone, and the thermostats are typically located apart from each other so each thermostat can monitor the temperature in the zone it controls. Thus, when an operator wishes to set a hold temperature for multiple zones, the operator typically has to set the hold at each thermostat of the system for a whole house override.

In contrast, embodiments herein provide the ability for the operator to override the program schedules of all zones from a single location, e.g., the user interface 775. The particular user interface 775, 780, 790 need not be collocated with any comfort sensor. Thus, hold conditions may advantageously be set form any location in the HVAC network at which a user interface is located. The overriding may be done via the override screen 2300, e.g. In some embodiments, the subnet controller 784 communicates hold settings to each user interface 775, 780, 790 for display.

Figure 28:
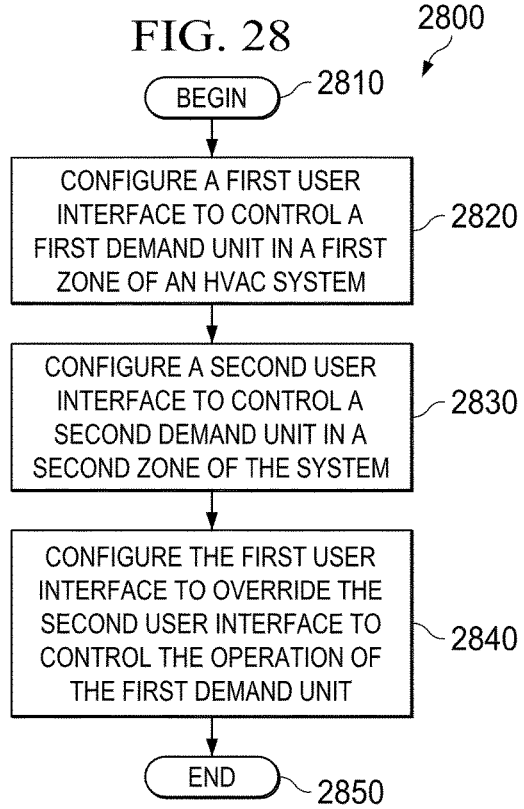

FIG. 28 illustrates a method generally designated 2800 of manufacturing an HVAC data processing and communication network. The method is described in a nonlimiting example with reference to FIG. 6, and more specifically to the UIs 664, 684. The method 2800 begins with an entry state 2810, which may be entered from any appropriate operating state of the system 100.

In a step 2820, the UI 664 is configured to control the operation of the demand furnace 670. The furnace 670 is associated with the zone 605 by virtue of being configured to operate in the subnet 615. In a step 2830, the UI 684 is configured to control the operation of the furnace 695. The furnace 695 is associated with the zone 610 by virtue of being configured to operate in the subnet 620. In a step 2840 the UI 664 is further configured to override the operation of the UI 684, which are associated with a different zone, to control the operation of the furnace 695. The method 2800 ends with a step 2850, from which the operation of the system 100 may continue in any desired manner.

In some embodiments of the system 100, more than one UI 240 may be present on a single system 100, or on a single zone of the system 100. In some embodiments, the operator may thus place multiple UIs 240 on a single system or zone so the operator can make changes to system operating parameters from any of the locations at which the UIs 240 are placed. In some embodiments, a first UI 240 on a subnet or zone, associated with an active subnet controller, directly controls the operation of the system or zone. A second UI 240 associated with an inactive subnet controller, on the same subnet or zone may communicate with the first UI 240, or directly with the aSC 230a to change system operating parameters.

In some embodiments, the first UI 240 is configured to allow an operator to switch which comfort sensor 160 is given priority by the aSC 230a. Thus, for example, an aSC 230a may be associated with any comfort sensor 160 in the subnet, or even in a different subnet. The comfort sensor 160 associated with the aSC 230a may be collocated in a same enclosure, such as for the control unit 590, or may be located remotely from the aSC 230a, e.g., in another room. This capability provides a simple means for the operator to select a particular comfort sensor 260 that is in a room occupied by the operator to control the system 100 to maintain the temperature of the occupied room. In some embodiments, no zoning of the system 100 is needed to provide localized control of temperature in one or more locations each monitored by a comfort sensor 260. In another embodiment, the operator may select an operating mode in which the aSC 230a reads a local temperature of several comfort sensors 260 in different locations to determine an average temperature, and then control the system 100 to maintain the desired temperature within a selected range. The several comfort sensors may optionally be collocated with user interfaces, and may optionally be collocated with UIs 240.

Accordingly, FIG. 29 illustrates a method generally designated 2900 of operating a subnet controller. A method of manufacturing an HVAC data processing and communication network may include configuring various components of the system 100 to implement the method 2900. The method 2900 begins with a step 2910 that may be entered from any appropriate operational state of the system 100.

In a step 2920, an aSC 230a controls the demand unit 155 to maintain a temperature at a first location served by a first comfort sensor 160 in response to a temperature reported by the first comfort sensor 160. By way of example, the demand unit may be the furnace 120. The aSC 230a at this point does not consider the temperature reported by a second comfort sensor 160. The first comfort sensor 160 may be collocated with the aSC 230a or located remotely therefrom. In some cases, the first comfort sensor 160 is located in a same enclosure with the aSC 230a, but need not be. In a step 2930, the aSC 230a controls the demand unit 155 to maintain a temperature at a second location served by the second comfort sensor 160 in response to the temperature reported by the second comfort sensor 160. The aSC 230a may be configured to control for the second aSC 230a by an appropriately configured message generated by the second UI 240 in response to user input. For example, in response to the message, the aSC 230a may ignore messages sent by the first comfort sensor 160, at least for the purposes of controlling the demand unit 155. In an optional step 2940, the aSC 230a controls the demand unit 155 in response to the temperature reported by both the first and the second comfort sensor 160. In some cases, the aSC 230a averages both reported temperatures and controls the demand unit 155 in response to the computed average. Those skilled in the pertinent art will appreciate that the method 2900 may be extended in principle to an arbitrarily large number of comfort sensors 160 within the limits of the number of devices supportable by the system 100. The method ends with a step 2950, from which the operation of the system 100 may continue in any desired manner.

In some embodiments, the first comfort sensor 160 is located in an enclosure with a first UI 240, and the second comfort sensor 160 is located in an enclosure with a second UI 240. The aSC 230a may be configured to control the demand unit 155 in response to the first comfort sensor 160 in response to contact by the operator with a touch screen of the first UI 240. In this case, the UI 240 may be programmed to send an appropriately configured control message to the aSC 230a in response to a single tap of the touch screen, a predetermined number of taps within a predetermined time interval, or a number of fingers simultaneously tapped on the touch screen. These examples are presented without limitation and are not exclusive of other combinations of touches that the UI 240 may be configured to recognize as a command to give priority to the associated comfort sensor 160. In some embodiments, the first UI 240 and/or the second UI 240 are configured to send the control message is response to a command entered via a control menu of the UI 240. In some embodiments the UI/G 250 is configured to provide the control message to the aSC 230a in response to a signal from a remote entity. One aspect of using one of the aforementioned embodiments or other embodiments within the scope of the disclosure is that a most recent UI 240 to be touched by the operator is the UI 240 that effectively controls the system 100 from the operator's perspective. In some cases, another UI 240 will provide actual control as a "master" UI 240, while the most recently touched UI 240 provides "virtual" control by sending messages instructing the master UI 240 to control the system 100 in a desired manner.

In some embodiments a first UI 240 or a second UI 240 send a message to the aSC 230a on the subnet indicating that the first or second UI 240 is the last UI 240 to be touched. In this embodiment, the aSC 230a determines which is the last UI 240 to be touched and disregards control messages from the UI 240 that is not the last to be touched. Those skilled in the pertinent art will appreciate that other control schemes are possible to accomplish the desired result of control from the most recently touched UI 240.

Accordingly, FIG. 30 presents a method generally designated 3000 of manufacturing an HVAC data processing and communication network. The method 3000 is described without limitation by referring to the UI 240 and the system 100. By way of example without limitation the discussion of the method 3000 includes an aSC 230a, a first UI 240 and a second UI 240 and the demand unit 155, e.g., the furnace 120. The method 3000 begins with a step 3010 that may be entered from any appropriate operational state of the system 100.

In a step 3020, the first UI 240 is configured to broadcast a message on the data bus 180 indicating that the first UI 240 has been touched. The first UI 240 may detect a touch, e.g., via a touch-sensitive screen. In a step 3030, the second UI 240 is configured to broadcast a message on the data bus 180 indicating that the second UI 240 has been touched. In a step 3040, the aSC 230a controls the operation of the demand unit consistent with the control message send by the most recently touched of the first UI 240 and the second UI 240.

In one embodiment, the aSC 230a receives control messages directly from both the first and the second UI 240. Each of the first and the second UI 240 send a message to the aSC 230a when that UI 240 is touched. The aSC 230a is configured to then respond to the UI 240 that last sent the message indicating it has been touched. In another embodiment, the aSC 230a only responds directly to control messages sent by the first UI 240, and the first UI 240 acts a proxy for the second UI 240 when the second UI 240 is touched more recently. In this case the second UI 240 may send a message to the first UI 240 when the second UI 240 is touched. The first UI 240 then sends control messages to the aSC 230a consistent with the control messages received from the second UI 240. The method 3000 ends with a step 3040 from which operation of the system may continue in any desired manner.

Without limitation to various methods of operating the system 100, an illustrative example is provided of using the method 3000. An operator or occupant may enter a first room in which the first UI 240 is located. The operator may touch the touch-sensitive display of the first UI 240. In response, the first UI may send a message to the aSC 230a indicating that the display has been touched. The aSC 230a determines that the first room is occupied, and configures itself to accept messages from the first UI 240 related to control the operation of the demand unit 155 associated with the aSC 230a. The aSC 230a may also configure itself to disregard messages related to controlling the operation of the demand unit 155 that originate from the second UI 240, which may be located in a second room. Thus, the aSC 230a controls the operation of the demand unit 155 consistent with a control message sent by the most recently touched UI 240. In some cases the first and the second UI 240 may have a different control temperature stored therein to which the aSC 230a controls to. In other cases, the first and the second UI 240 may be associated with a different comfort sensor 160. In such cases, the aSC 230a may control the demand unit 155 to maintain the programmed temperature as measured by the comfort sensor 160 associated with the last-touched UI 240.

Turning now to FIG. 31, illustrated is an embodiment of an installer dashboard, generally denoted 3100, that is associated with operation of the UI 240. The dashboard 3100 may be invoked, e.g., by selecting the service soft switch 990. The dashboard 3100 may include a number of tabs configured to access functionality of particular utility to an installer or otherwise sophisticated operator. In the illustrated embodiment, without limitation, the dashboard 3100 includes an installer test tab 3110, an installer/setup tab 3120, an equipment tab 3130, and diagnostic tab 3140, and an alert tab 3150. The dashboard 3100 also includes the help tab 940 and the home tab 980 as previously described (FIG. 9). Selection of each of the tabs 3110, 3120, 3130, 3140, 3150 may invokes a particular installer screen. Installer screens may provide functionality of the UI 240 that is specific to installation or service functions of the system 100. Selection of soft switches on the service screens may invoke various setup and/or calibration routines, e.g.

FIG. 32 illustrates a screen transition map generally designated 3100 that is associated with the tabs 3110, 3120, 3130, 3140, 3150, 940. Installer screens may be configured in any manner that results in, e.g., convenient or intuitive presentation of installer functions to the operator. Upon selection of the service soft switch 990, the display 905 may present a warning screen 3210. The warning screen 3210 may, for example, inform the operator that proceeding may provide access to functions that may disable the system 100 if performed by unqualified operators. Optionally, access to configuration functions may be restricted by a passcode. Optionally, the warning screen 3210 provides a soft switch, the activation of which returns the display 905 to the home screen 1080.

In the illustrated embodiment, an installer test screen 3220 may provide an option to reset the system 100 into a soft resent or initial power-up state. Various system-level or device-level tests may be made available to the operator. An installation and setup screen 3230 may provide functions useful to configuring the system 100, such as parameter entry and replacement part check. An equipment screen 3240 may provide to the operator a list of devices available on the data bus 180 and access to functions such as independent and dependent parameter display and update. A diagnostic screen 3250 may present to the operator a list of devices on the data bus 180 and an option to run a diagnostic routine on a selected device. A diagnostic routine may place the selected device in a self-test mode, e.g., and return parameter values reflecting the outcome of the self-test. An alert screen 3260 may present to the operator a list of devices on the data bus 180 and a menu of functions related to those devices, such as viewing device-level alerts. A help screen 3270 may provide access to information helpful to the operator regarding installation-related functions, or manufacturer contact information, e.g. In some embodiments, the help information is context-sensitive. For example, selecting the help tab 940 while using functions of one of the installer test screens may provide help to the operator related to the installer test functions present on that installer screen. Of course, other screen configurations may be used while remaining within the scope of the disclosure.

Those skilled in the art to which this application relates will appreciate that other and further additions, deletions, substitutions and modifications may be made to the described embodiments.

What is claimed is:

1. A heating ventilation and air conditioning (HVAC) data processing and communication network subnet controller, comprising:
a physical layer interface configured to couple to a data bus of an HVAC data processing and communications network; and
a local controller configured to cooperate with said physical layer interface to publish messages to said data bus to operate a first HVAC demand unit in a first zone and a second HVAC demand unit in a second zone, wherein said first zone is configured to condition a first space located within an enclosed space and said second zone is configured to condition a second space located within said enclosed space that is different than said first space;
wherein said subnet controller is configured to:
control operation of said first HVAC demand unit and said second HVAC demand unit in response to said subnet controller being designated as active and a second subnet controller being designated as inactive; and
control operation of said first HVAC demand unit, but not control operation of said second HVAC demand unit, in response to said subnet controller and said second subnet controller both being designated as active.

2. The subnet controller as recited in claim 1, wherein said designation of said subnet controller as said active subnet controller is based at least on said subnet controller's ability to control a component of said first HVAC demand unit or said second HVAC demand unit that said other subnet controller cannot control.

3. The subnet controller as recited in claim 1, wherein said first and second HVAC demand units each comprise an air handler, a furnace, and a compressor.

4. The subnet controller as recited in claim 1, wherein said subnet controller is a first subnet controller, said first zone further comprises a first user interface and said second zone further comprises a second user interface, and said first user interface is configured to cooperate with second user interface to control operation of said second zone.

5. The subnet controller as recited in claim 1, wherein said subnet controller is housed in a same enclosure as an environmental sensor, but is addressable independently over said data bus.

* * * * *